United States Patent
Holton

(10) Patent No.: US 12,514,709 B2
(45) Date of Patent: Jan. 6, 2026

(54) ORTHOPEDIC FASTENERS, INSTRUMENTS, AND METHODS

(71) Applicant: MEDARTIS AG, Basel (CH)

(72) Inventor: Thomas Holton, Winona Lake, IN (US)

(73) Assignee: MEDARTIS AG, Basel (CH)

( * ) Notice: Subject to any disclaimer, the term of this patent is extended or adjusted under 35 U.S.C. 154(b) by 1009 days.

(21) Appl. No.: 17/576,924

(22) Filed: Jan. 15, 2022

(65) Prior Publication Data
US 2023/0225868 A1    Jul. 20, 2023

(51) Int. Cl.
*A61F 2/30*    (2006.01)
*A61F 2/42*    (2006.01)
*A61F 2/46*    (2006.01)

(52) U.S. Cl.
CPC ........ *A61F 2/30749* (2013.01); *A61F 2/4225* (2013.01); *A61F 2/4606* (2013.01); *A61F 2002/30166* (2013.01); *A61F 2002/30405* (2013.01); *A61F 2002/30622* (2013.01); *A61F 2002/30777* (2013.01)

(58) Field of Classification Search
CPC ............. A61B 17/1682; A61B 17/1686; A61F 2/4606
See application file for complete search history.

(56) References Cited

U.S. PATENT DOCUMENTS

| | | |
|---|---|---|
| 4,929,247 A | 5/1990 | Rayhack |
| 5,540,695 A | 7/1996 | Levy |
| 5,951,557 A | 9/1999 | Luter |
| 7,540,874 B2 | 6/2009 | Trumble et al. |
| 9,113,969 B2 * | 8/2015 | Niederberger ..... A61B 17/8019 |
| 10,603,055 B2 * | 3/2020 | Donner ............... A61B 17/1739 |
| 10,743,995 B2 | 8/2020 | Fallin et al. |
| 11,752,011 B2 * | 9/2023 | Stuart ..................... A61F 2/447 623/17.11 |
| 12,083,026 B2 * | 9/2024 | Reckling ............... A61F 2/4603 |

(Continued)

FOREIGN PATENT DOCUMENTS

| | | |
|---|---|---|
| GB | 2583572 A | 11/2020 |
| JP | 2020108686 A | 7/2020 |

(Continued)

OTHER PUBLICATIONS

UK Search Report under Section 17, dated Jun. 19, 2023, 1 p.
The Intellectual Property Office of the United Kingdom, Examination Report under Section 18(3), Aug. 28, 2025, 6 pages.

*Primary Examiner* — Matthew J Lawson
(74) *Attorney, Agent, or Firm* — Heslin Rothenberg Farley and Mesiti P.C.; Victor A. Cardona Esq.

(57) ABSTRACT

A system for deploying a fixation member into an aperture of a bone fastener includes a guide having a body that includes a proximal end and a distal end. The guide includes a guide member coupled to the body near the proximal end. The guide member is configured to guide placement of the fixation member to secure the bone fastener. The system includes an engagement member coupled to the body near the distal end. The engagement member is configured to engage the bone fastener such that the guide member is rotatable, relative to the bone fastener, about an engagement axis to the guide member at any of the plurality of relative orientations about the engagement axis.

13 Claims, 29 Drawing Sheets

(56) References Cited

U.S. PATENT DOCUMENTS

| | | |
|---|---|---|
| 2005/0277941 A1 | 12/2005 | Trumble et al. |
| 2012/0253410 A1 | 10/2012 | Taylor et al. |
| 2012/0271314 A1 | 10/2012 | Stemniski et al. |
| 2013/0144343 A1 | 6/2013 | Arnett et al. |
| 2013/0150900 A1 | 6/2013 | Haddad et al. |
| 2013/0231668 A1 | 9/2013 | Olsen et al. |
| 2014/0031827 A1 | 1/2014 | Lancianese et al. |
| 2014/0277460 A1* | 9/2014 | Schifano ............ A61B 17/8605 606/86 R |
| 2015/0173805 A1* | 6/2015 | Donner ................. A61B 17/17 606/279 |
| 2017/0000533 A1 | 1/2017 | Fallin et al. |
| 2017/0000537 A1* | 1/2017 | Fallin ................... A61B 17/808 |
| 2017/0202566 A1* | 7/2017 | Luo .................... A61B 17/1725 |
| 2018/0228498 A1* | 8/2018 | Dacosta ............... A61B 17/152 |
| 2020/0337845 A1 | 10/2020 | Fallin et al. |
| 2024/0108414 A1* | 4/2024 | Dreyer ............... A61B 17/1682 |
| 2024/0237980 A1* | 7/2024 | Niver .................... A61B 17/17 |
| 2024/0260977 A1* | 8/2024 | Kuyler ................. A61F 2/4606 |

FOREIGN PATENT DOCUMENTS

| | | |
|---|---|---|
| WO | 00/64360 A2 | 11/2000 |
| WO | 2006122194 A1 | 11/2006 |
| WO | 2010028045 A1 | 3/2010 |
| WO | 2017004221 A1 | 1/2017 |

* cited by examiner

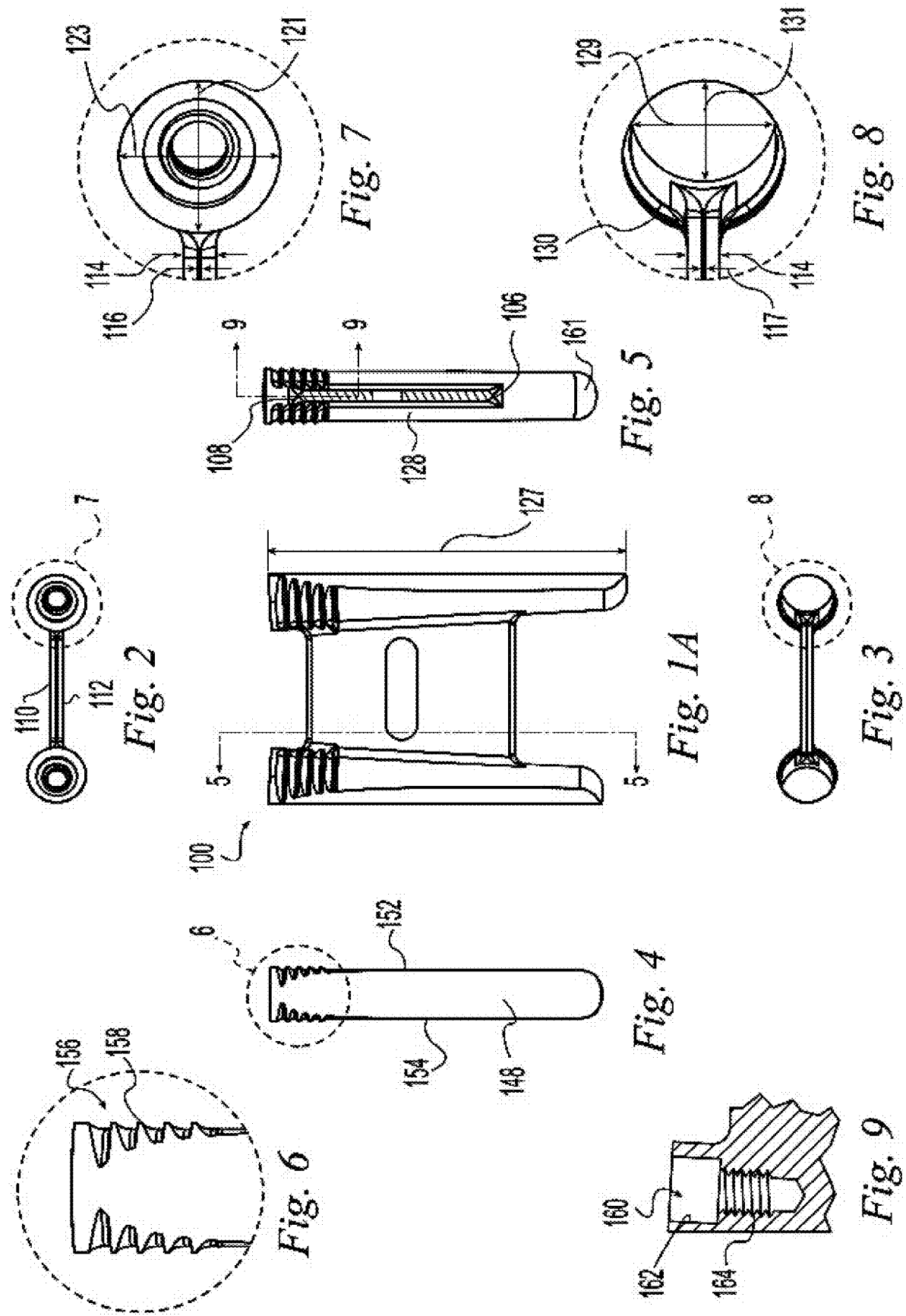

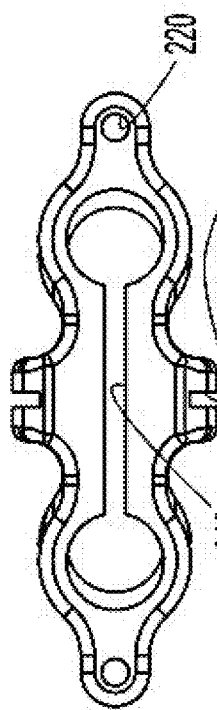
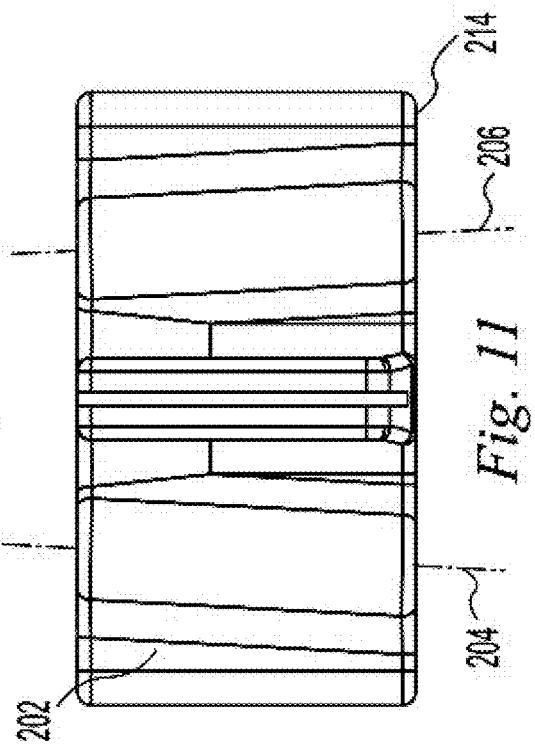
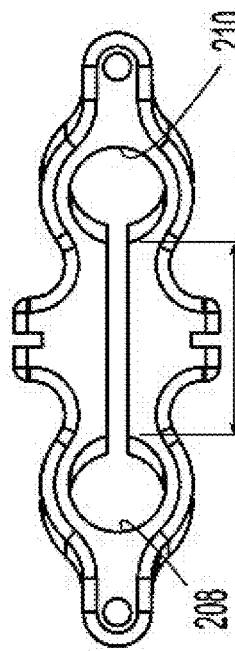
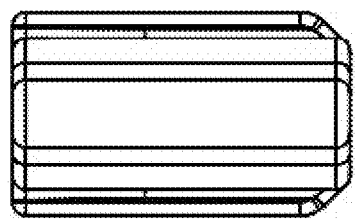
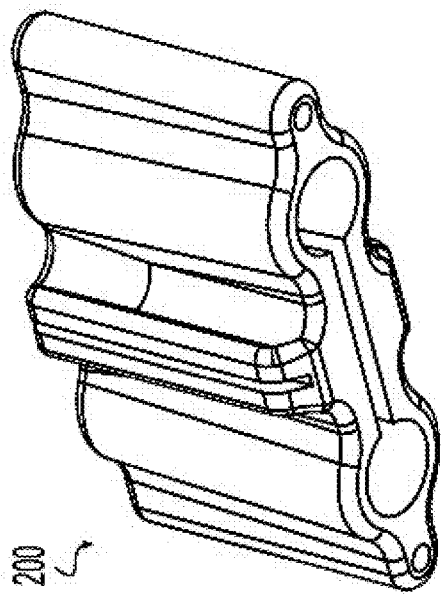

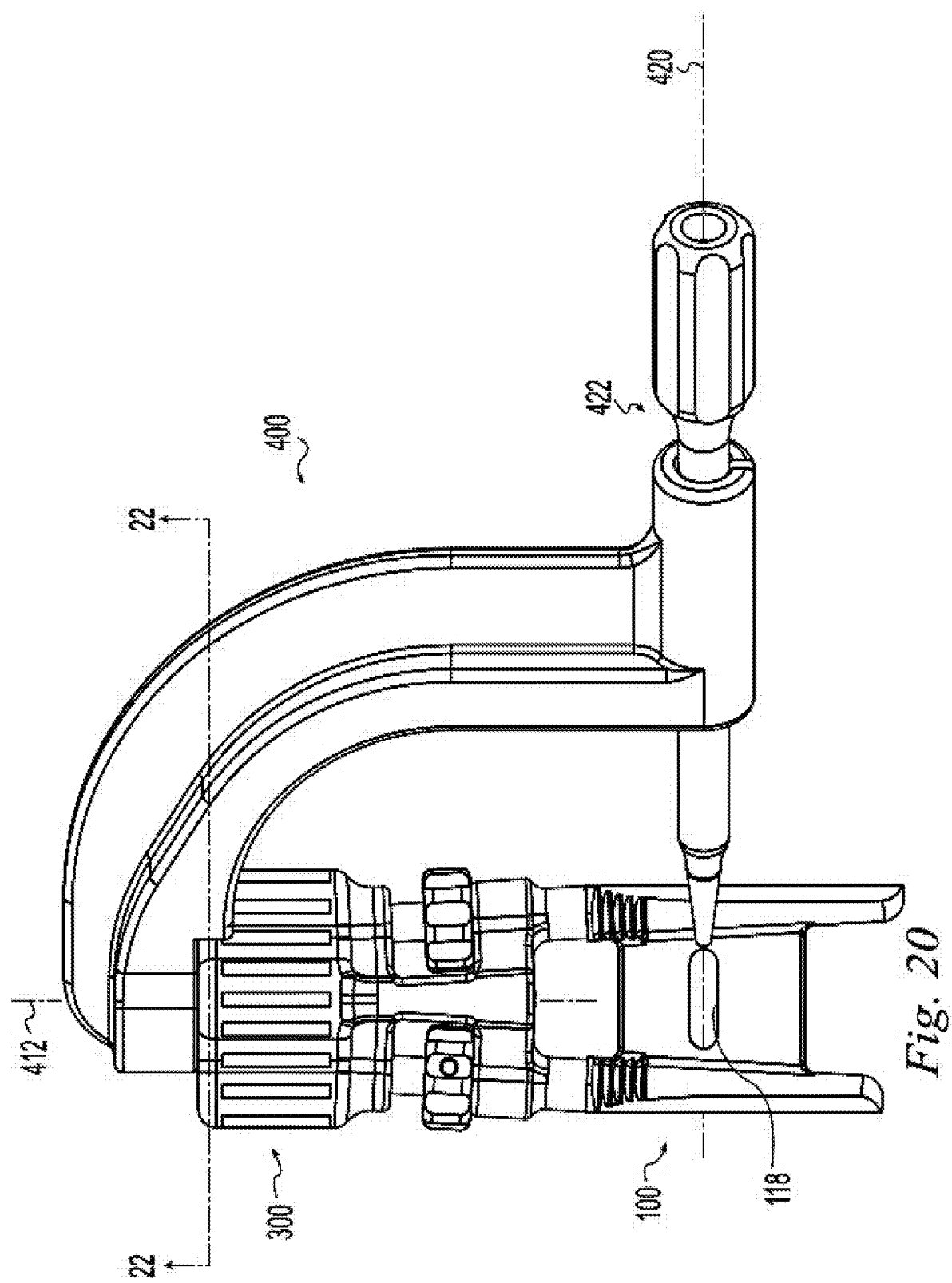

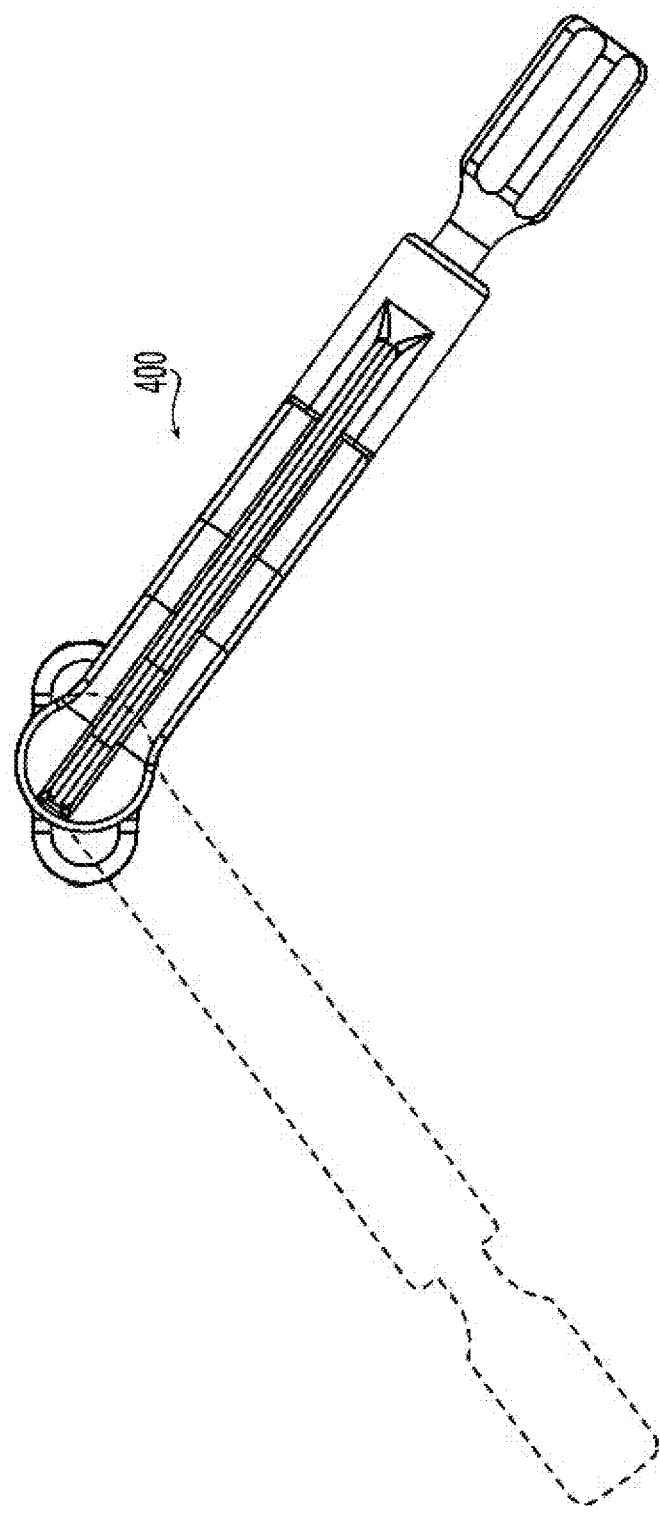
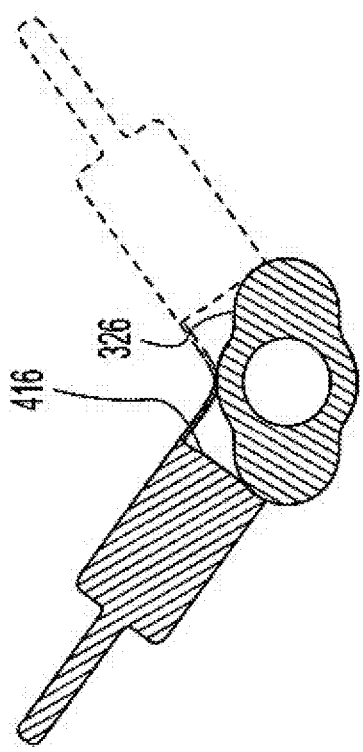

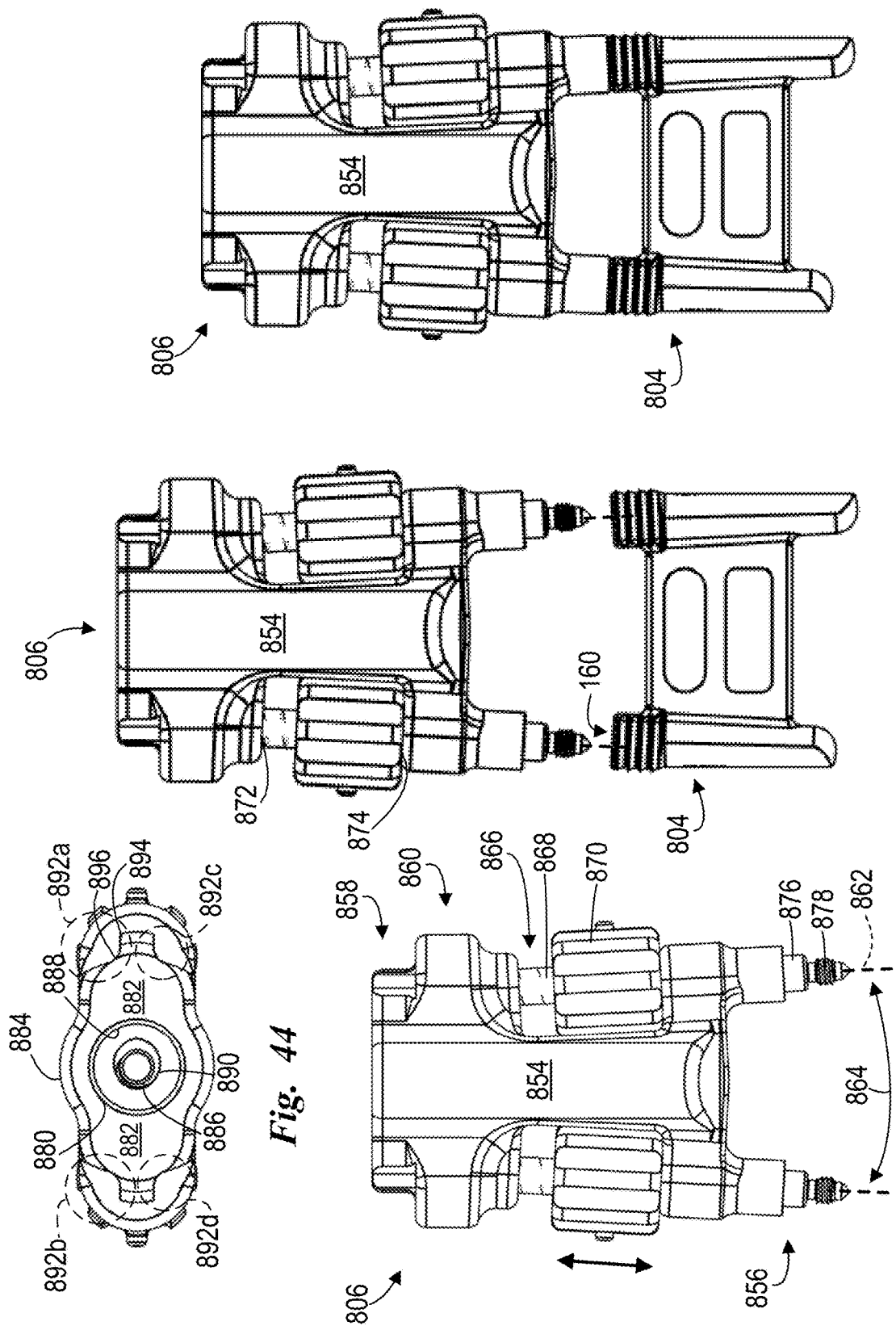

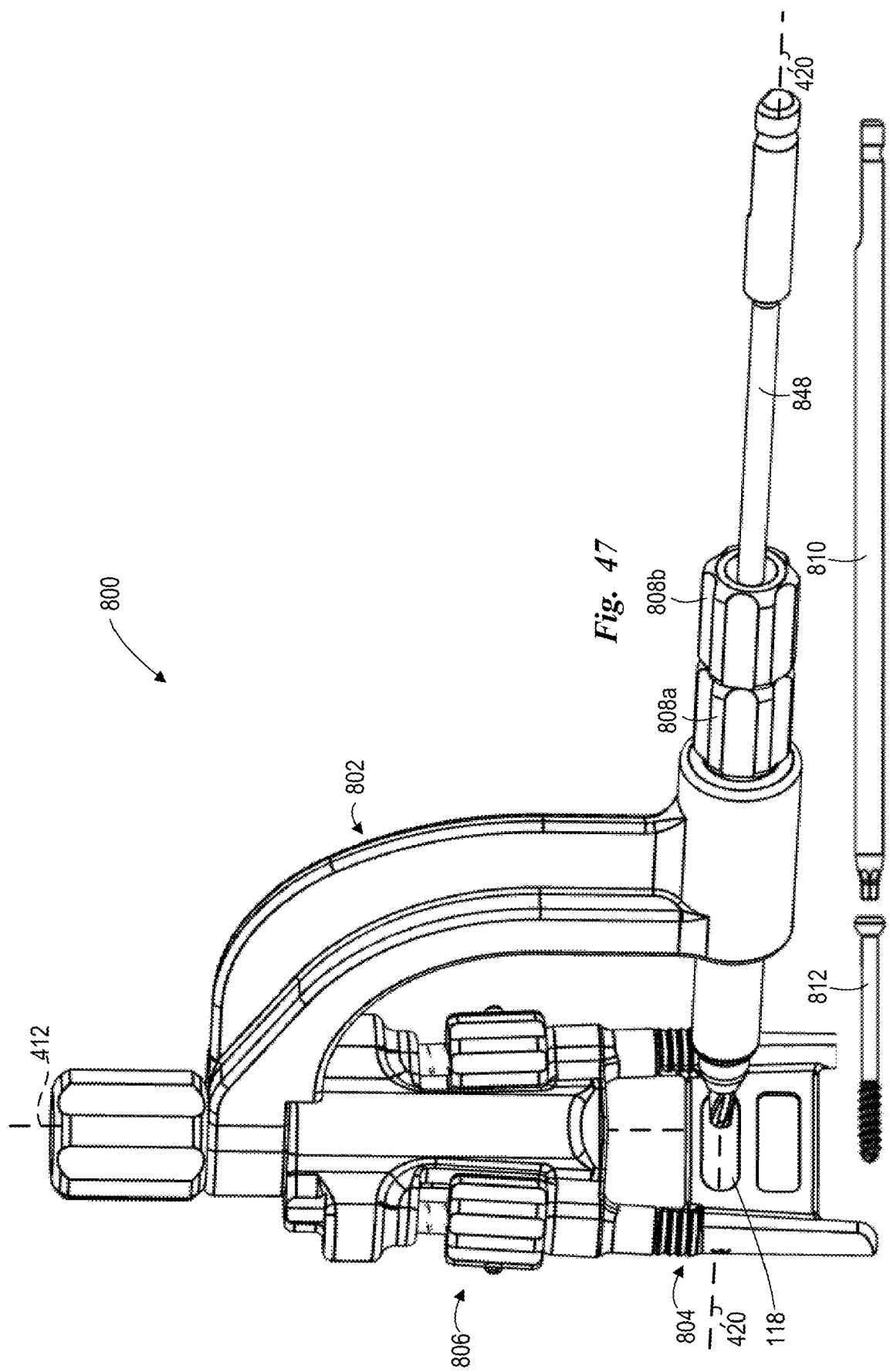

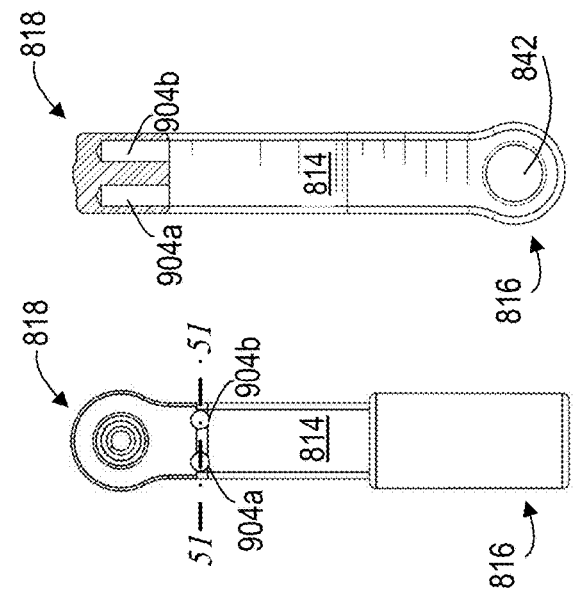
Fig. 50
Fig. 51
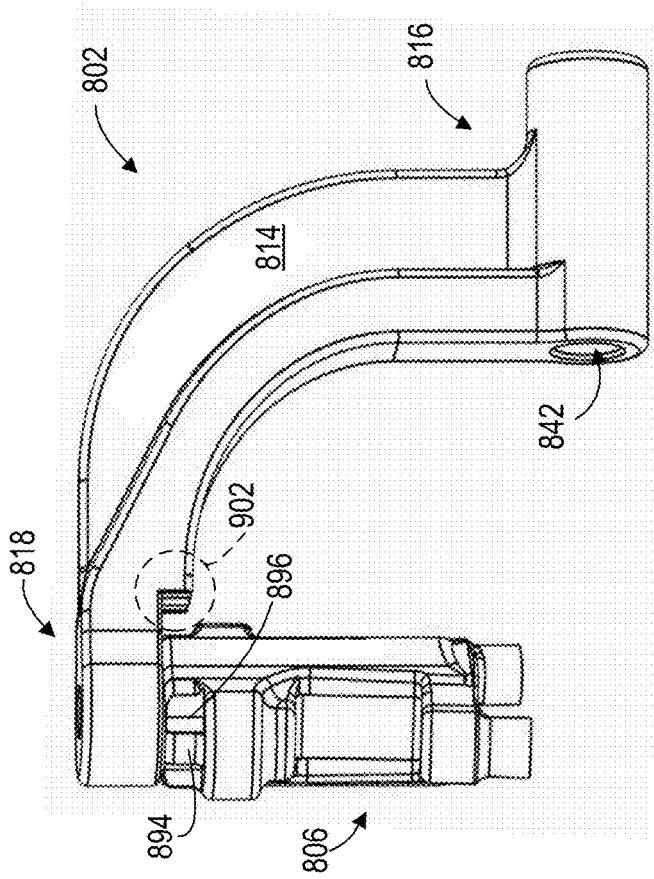
Fig. 49
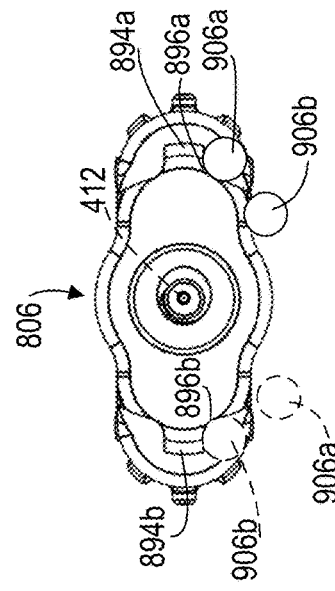
Fig. 53
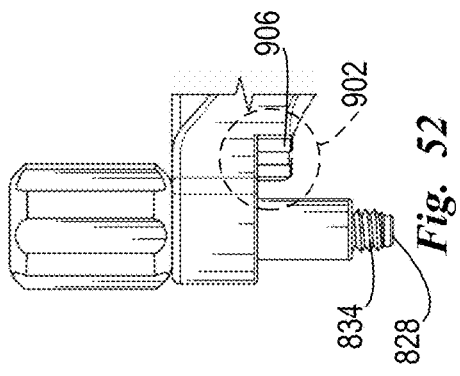
Fig. 52

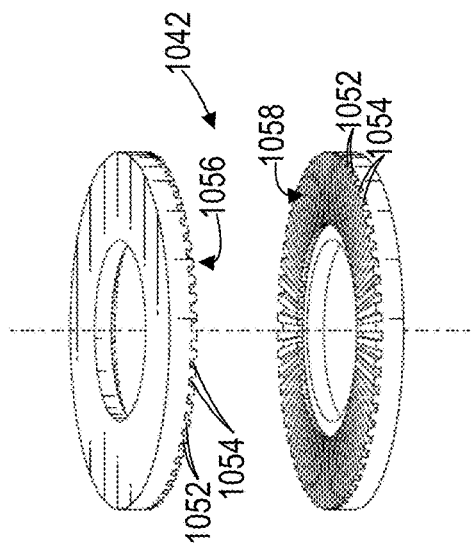
Fig. 56
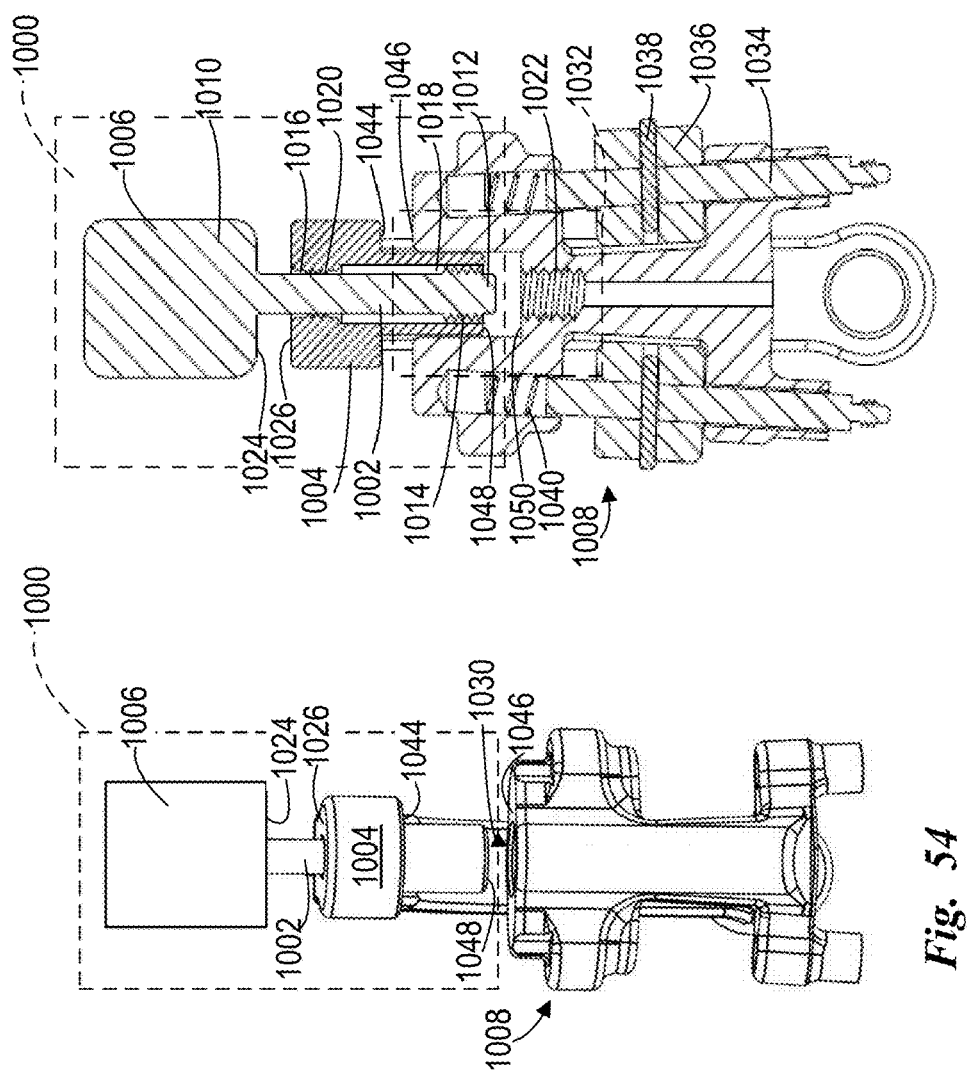
Fig. 55
Fig. 54

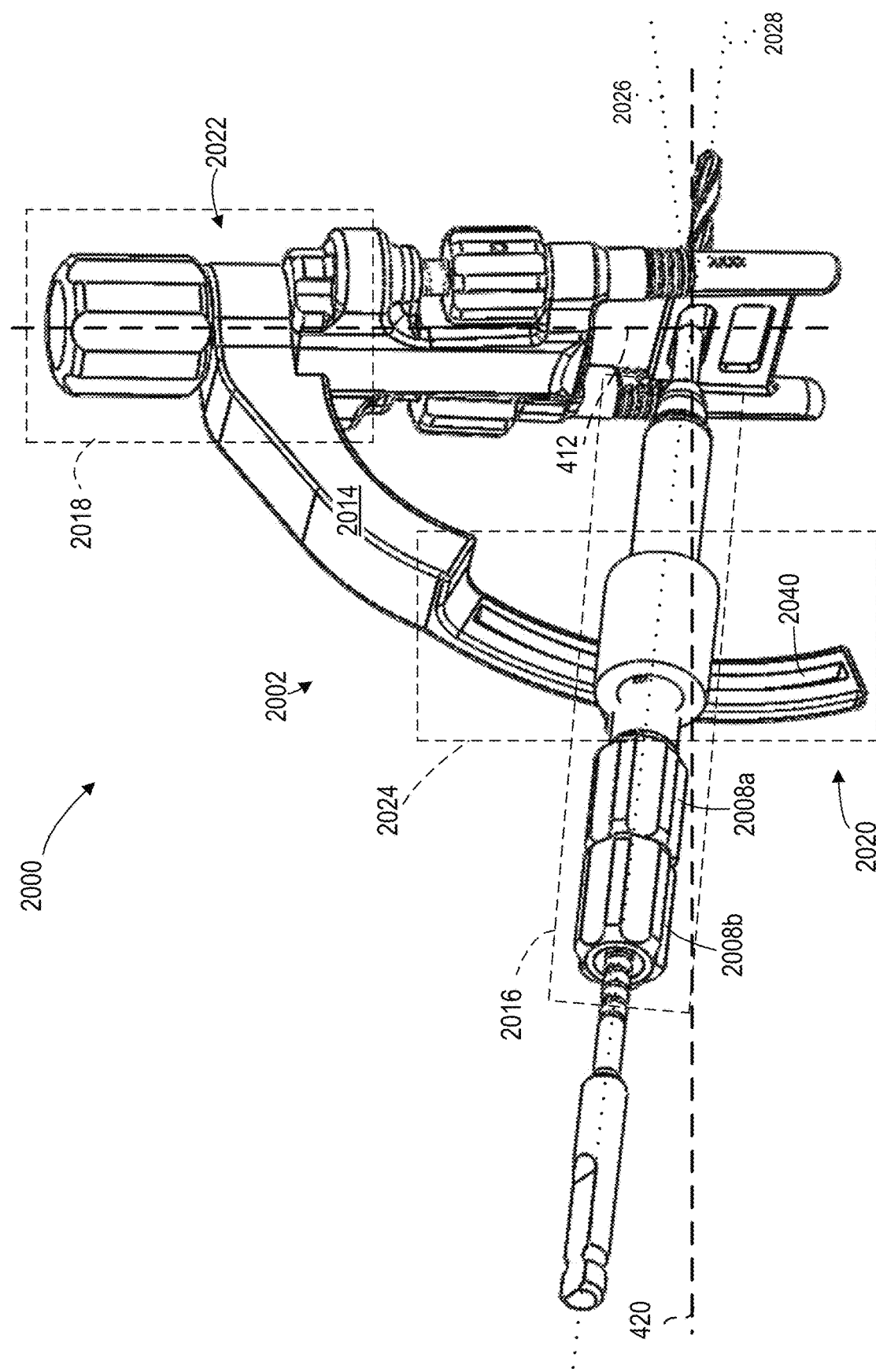

ORTHOPEDIC FASTENERS, INSTRUMENTS, AND METHODS

TECHNICAL FIELD

Examples of the present disclosure relate to methods, implants, and instruments for compressing first and second bone portions or a bone portion and an implant together.

BACKGROUND

Various conditions may affect skeletal joints such as the deterioration, elongation, shortening, or rupture of soft tissues, cartilage, and/or bone associated with the joint and consequent laxity, pain, and/or deformity. One may desire to change the angular alignment of a bone or a portion of a bone to restore function and/or reduce pain. One may likewise desire to fuse a joint to fix the bones of the joint in a better angular alignment or reduce pain caused by motion at the joint. One may likewise desire to support a fractured bone to allow healing of the fracture to occur. One may likewise desire to support an implant on a bone. To this end, various osteotomy procedures, joint fusion procedures, fracture fixation procedures, joint resurfacing procedures, implants and instruments have been proposed. Such procedures have been performed throughout the body to make various angular adjustments in, fuse joints associated with, fuse fractures associated with, and/or resurface articular surfaces of tibia, fibula, femur, pelvis, humerus, ulna, radius, carpal, metacarpal, tarsal, metatarsal, phalangeal and other bones.

SUMMARY

Examples of the present disclosure provide methods, implants, and instruments capable securing a bone fastener or an implant. The bone portions may be portions of the same bone as in a fracture or osteotomy. The bone portions may be portions of different bones as in arthrodesis. A bone portion may be a portion of a bone adjacent an articulating joint and the implant may be a resurfacing implant, a spacer, and/or a fusion supporting implant.

The various apparatus, devices, systems, and/or methods of the present disclosure have been developed in response to the present state of the art, and in particular, in response to the problems and needs in the art that have not yet been fully solved by currently available methods, implants, and/or instruments. One general aspect of the present disclosure can include a system for deploying a fixation member into an aperture of a bone fastener. The system may include a guide that may include a body having a proximal end and a distal end. The guide may also include a guide member coupled to the body near the proximal end, where the guide member is configured to guide placement of the fixation member to secure the bone fastener. The guide may also include an engagement member coupled to the body near the distal end, where the engagement member is configured to engage the bone fastener such that the guide member is rotatable, relative to the bone fastener, about an engagement axis to a plurality of relative orientations. The engagement member is configured to secure the guide member at any of the plurality of relative orientations about the engagement axis.

Implementations may include one or more of the following features. The system may include the bone fastener, where the bone fastener may include: a first leg having a leading end and a trailing end; a second leg having a leading end and a trailing end; and a body connected to the first leg and to the second leg, the body defining the aperture. The engagement member may include a lock mechanism that may include: a handle having a shoulder; a shaft connected to the handle, the shaft configured to engage a socket; and where the shoulder pinches the body as the shaft advances distally within the socket to secure the guide member at one of the plurality of relative orientations about the engagement axis.

The shaft may include threads near a distal end of the shaft and the socket may include a threaded socket configured to engage threads of the shaft, the guide may include: an inserter positioned between the engagement member and the bone fastener, the inserter may include the threaded socket; and where the shoulder pinches the body against the inserter. The body may include an arcuate body. The engagement member may include: a shaft having a proximal end and a distal end that engages the bone fastener; a collar connected to the body, the collar having an aperture through the collar, the aperture sized to receive the shaft; a protrusion coupled to the shaft towards the proximal end; and where the protrusion presses against at least a portion of the collar when the shaft engages the bone fastener.

The engagement member may include: an inserter configured to couple to the bone fastener, the inserter having a proximal end having a coupling member may include a socket that extends distally into a superior surface of the coupling member; and where the shaft may include external threads near the distal end of the shaft configured to engage internal threads of the socket, the socket having a depth that accepts distal advancement of the shaft until the protrusion presses against the collar.

The superior surface of the coupling member and an inferior surface of the collar form an engagement interface configured to constrain rotational movement of the inserter and the collar about the engagement axis. The engagement interface may include one or more protrusions on one of the superior surface of the coupling member and the inferior surface of the collar and one or more recesses on another one of the superior surface of the coupling member and the inferior surface of the collar. The engagement interface may include an interlocking coupling that may include a plurality of both teeth and valleys on each of the superior surface of the coupling member and the inferior surface of the collar, the teeth and valleys of each of the superior surface of the coupling member and the inferior surface of the collar intermesh when the coupling member and the collar abut.

The engagement member may include a pin extending from an inferior surface of the collar, the pin configured to engage a cavity of an inserter connected to the bone fastener. The engagement member may include a stop configured to limit the plurality of relative orientations about the engagement axis to a range of angles such that deployment of the fixation member will enter the aperture.

The engagement member may include a feature configured to limit a range of motion of the guide to a range of relative orientations about the engagement axis. The feature may include one or more pins configured to contact a surface (or other structure) of an inserter or bone fastener.

One general aspect of the present disclosure can include a system for deploying a fixation member for a bone fastener, the bone fastener may include: a first leg having a leading end and a trailing end; a second leg having a leading end and a trailing end; a body connected to the first leg and to the second leg; and an aperture through the body, the aperture having an aperture length and an aperture width, the aperture length greater than the aperture width. The system also includes a guide mountable to the bone fastener in a rotating relationship, the guide configured to securely position a fixation member at any of a plurality of relative orientations, in alignment with the aperture about an engagement axis.

Implementations may include one or more of the following features. The guide may include: a cross fixation insertion axis transverse to the engagement axis; a guide member coupled near a proximal end of the guide, the guide member may include: a passage through the guide member that aligns with the cross fixation insertion axis; a first sleeve coaxial with the cross fixation insertion axis and having a cross sectional diameter less than a cross sectional diameter of the passage; a second sleeve coaxial with the cross fixation insertion axis and having a cross sectional diameter less than a cross sectional diameter of the first sleeve; and a third sleeve coaxial with the cross fixation insertion axis and having a cross sectional diameter less than a cross sectional diameter of the second sleeve.

The system may also include an inserter configured to connect to both the bone fastener and the guide. In addition, the first sleeve may be sized to accept the fixation member and a driver coupled to the fixation member; the second sleeve may be sized to accept a drill bit; and the third sleeve may be sized to accept a temporary fastener. The guide member may include a pivot member configured to orient the cross fixation insertion axis from a perpendicular orientation in relation to the engagement axis to one of a superior orientation and an inferior orientation. The pivot member may include a lock mechanism configured to secure the pivot member to retain an orientation of the cross fixation insertion axis in relation to the engagement axis.

One general aspect of the present disclosure can include a method of stabilizing a bone fastener that traverses a first bone portion and a second abutting bone portion. The method may include deploying a bone fastener within a first bone portion and a second abutting bone portion. The bone fastener may include an insertion axis; a body having an aperture having an aperture length and an aperture width, the aperture length being greater than the aperture width; a first leg connected to the body; and a second leg connected to the body.

The method also includes coupling a guide to the bone fastener, the guide having: a body having a proximal end and a distal end; a guide member coupled to the body near the proximal end, the guide member configured to guide placement of a fixation member to secure the bone fastener; and an engagement member coupled to the body near the distal end, the engagement member engageable with the bone fastener about an engagement axis at a plurality of relative orientations, the engagement member configured to secure the guide member at one of the plurality of relative orientations about the engagement axis. The method also includes rotating the guide about the engagement axis to a desired orientation; securing guide member at the desired orientation and deploying the fixation member to stabilize the bone fastener.

Implementations may include one or more of the following features. The method includes deploying the fixation member which may further include: confirming an orientation of a cross fixation insertion axis coaxial with the guide member by way of a temporary fastener passed through a pin sleeve positioned within a drill sleeve which is positioned within a fixation member sleeve which is positioned within a passage of the guide member of the guide, drilling a hole into one of the first bone portion and the second abutting bone portion by way of a bit within the drill sleeve, and deploying the fixation member into the hole by way of a driver connected to the fixation member within the fixation member sleeve.

The method may also include where securing the guide member further includes engaging a locking mechanism of the engagement member to secure the guide member at the desired orientation, disengaging the locking mechanism of the engagement member of the guide, rotating the guide to a new orientation about the engagement axis, and reengaging a locking mechanism of the engagement member of the guide.

BRIEF DESCRIPTION OF THE DRAWINGS

Various examples of the present disclosure will be discussed with reference to the appended drawings. These drawings depict only illustrative examples of the present disclosure and are not to be considered limiting of its scope.

FIG. 1A is front elevation view of a bone implant according to one example of the present disclosure;

FIG. 2 is a top view of the bone implant of FIG. 1;

FIG. 3 bottom view of the bone implant of FIG. 1;

FIG. 4 is a side elevation view of the bone implant of FIG. 1;

FIG. 5 is a cross sectional view of the bone implant of FIG. 1 taken along line 5-5 of FIG. 1A;

FIG. 6 is a detail view of the bone implant of FIG. 1;

FIG. 7 is a detail view of the bone implant of FIG. 1;

FIG. 8 is a detail view of the bone implant of FIG. 1;

FIG. 9 is a detail cross sectional view of the bone implant of FIG. 1 taken along line 9-9 of FIG. 5;

FIG. 10 is a perspective view of an example of a hole forming guide for the bone implant of FIG. 1;

FIG. 11 is a front elevation view of the hole forming guide of FIG. 10;

FIG. 12 is a top view of the hole forming guide of FIG. 10;

FIG. 13 is a bottom view of the hole forming guide of FIG. 10;

FIG. 14 is a side elevation view of the hole forming guide of FIG. 10;

FIG. 20 is a perspective view of the guide of FIG. 19 with the inserter of FIG. 15 and the implant of FIG. 1;

FIG. 21 is a top view of the guide of FIG. 19 with the inserter of FIG. 15 and the implant of FIG. 1 illustrating range of motion;

FIG. 22 is a cross sectional view taken along line 22-22 of FIG. 20 and illustrating range of motion;

FIG. 43 is a front elevation view of an example of an inserter for the bone implant of FIG. 1;

FIG. 44 is a top view of the inserter of FIG. 43;

FIGS. 45 and 46 are front elevation views of the inserter of FIG. 43 with the implant of FIG. 1;

FIG. 47 illustrates the guide coupled to the inserter;

FIG. 49 is a perspective view of an inserter and a guide according to one embodiment;

FIG. 50 is a bottom view of a guide according to one embodiment;

FIG. 51 is a cross section view taken along line 51-51 in FIG. 50;

FIG. 52 is a perspective view of a guide member;

FIG. 53 is a top view of an inserter;

FIG. 54 is a perspective view of an inserter and one embodiment of an engagement member according to one embodiment;

FIG. 55 is a cross section view of one embodiment of an engagement member;

FIG. 56 is a diagram of an example of an engagement interface according to one embodiment of the present disclosure;

FIG. 57A is a perspective view of a system that includes a guide according to one embodiment of the present disclosure;

DETAILED DESCRIPTION

Figure 1B:
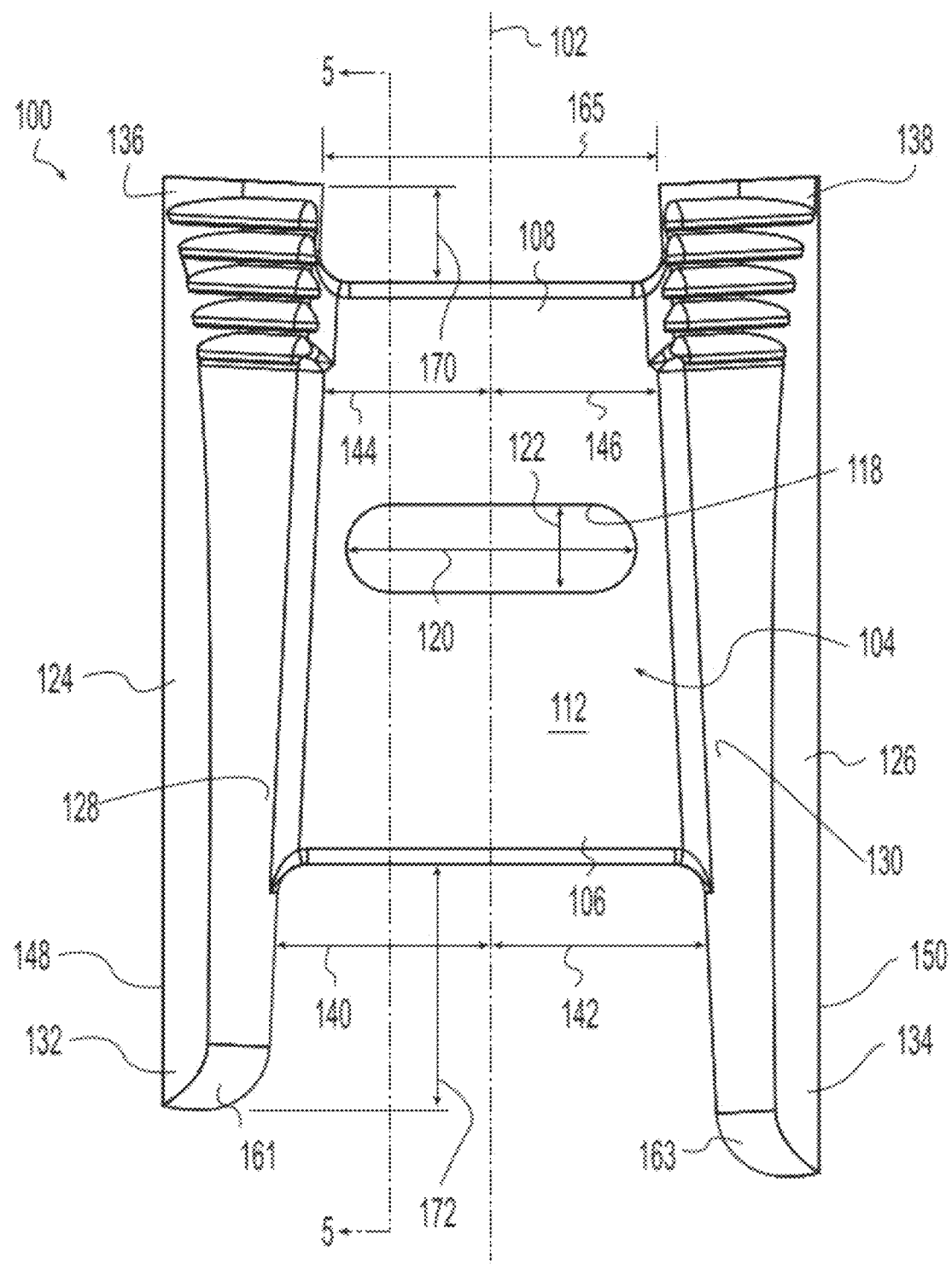
FIG. 1B is an enlarged front elevation view of the bone implant of FIG. 1.

Exemplary embodiments of the disclosure will be best understood by reference to the drawings, wherein like parts are designated by like numerals throughout. It will be readily understood that the components, as generally described and illustrated in the Figures herein, could be arranged and designed in a wide variety of different configurations. For example, different embodiments may exclude or omit one or more of the components, structures, features, or aspects of embodiments specifically described herein. Thus, the following more detailed description of the embodiments of the apparatus, system, and method is not intended to limit the scope of the invention, as claimed, but is merely representative of exemplary embodiments of the technology.

Standard medical planes of reference and descriptive terminology are employed in this specification. While these terms are commonly used to refer to the human body, certain terms are applicable to physical objects in general.

A standard system of three mutually perpendicular reference planes is employed. A sagittal plane divides a body into right and left portions. A coronal plane divides a body into anterior and posterior portions. A transverse plane divides a body into superior and inferior portions. A mid-sagittal, mid-coronal, or mid-transverse plane divides a body into equal portions, which may be bilaterally symmetric. The intersection of the sagittal and coronal planes defines a superior-inferior or cephalad-caudal axis. The intersection of the sagittal and transverse planes defines an anterior-posterior axis. The intersection of the coronal and transverse planes defines a medial-lateral axis. The superior-inferior or cephalad-caudal axis, the anterior-posterior axis, and the medial-lateral axis are mutually perpendicular.

Anterior means toward the front of a body. Posterior means toward the back of a body. Superior or cephalad means toward the head. Inferior or caudal means toward the feet or tail. Medial means toward the midline of a body, particularly toward a plane of bilateral symmetry of the body. Lateral means away from the midline of a body or away from a plane of bilateral symmetry of the body. Axial means toward a central axis of a body. Abaxial means away from a central axis of a body. Ipsilateral means on the same side of the body. Contralateral means on the opposite side of the body. Proximal means toward the trunk of the body. Proximal may also mean toward a user or operator. Distal means away from the trunk. Distal may also mean away from a user or operator. Dorsal means toward the top of the foot. Plantar means toward the sole of the foot.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The following illustrative examples describe methods, implants, and instruments capable of compressing first and second bone portions or a bone portion and an implant together. The bone portions may be portions of the same bone that have become separated due to a fracture or an osteotomy. The bone portions may be portions of different bones as in an arthrodesis performed to fuse a joint. A bone portion may be a portion of a bone adjacent an articulating joint and the implant may be a resurfacing implant, a spacer, and/or a fusion supporting implant. Examples of the present disclosure may be used with any bone or joint including but not limited to bones such as a tibia, fibula, femur, pelvis, humerus, ulna, radius, carpal, metacarpal, tarsal, metatarsal, phalange and joints associated therewith.

The term "transverse" is used herein to mean crossing as in non-parallel.

Examples according to the present disclosure provide methods, implants, and instruments capable of compressing first and second bone portions or a bone portion and an implant together. FIGS. 1-9 illustrate an example in the form of a fastener 100 for joining first and second bone portions. As used herein, a "fastener" refers to any structure configured, designed, or engineered to join two structures. Fasteners may be made of a variety of materials including metal, plastic, composite materials, metal alloys, plastic composites, and the like. Examples of fasteners include, but are not limited to screws, rivets, bolts, nails, snaps, hook and loop, set screws, bone screws, nuts, posts, pins, thumb screws, and the like. Other examples of fasteners include, but are not limited to wires, Kirschner wires (K-wire), anchors, bone anchors, plates, bone plates, intramedullary nails or rods or pins, implants, sutures, soft sutures, soft anchors, interbody cages, fusion cages, and the like. In certain embodiments, the term fastener may be used with an adjective that identifies an object or structure that the fastener may be particularly configured, designed, or engineered to engage, connect to, join, contact, or couple together with one or more other structures of the same or different types. For example, a "bone fastener" may refer to an apparatus for joining or connecting one or more bones, one or more bone portions, soft tissue and a bone or bone portion, hard tissue and a bone or bone portion, or the like. The fastener includes an insertion axis 102 along which the fastener moves as it is inserted into or removed from a bone.

The fastener 100 has a body 104 extending between a body distal or leading end 106 and a body proximal or trailing end 108. The body leading end 106 and the body trailing end 108 are spaced from one another longitudinally relative to the insertion axis. In the illustrative example of FIGS. 1-9, the body 104 has a generally planar configuration with opposed planar sides 110, 112 spaced apart a body thickness 114. The opposed planar sides 110, 112 converge toward the body trailing end 108 to define a trailing edge having a trailing edge thickness 116 that is less than the body thickness 114 (FIG. 7). The relatively narrow trailing edge thickness 116 facilitates removal of the fastener 100 after bone has healed over the body trailing end 108. During removal, such as in a revision procedure, the narrow trailing edge will cut through overlying bone. In the illustrative example of FIGS. 1-9, the opposed planar sides 110, 112 also converge toward the body leading end 106 to define a leading edge having a leading edge thickness 117 that is less than the body thickness 114. The relatively narrow leading edge thickness 117 facilitates insertion of the fastener 100.

In the illustrative example of FIGS. 1-9, the body 104 has an aperture 118 extending through the body 104 between the opposed planar sides 110, 112. The aperture 118 has a length 120 and a width 122. In the illustrative example of FIGS. 1-9, the aperture length 120 is greater than the aperture width 122 and the aperture length 120 is oriented transverse to the insertion axis 102. In the illustrative example of FIGS. 1-9, the aperture length is oriented normal to the insertion axis. The inclusion of an aperture and its size and orientation may be determined by the particular application in which the fastener is to be used. For example, the aperture may receive a fixation member, such as screw 636 in FIG. 36, to provide cross fixation of the bone portions and to prevent the fastener 100 from migrating out of the bone.

As used herein, an "aperture" refers to a gap, a hole, a port, a portal, an opening, a space or recess in a structure, a void in a structure, or the like. In certain embodiments, an aperture can refer to a structure configured specifically for receiving something and/or for allowing access. In certain embodiments, an aperture can pass through a structure. In other embodiments, an aperture can exist within a structure but not pass through the structure. An aperture can be two-dimensional or three-dimensional and can have a variety of geometric shapes and/or cross-sectional shapes, including, but not limited to a rectangle, a square, or other polygon, as well as a circle, an ellipse, an ovoid, or other circular or semi-circular shape.

As used herein, a "fixation" refers to an apparatus, instrument, structure, device, component, member, system, assembly, step, process, or module structured, organized, configured, designed, arranged, or engineered to connect two structures either permanently or temporarily. The two structures may one or the other or both of manmade and/or biological tissues, hard tissues such as bones, teeth or the like, soft tissues such as ligament, cartilage, tendon, or the like. In certain embodiments, fixation is used as an adjective to describe a device or component or step in securing two structures such that the structures remain connected to each other in a desired position and/or orientation. Fixation devices can also serve to maintain a desired level of tension, compression, or redistribute load and stresses experienced by the two structures and can serve to reduce relative motion of one part relative to others. Examples of fixation devices are many and include both those for external fixation as well as those for internal fixation and include, but are not limited to pins, wires, Kirschner wires (K-wires), screws, anchors, bone anchors, plates, bone plates, intramedullary nails or rods or pins, implants, interbody cages, fusion cages, and the like.

The fastener 100 includes first and second legs 124, 126 connected to the body. The legs have a width 121, a depth 123 (FIG. 7), and a length 127 (FIG. 1A). The first and second legs may be the same size or they may be different sizes to accommodate particular anatomy. For example, the legs may have the same width and depth but have different lengths so that they can accommodate bi-cortical fixation in bone portions of varying thickness. Each leg has an elongate inboard surface 128, 130 facing the insertion axis 102 and extending from a leading end 132, 134 to a trailing end 136, 138. The elongate inboard surface 128, 130 is spaced from the insertion axis 102 a leading distance 140, 142 near the leading end and the elongate inboard surface is spaced from the insertion axis 102 a trailing distance 144, 146 near the trailing end. The leading distance 140, 142 and trailing distance 144, 146 for each leg may be equal such that the inboard surface is parallel to the insertion axis 102. The leading distance 140, 142 and trailing distance 144, 146 for each leg may be unequal such that, for example, one or both of the leg inboard surfaces may converge or diverge distally from the insertion axis 102. In one embodiment, at least one of the leading distances 140, 142 is greater than the corresponding trailing distance 144, 146 and the other leading distance 140, 142 is equal to or greater than the corresponding trailing distance 144, 146 such that the inboard surfaces 128, 130 diverge relative to one another distally or in other words in the leading direction defined by the leading ends and at least one diverges from the insertion axis 102. In the illustrative example of FIGS. 1-9, each leg diverges from the insertion axis 102 in the leading direction. The inboard surfaces 128, 130 may each diverge from the insertion axis 102 by a divergence angle. The included angle between the inboard surfaces 128, 130 is the sum of the individual divergence angles. As described above, the legs may diverge symmetrically or asymmetrically. The individual divergence angles may be in the range of 1-5 degrees. In the illustrative example of FIGS. 1-9, the divergence angles are each 3 degrees yielding an included angle of 6 degrees. When the legs are positioned in bone, the projected area of each leg perpendicular to the insertion axis affects the resistance of the leg to pulling through the bone. The larger the projected area the greater the pull through strength. For a given leg length, the area is determined by the leg depth, or for a cylindrical leg by its diameter. The body is inserted into a slot formed in the bone between the legs. As the slot width increases relative to the leg projected area, the resistance of the leg to being pulled into the slot decreases. Thus, a thinner body and consequently thinner slot increases pull through strength. This can be expressed in terms of the difference between the leg depth and body thickness or in terms of a ratio of leg depth to body thickness.

In the illustrative example of FIGS. 1-9, each leg 124, 126 further includes an elongate outboard surface 148, 150 facing away from the insertion axis 102 and extending from the leading end to the trailing end. In the illustrative example of FIGS. 1-9, the elongate outboard surfaces 148, 150 are parallel to one another and the insertion axis 102.

In the illustrative example of FIGS. 1-9, the fastener legs 124, 126 have a generally elliptical cross section. Near the trailing end the cross section is approximately circular. Near the distal end, the legs are non-circular having a major diameter 129 greater than a minor diameter 131 (FIG. 8). In the illustrative example of FIGS. 1-9, the leg shape can be describes as being a pair of cylinders that diverge toward the leading end with material removed on the outboard surfaces so that the outboard surfaces are rendered parallel. The resulting legs are circular at the trailing end as seen in FIG. 7 and transition into the shape of intersecting circles as the material is removed, becoming narrower, i.e. tapering, in the minor axis toward the leading end as seen in FIG. 8. The front 152 and back 154 of each leg are parallel as seen in FIG. 4. The trailing end of each leg includes barbs 156 as seen in FIG. 6. The barbs 156 are generally in the form of upwardly swept circular projections 158 on the front, back and inboard surfaces of the trailing portion of the leg such as would result if the barbs were circular projections surrounding divergent cylindrical legs and material was removed on the outboard surfaces so that the outboard surfaces were rendered parallel and consequently removing progressively more of the circular projections in the leading direction. Alternatively, the barbs may extend completely around the circumference of the leg. The trailing ends of the legs include a cavity 160 (FIG. 9) operable to couple with an inserter as described below. In one embodiment, the cavity is threaded to receive a threaded connector. In the illustrative example of FIGS. 1-9, the cavity 160 is a stepped cylindrical cavity with a larger diameter trailing portion 162 and a smaller diameter, threaded leading portion 164. The leading end of each leg includes a radius 161, 163 to ease insertion of the fastener 100 into holes formed in bone. The inboard surfaces 128, 130 of the legs have an inboard surface trailing end spacing 165 at the trailing end of the legs. The trailing end of the body 108 is recessed toward the leading end of the legs by a trailing end recess distance 170. The leading end of the body 106 is recessed toward the trailing end of the legs by a leading end recess distance 172. The recess distances 170, 172 may be equal to or greater than a bone cortex thickness at a location at which the fastener is to be used so that the body 104 is located inward of the cortical bone when the fastener is installed.

The various sizes and proportions for the fastener will vary based on the application. For example, in one embodiment, depending on the application, leg depth ranges from 2 mm to 7 mm and the body thickness may range from 0.5-5 mm. Further for example, in many applications, such as for use in the mid and fore regions of the hands and feet, a fastener may advantageously have a leg depth of 2.5-4.5 mm and a body thickness of 0.5-1.5 mm. The ratio of leg depth to body thickness may range from 14:1 to 1.5:1. In one embodiment, the ratio ranges from 5:1 to 3:1.

In the illustrative example of FIGS. 1-9, the leg width is constant and equal to the leg depth at the proximal end of the leg.

As stated above, the body leading and trailing end recess distances 170, 172 may be equal to or greater than the local bone cortex thickness. The distances 170, 172 may be in the range of 1-8 mm and may vary for different size implants and different applications.

The leg length 127 may be close to the bone thickness along the insertion axis 102. The legs may be the same length or different lengths and they may be staggered at one or both ends. In the illustrative example of FIGS. 1-9, the leg lengths are different and the legs are level at the proximal end but staggered at the distal end. For use in foot surgery, the leg lengths may be in the range of 10-50 mm and, in one embodiment, in the range of 14-32 mm. For use at other locations, the leg length may be outside of these ranges and can be, for example, quite long in large implants for applications such as tibial osteotomies.

The aperture 118, if present, is sized to receive an appropriate cross fixation fastener. In one embodiment, its length 120 is as long as possible, and corresponds to an angular variation, which gives maximum flexibility for cross fixation placement without colliding with the legs.

The fastener 100 may be provided as a plurality of fasteners that have different sizes to accommodate different anatomy. In one example, the fastener is provided as a plurality of fasteners of varying leg length 127 with the leg width 121, depth 123, outboard wall 148, 150 spacing, and divergence angle being the same for each fastener. In this way differing bone thicknesses may be accommodated while using the same instruments described below.

Referring to FIGS. 10-14, a hole forming guide 200 includes a body 202 defining hole axes 204, 206 along which a hole forming tool may be guided. In the illustrative example of FIGS. 10-14, the axes 204, 206 are defined by cylindrical guide holes 208, 210. The guide holes 208, 210 are operable to receive a hole forming tool such as a punch or drill and constrain the hole forming tool to longitudinal motion along the axes 204, 206 to form holes in an underlying bone. The axes 204, 206 are angled to correspond to the divergent legs of the fastener of FIGS. 1-9. The inboard surfaces of the guide holes 208, 210 have a guide hole inboard surface leading end spacing 212 at the leading end 214 of the guide 200 that is equal to or greater than the inboard surface trailing end spacing 165 of the fastener. If the guide hole inboard surface leading end spacing 212 is equal to the fastener leg inboard surface trailing end spacing 165, the inboard surfaces 128, 130 of the fastener legs will just touch the inboard surfaces of the bone holes when the fastener leg trailing ends are inserted flush with the bone surface. Further seating of the fastener legs below the surface of the bone will result in compression of the bone between the fastener legs. Likewise, if the guide hole inboard surface leading end spacing 212 is greater than the fastener leg inboard surface trailing end spacing 165, the inboard surfaces 128, 130 of the fastener legs will just touch the inboard surfaces of the bone holes when the fastener leg trailing ends are proud of the bone surface. Further insertion of the fastener until the trailing ends of the legs are flush with the bone surface will result in compression of the bone. The amount of compression for a given insertion depth of the fastener may be determined by selecting the relationship of guide hole inboard surface leading end spacing 212 to fastener leg inboard surface trailing end spacing 165. With the included angle between the leg inboard surfaces matching the included angle between the hole inboard surfaces, the compression of the bone between the fastener legs is uniform at all positions between the legs normal to the insertion axis and inserting the bone fastener does not create a relative bending moment between the first and second bone portions. An insertion axis is an axis along which an object is inserted. An insertion axis may also be the same axis used to extract an object. The guide 200 further includes a guide slot 216 connecting the holes 208, 210. The slot 216 may be used to guide a chisel, broach, saw or other cutting tool to remove bone and form a connecting slot between bone holes formed using the guide holes 208, 210 for receiving the fastener body 104. Alignment notches 218 are provided to indicate the center of the guide 200. Fixation holes 220 are provided to receive fixation pins or screws to fix the guide in position on a bone.

Referring to FIGS. 15-18, an inserter 300 is configured for use with the fastener 100 of FIGS. 1-9. The inserter 300 includes a body 302 having a distal end 304 and a proximal end 306 including a handle portion 308. The body includes a pair of laterally spaced passages extending from the distal end 304 toward the proximal end 306 and each defining a passage axis 307. The passage axes 307 are angled 309 to align with the cavities 160 in the fastener 100. Side cuts or windows 310 communicate with the passages. Each passage receives a locking bolt 312 in axial sliding and rotating relationship. Each bolt 312 traverses one of the windows 310 exposing the portion of the bolt 312 within the window for manipulation. A knob 314 is fixed to each bolt 312, such as by pinning, to allow a user to rotate the bolt 312 about the passage axis 307 and to serve as a limit to axial travel of the bolt 312 as the knob abuts the proximal or distal margins 316, 318 of the window 310. Each bolt 312 includes a smooth cylindrical portion 320 sized to fit into the trailing portion 162 of the stepped cylindrical cavity 160 in one of the fastener legs. Each bolt 312 includes a threaded portion 322, distal to the smooth portion 320, sized to screw into the threaded leading portion 164 of the stepped cavity 160. The proximal end 306 of the inserter 300 includes a coupling member configured to rotationally couple to a cross guide discussed further below. As used herein, "coupling," "coupling member," or "coupler" refers to a mechanical device, apparatus, member, component, or structure, that is organized, configured, designed, arranged, or engineered to connect the ends of adjacent parts or objects. In certain embodiments, a coupling can be used to connect two shafts together at their ends for the purpose of transmitting power. In other embodiments, a coupling can be used to join two pieces of rotating equipment while permitting some degree of misalignment or end movement or both. In certain embodiments, couplings may not allow disconnection of the two parts, such as shafts during operation. (Search "coupling" on Wikipedia.com Jul. 26, 2021. CC-BY-SA 3.0 Modified. Accessed Jul. 27, 2021.) In the illustrative example of FIGS. 15-18, the coupling member includes a socket 324 extending distally into a top surface 325 of the handle portion 308 and a peripheral edge 326.

As used herein, a "socket" refers to a hollow, void, opening, or depression formed in or defined within a surface of an object or structure. In certain embodiments, the socket does not pass through the object or structure having the surface. A socket can have a variety of cross-section shapes (e.g., ovoid, oval, round, circular, rectangular, square, or the like) and have a variety of configurations for one or more walls that define the socket. In one example, a socket can have one or more walls that connect in rounded corners. In certain embodiments, a socket is sized and shaped to receive or accept another structure. In certain embodiments, a socket may comprise a stepped socket having a proximal portion and a distal portion and the two portions have different diameters or different widths or lengths that define a step between the two portions.

Figure 18:
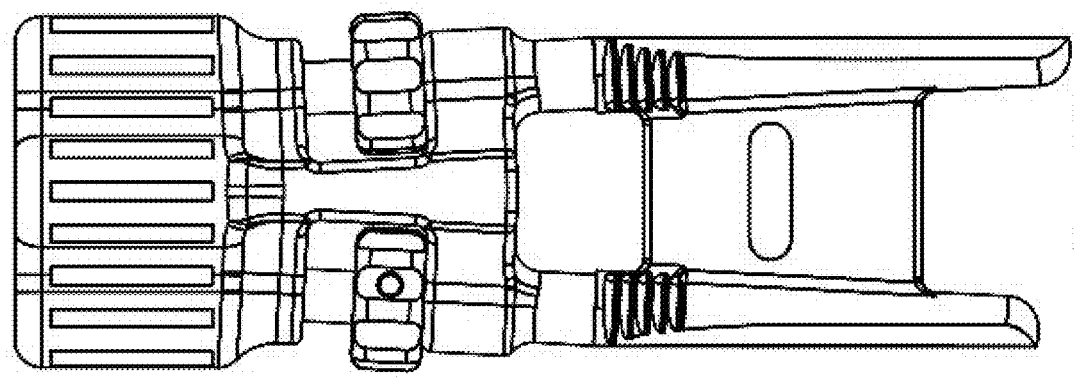
FIGS. 17 and 18 are front elevation views of the inserter of FIG. 15 with the implant of FIG. 1.
Figure 17:
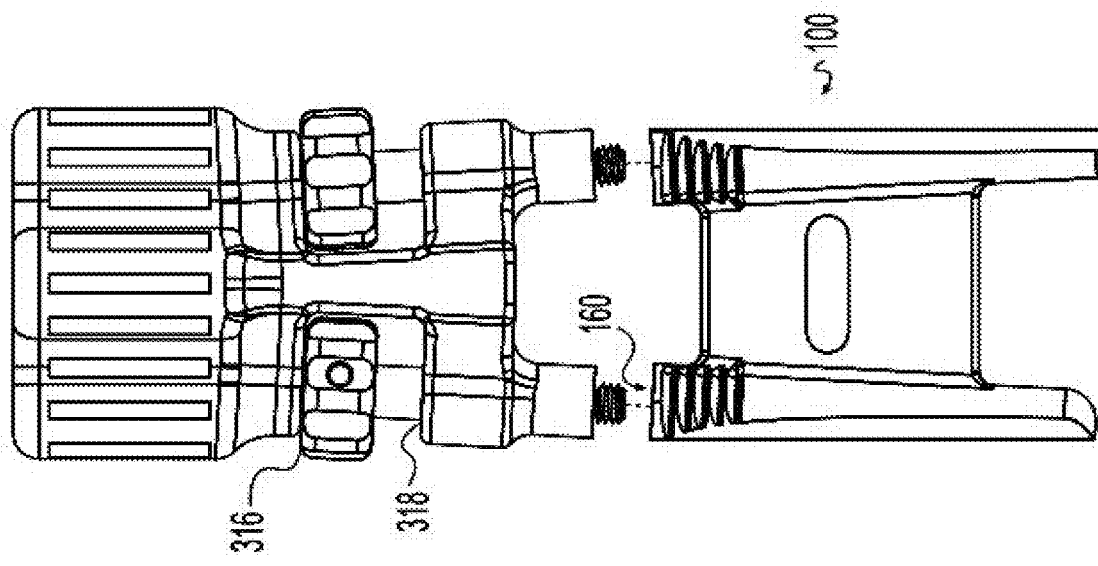
Figure 16:
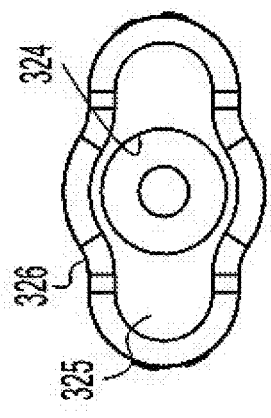
FIG. 16 is a top view of the inserter of FIG. 15.
Figure 15:
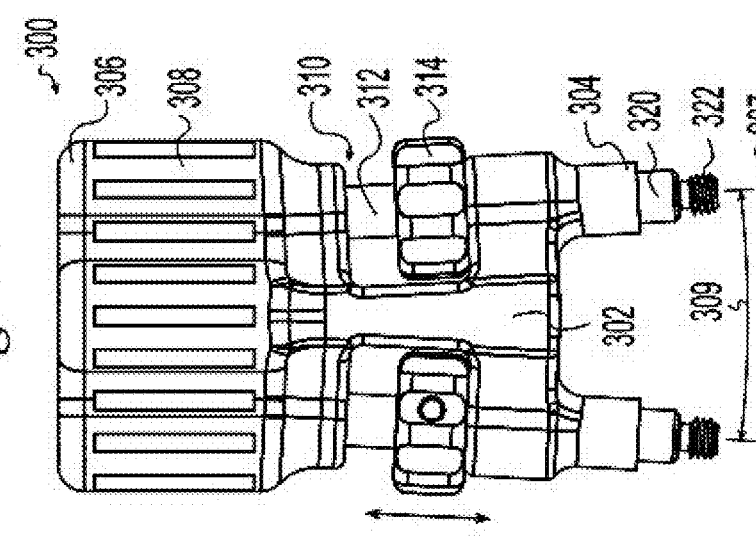
FIG. 15 is a front elevation view of an example of an inserter for the bone implant of FIG. 1.
Figure 19:
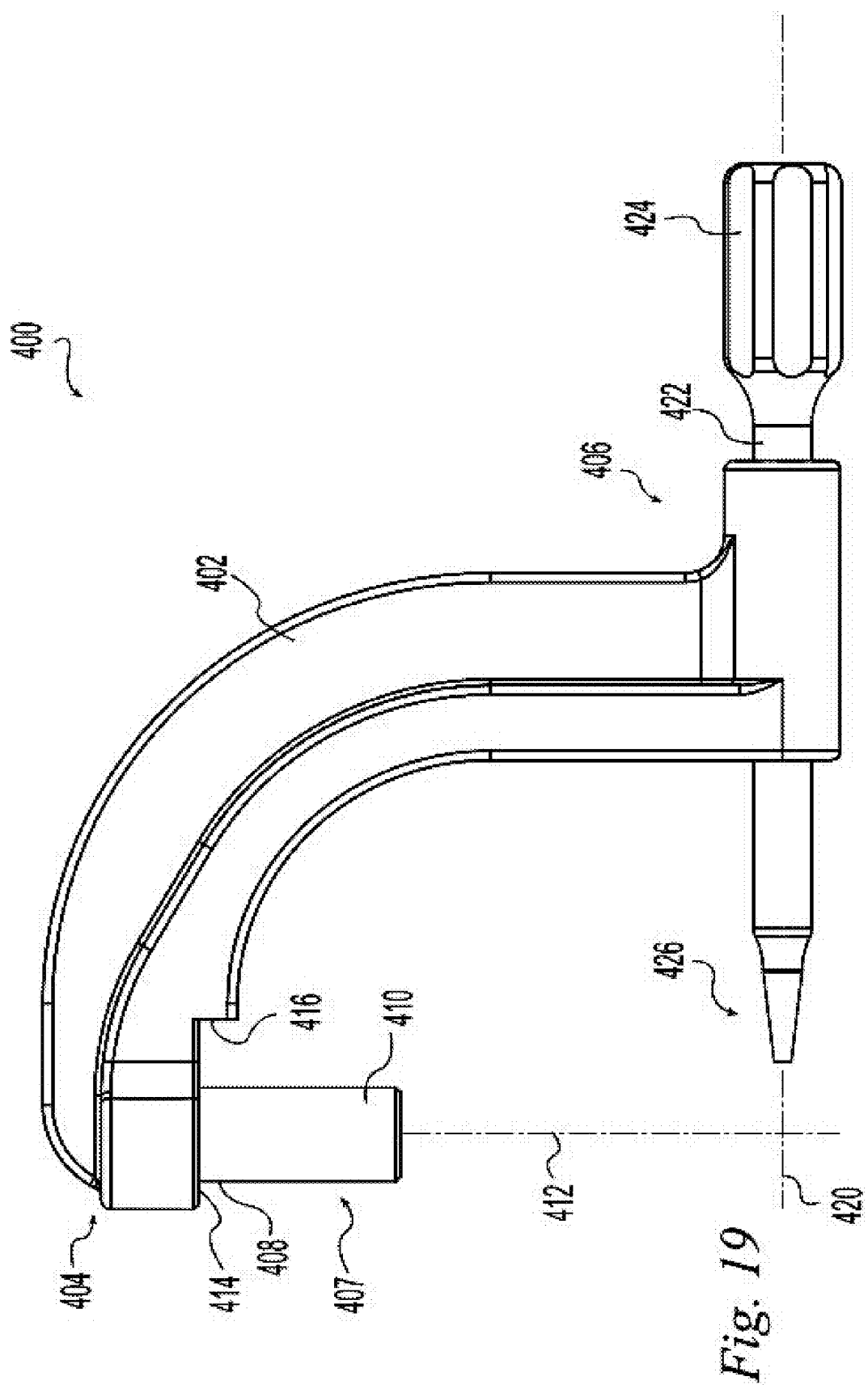
FIG. 19 is a front elevation view of an example of a guide for the bone implant of FIG. 1.

The inserter 300 is joined to the fastener 100 by first sliding the locking bolts 312 proximally until the knobs 314 abut the proximal margin 316 of the window 310 as shown in FIG. 17. The threaded portion 322 may then be inserted into the cavity 160 of the fastener 100. Each knob 314 is then rotated to thread the locking bolt 312 into the cavity 160 and secure the fastener 100 to the inserter 300 as shown in FIG. 18.

Referring to FIGS. 19-22, a guide 400 is engageable with the inserter to guide placement of an elongate member into or through the aperture 118 of the fastener 100. As used herein, a "guide" refers to a part, component, member, or structure designed, adapted, configured, or engineered to guide or direct one or more other parts, components, or structures. A guide may be part of, integrated with, connected to, attachable to, or coupled to, another structure, device, or instrument. In one embodiment, a guide may include a modifier that identifies a particular function, location, orientation, operation, type, and/or a particular structure of the guide. Examples of such modifiers applied to a guide, include, but are not limited to, "pin guide" that guides or directs one or more pins, a "cutting guide" that guides or directs the making or one or more cuts, a "deployment or insertion guide" that guides or directs the deployment, installation, or insertion of a fastener and/or implant, a "cross fixation guide" that guides deployment of a fastener or fixation member, and the like.

In certain embodiments, the guide may be referred to as a cross guide or cross fixation guide as the elongate member may be deployed transverse to the fastener 100. The elongate member may be a pin, screw, drill, wire or other member. In one embodiment, the elongate member may be a fixation member. For example, the guide 400 may be used to place a guide wire through the aperture and the guide wire may be used to insert a cannulated screw.

In one embodiment, the cross guide 400 includes an arcuate guide body 402 having at one end an engagement member 404 and at an opposite end a guide member 406. The engagement member 404 is configured to rotationally couple to the inserter 300. In the illustrative example of FIGS. 19-22, the engagement member 404 includes a pin 407 extending distally from the guide body 402 from a proximal end 408 to a distal end 410 and defining an engagement axis 412. As used herein, an "engagement axis" refers to an axis about which one apparatus, instrument, structure, device, component, member, system, assembly or module engages with another apparatus, instrument, structure, device, component, member, system, assembly or module either permanently or temporarily.

As used herein, an "pin" refers to an elongated structure. In certain embodiments, a pin can be used to connect two structures or serve as a bearing between two structures. In certain embodiments, a pin can be configured to support a load (including a tension, compression, shear, torsion, and/or bending load). In certain embodiments, a pin may be a cylindrical structure that is thinner that connected structures. A pin can serve a variety of functions and may include a modifier identifying a particular function for example certain solutions may use alignment pins, attachment pins, securement pins, or the like. Pins may serve a temporary or permanent structural purpose. Pins can be used in a variety of devices, components, apparatus, and systems, including but not limited to, fixation plates, measurement instruments, pin guides, cutting guides, surgical instrumentation, and the like. A pin can serve as a fastener either temporarily or permanently. One example of a pin is a Kirschner wire ("K-wire").

A pin can have a variety of geometric cross-sectional shapes, including, but not limited to a circle, an ellipse, an ovoid, or other circular or semi-circular shape, as well as a rectangle, a square, or other polygon. A pin has two ends one end can be blunt and the other end may come to a point. A pin can be made from a variety of materials including, metal, plastic, ceramic, wood, fiberglass, or the like. A pin may also be formed of any biocompatible materials, including but not limited to biocompatible metals such as Titanium, Titanium alloys, stainless steel alloys, cobalt-chromium steel alloys, nickel-titanium alloys, shape memory alloys such as Nitinol, biocompatible ceramics, and biocompatible polymers such as Polyether ether ketone (PEEK) or a polylactide polymer (e.g. PLLA) and/or others.

The guide 400 includes a stop such as an axial stop and a rotational stop to aid in positioning the guide 400 relative to the inserter 300. As used herein, a "stop" refers to an apparatus, instrument, structure, member, device, component, system, or assembly structured, organized, configured, designed, arranged, or engineered to prevent, limit, impede, stop, or restrict motion or movement and/or operation of the another object, member, structure, component, part, apparatus, system, or assembly.

In the illustrative example of FIGS. 19-22, a shoulder 414 formed near the proximal end 408 of the pin 407 serves as the axial stop and a side surface 416 transverse to the shoulder 414 and formed on the guide body 402 serves as the rotational stop. The guide member 406 defines a cross fixation insertion axis 420 transverse to the engagement axis 412 and along which a fixation member may be guided to pass through or into the fastener aperture 118.

In the illustrative example of FIGS. 19-22, the guide member includes a passage through the guide body 402 defining the cross fixation insertion axis 420 and a sleeve 422 received in the passage in axial sliding relationship. As used herein, a "sleeve" refers to structure that is narrow and longer longitudinally than the structure is wide. In certain embodiments, a sleeve serves to surround, enclose, wrap, and/or contain something else. In certain embodiments, a sleeve may surround, enclose, wrap, and/or contain a passage or void. (Search "sleeve" on wordhippo.com. WordHippo, 2021. Web. Accessed 15 Nov. 2021. Modified.) In certain embodiments, the term sleeve may be preceded by and adjective that identifies the structure, implement, component or instrument that may be used with, inserted into or associated with the sleeve. For example, a "pin sleeve" may be configured to accept a pin or wire such as a K-wire, a "drive sleeve" may be configured to accept a drill or drill bit, a "fixation member sleeve" may be configured to accept a fastener or fixation member.

The sleeve 422 includes an axial through passage, proximal handle portion 424 and a distal leading end 426 forming a tapered tip. The axial through passage is sized to guide a guide wire (e.g., a "K-wire") along the cross fixation insertion axis 420. The sleeve may be translated along the axis 420 relative to the guide body 402 to position the leading end 426 at a desired spacing from a bone.

The cross guide 400 is coupled to the inserter 300 by inserting the pin 407 into the socket 324 until the shoulder 414 abuts the top surface 325 of the inserter handle 308 as shown in FIG. 20. Thus assembled, the cross fixation insertion axis 420 is aligned with the center of the fastener aperture 118. The cross guide 400 may be rotated relative to the inserter 300 about the engagement axis 412 through an infinite number of angular positions between a first angular position shown in solid line in FIGS. 21 and 22 and a second angular position shown in dashed lines. In one embodiment, the guide and inserter define stops between them limiting the angular positions. For example, a fixation member to be inserted through the fastener aperture 118, such as screw 636 in FIG. 36, has a longitudinal axis and a transverse dimension normal to the longitudinal axis.

The fixation member may be inserted into or through the aperture 118 at an included angle between the longitudinal axis of the fixation member and the aperture length axis ranging from 90 degrees to a value corresponding to a projected length of the aperture along the fixation member longitudinal axis equal to or greater than the fixation member transverse dimension. In one embodiment, the angular stops limit the rotation of the guide to be within this range so it is guaranteed that the fixation member will fit through the aperture. In the illustrative example of FIGS. 19-22 the first and second angular positions are limited by abutment of the side surface 416 of the cross guide with the peripheral edge 326 of the inserter 300.

Figure 25:
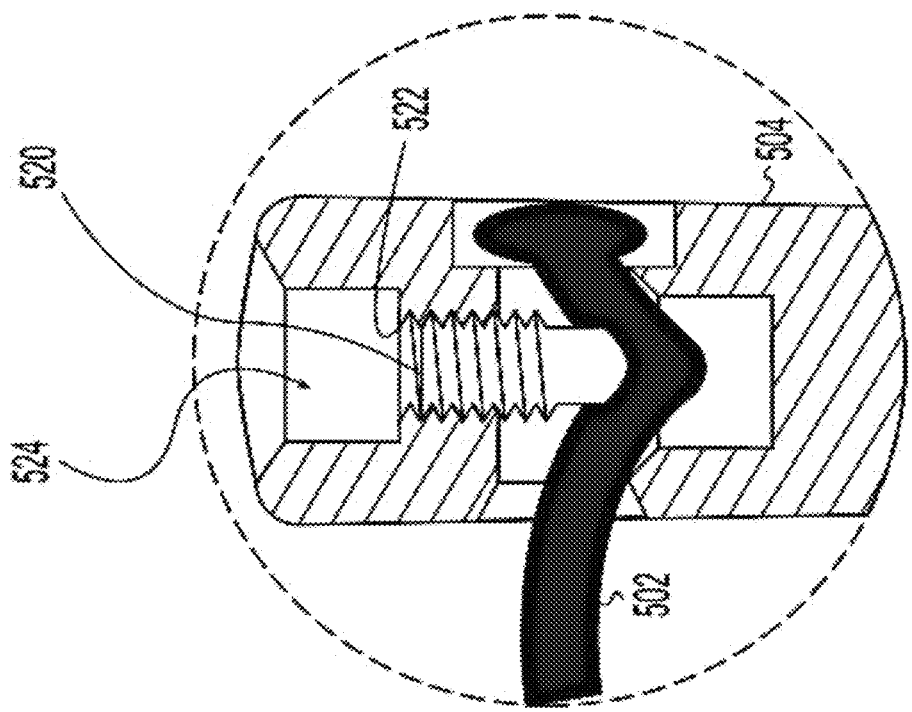
FIG. 25 is a detail view of the bone implant of FIG. 25.
Figure 24:
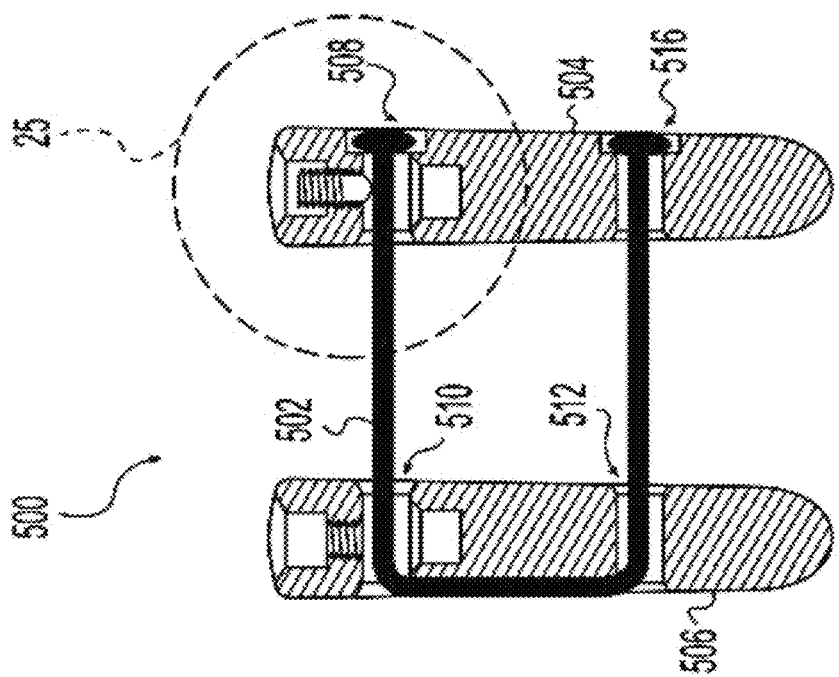
FIG. 24 is a front elevation view of the bone implant of FIG. 23.
Figure 23:
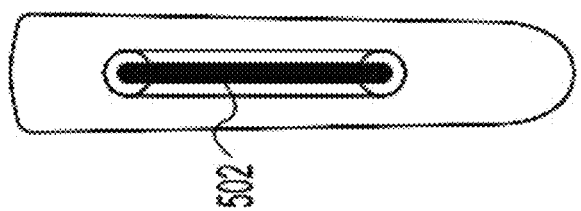
FIG. 23 is a side elevation view of an alternative example of the bone implant of FIG. 1.

FIGS. 23-25 depict another illustrative example of a fastener 500 according to one example of the present disclosure in which the rigid body 104 of fastener 100 has been replaced with a flexible member 502. The fastener includes first and second legs 504, 506. The flexible member 502 connects to axially spaced first and second connectors on the first leg 504 and passes through a receiver on the second leg 506 in sliding relationship to permit the angle between the fastener legs to be varied between arbitrary angles and to facilitate equal tensioning of the flexible member 502. In the illustrative example of FIGS. 23-25, the flexible member 502 is attached at a first location 508 on the first leg 504, extends to the second leg 506, passes through a first passage 510 in the second leg, extends axially along a portion of the second leg, passes through a second passage 512 in the second leg, and returns to the first leg 504 where it is attached at a second location 516. The flexible member 502 is able to slide freely within the passages 510, 512 in the second leg to allow the fastener legs 504, 506 to be variably angled relative to one another and so that tension in the flexible member is distributed equally throughout the flexible member 502. The fastener 500 may include a tensioning device operable to shorten the portion of the flexible member 502 that extends outwardly from the first leg 504. In the illustrative example of FIGS. 23-25, the first leg 504 includes a tensioning member operable to shorten the flexible member, such as for example by pressing the flexible member into the socket 524. For example, a tensioning screw 520 may be engaged with the threaded portion 522 of the socket 524. The flexible member 502 is attached to the first leg 504 so that it passes through the threaded portion 522 distal to the tensioning screw 520. Advancing the tensioning screw 520 presses the flexible member distally into the socket causing a portion of the flexible member 502 to be pulled into the first leg 504 and thus shortening the portion of the flexible member 502 that extends outwardly from the first leg 504. In use, for example, holes may be formed in the bone using a hole guide as in the preceding examples. The legs 504, 506 may be attached to a driver, for example like that of FIG. 15, and inserted into the bone holes. Tensioning screw 520 may then be inserted and advanced to shorten the flexible member and compress the bone.

Figure 26:
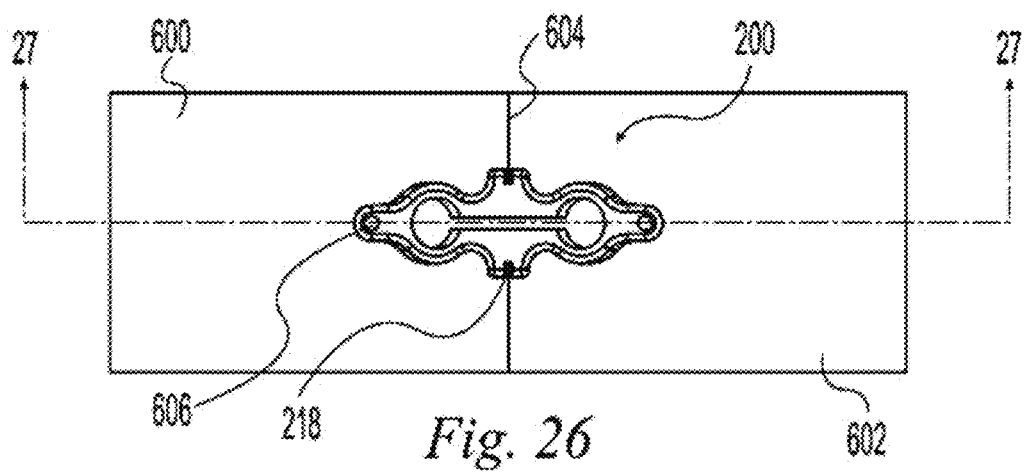
FIGS. 26-37 illustrate an example of a surgical method utilizing the implant of FIG. 1.

FIGS. 26-37 illustrate a method of using the fastener and instruments of FIGS. 1-22. Referring to FIG. 26, first and second bone portions 600, 602 abut at an interface 604 such as a joint articular surface, fracture, osteotomy cut plane, or other interface. The hole forming guide 200 is positioned over the bone portions with the alignment notches 218 aligned with the interface 604 to center the guide 200 over the interface 604. Fixation pins 606 may be placed in holes 220 in the guide 200 to secure the guide 200 to the bone portions.

Figure 27:
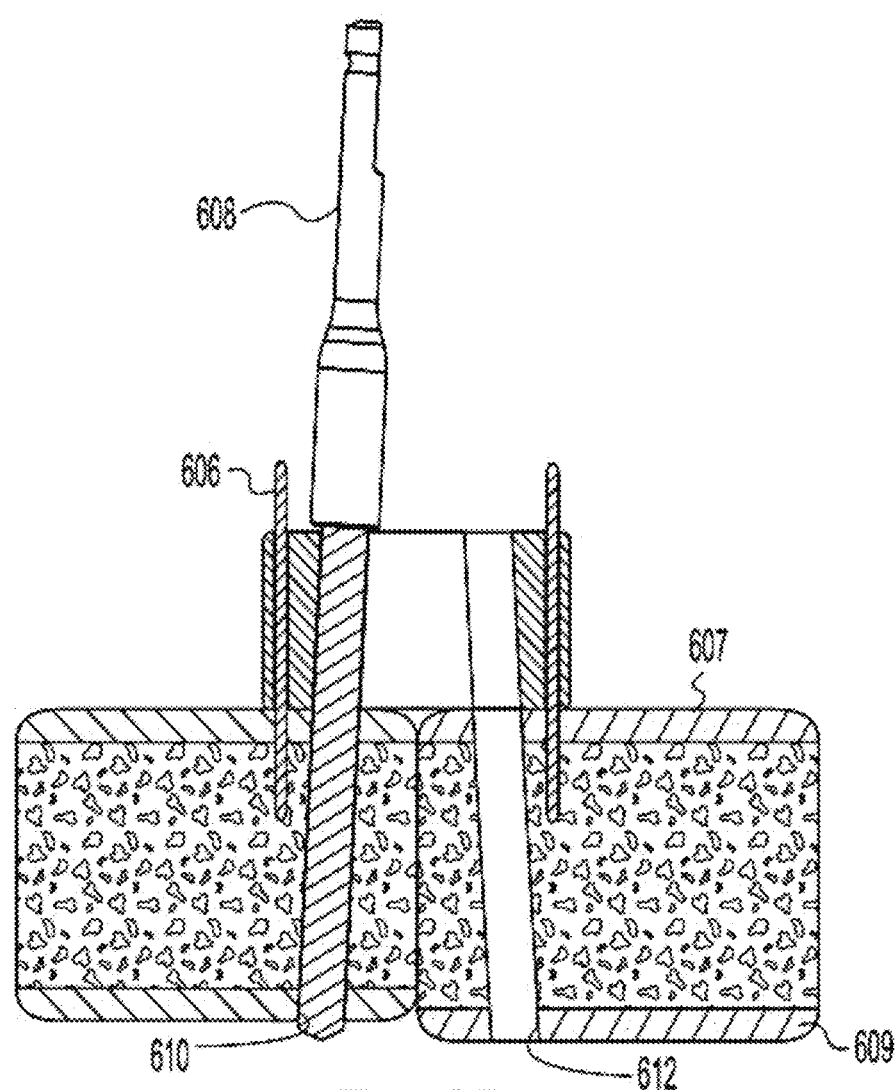

Referring to FIG. 27, a drill 608 is guided in the guide holes 208, 210 to form corresponding holes 610, 612 in the bone. In one embodiment, these holes pass through the bones so that the legs of the fastener 100 will engage the bone portions bi-cortically at the proximal and distal cortices 607, 609.

Figure 28:
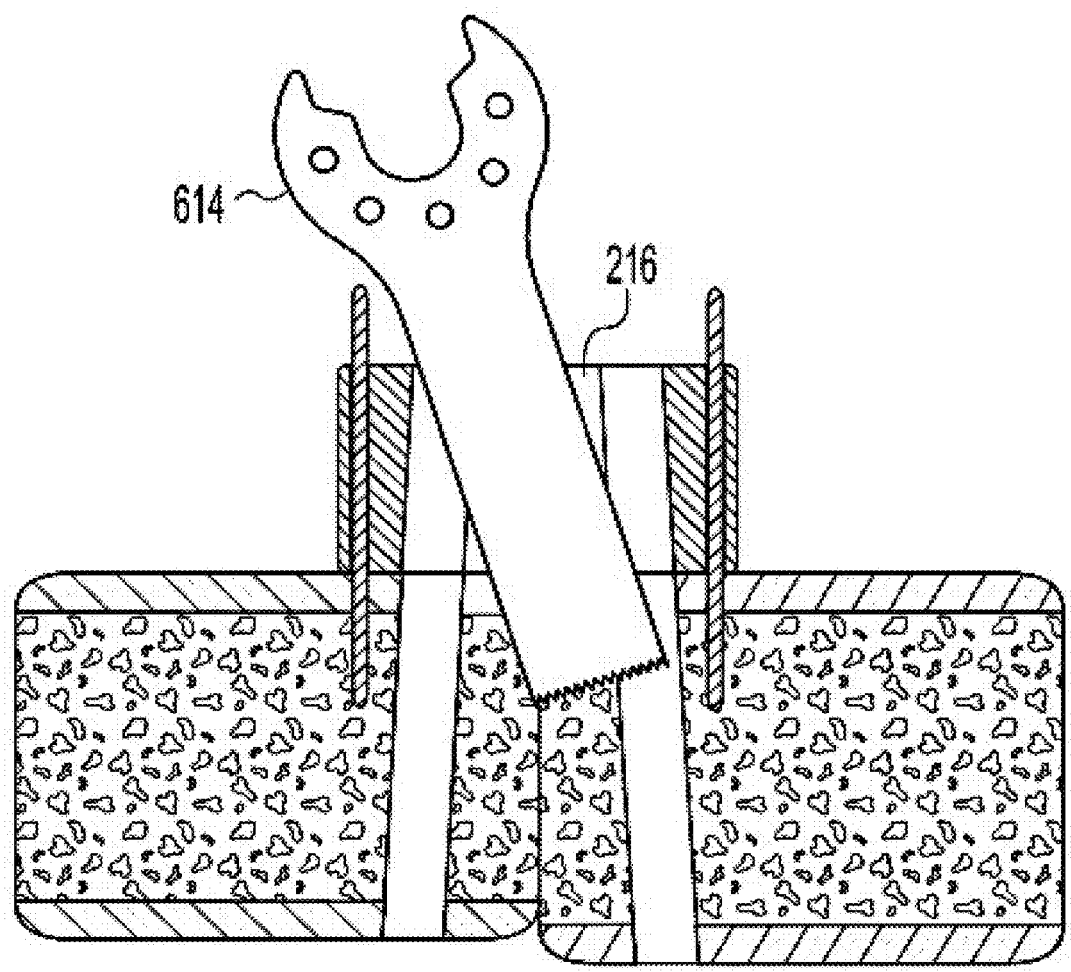
Figure 29:
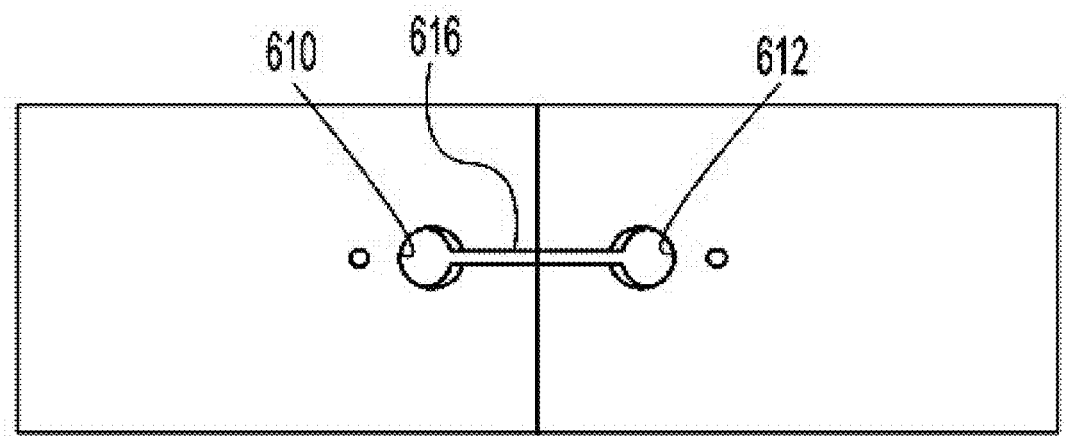

Referring to FIGS. 28 and 29, a saw blade 614 is guided in the saw slot 216 of the guide 200 to form a bone slot 616 to ease insertion of the fastener body through the proximal cortex. In one embodiment, the saw slot may only extend through the proximal bone cortex since only a proximal slot is needed to insert the fastener body.

Figure 30:
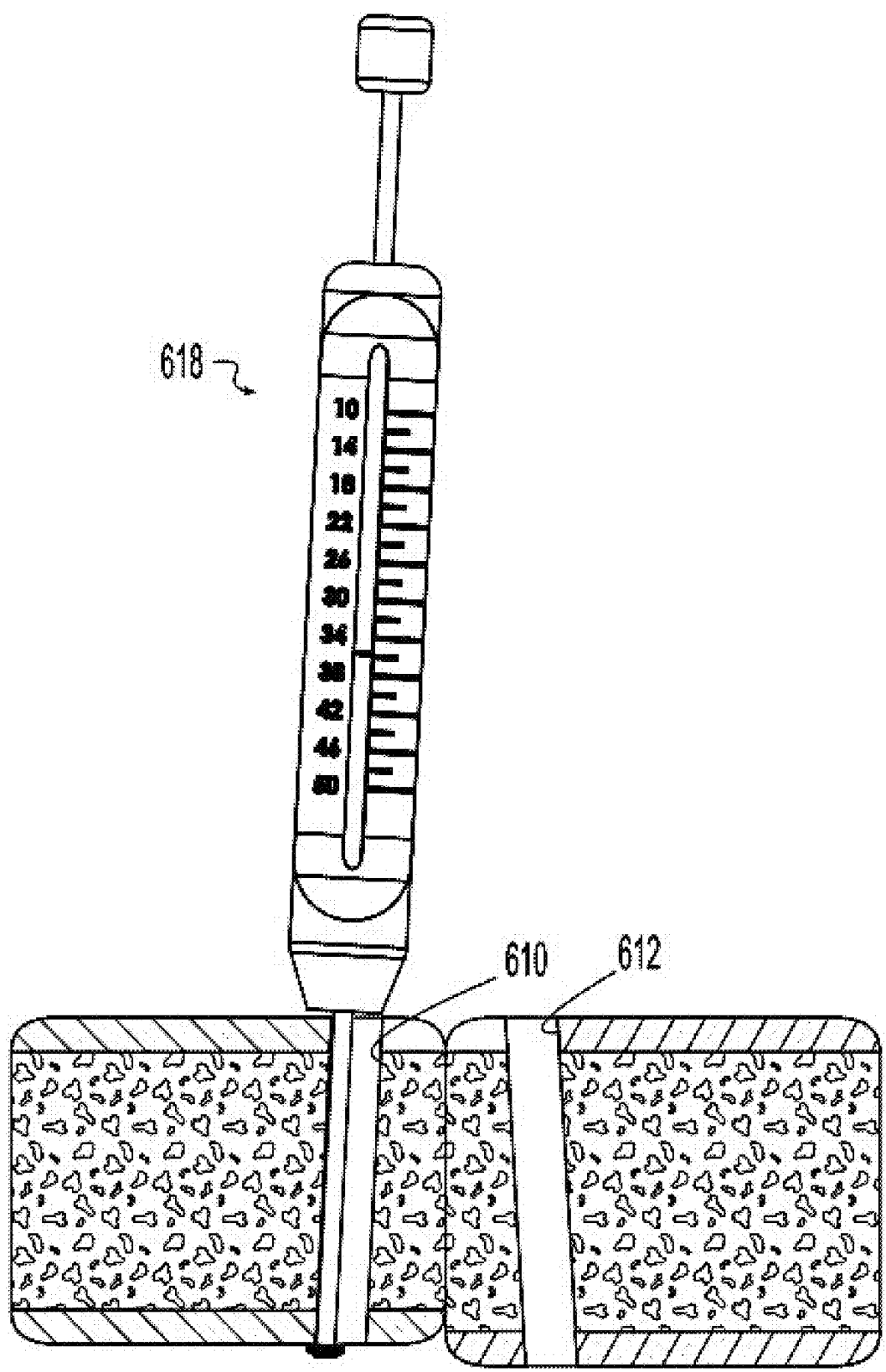

Referring to FIG. 30, a depth gauge 618 is used to probe the bone holes 610, 612 to determine their depth as an aid in selecting a fastener of the appropriate size to provide bi-cortical fixation. Depending on the shape of the bone portions, the holes may have different depths and may receive a fastener having different length legs.

Figure 31:
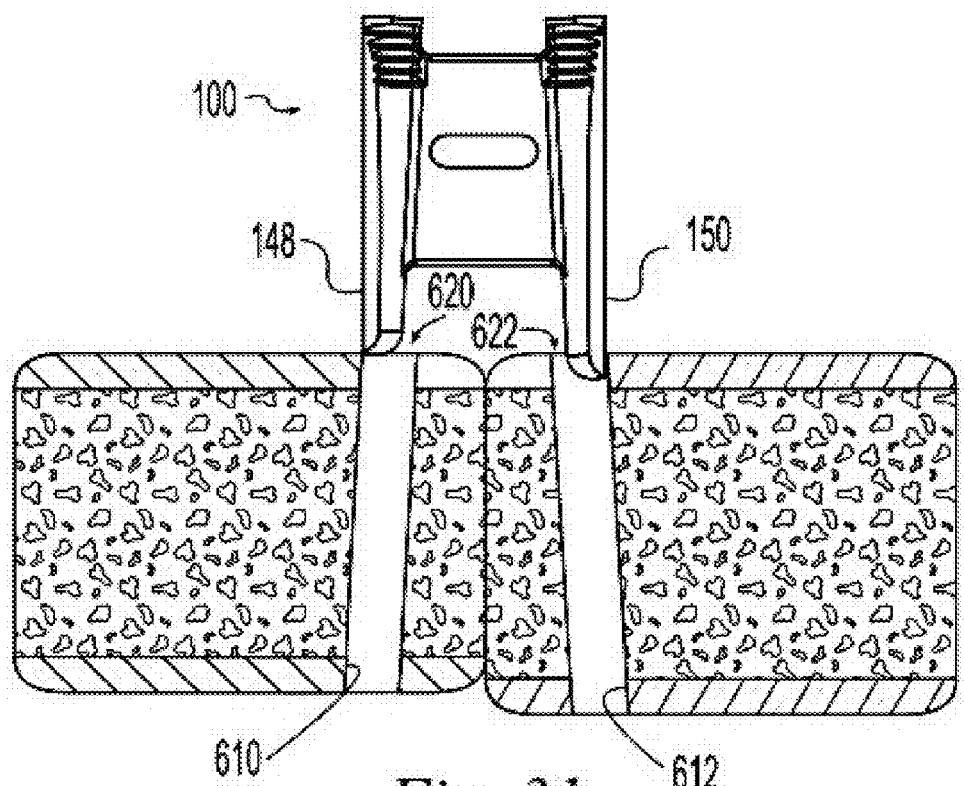
Figure 32:
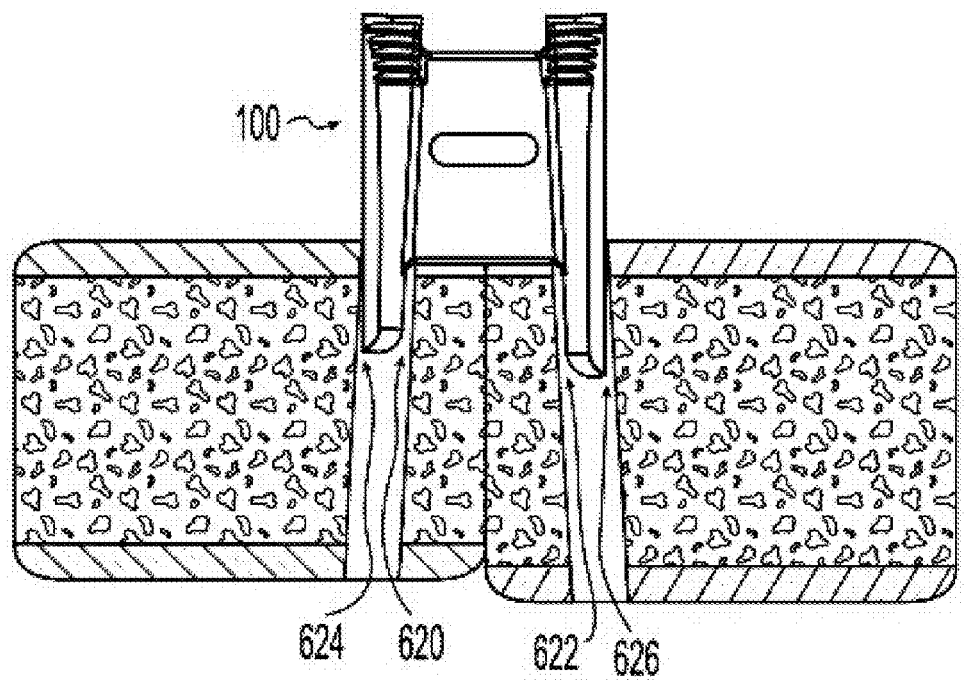

Referring to FIGS. 31 and 32, a fastener 100 is started into the bone holes 610, 612. The inserter 300 has been omitted from the figures to simplify the drawings. The outboard surfaces 148, 150 of the fastener legs are sized to match the proximal spacing of the outboard bone hole walls. Since outboard surfaces 148, 150 are parallel, they stay in contact with the proximal portion of the bone holes 610, 612 as the fastener is advanced into the bone portions. Inboard gaps 620, 622 are present between the fastener legs and the bone holes. Outboard gaps 624, 626 occur between the fastener legs and the bone holes distal of the proximal edge of the bone holes as the fastener is advanced.

Figure 33:
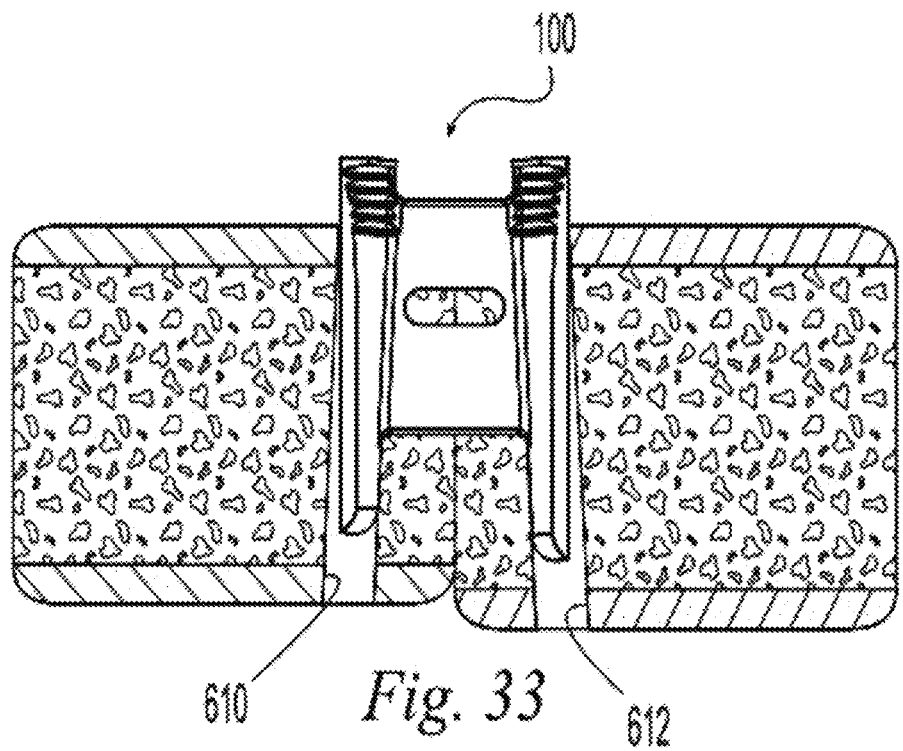
Figure 34:
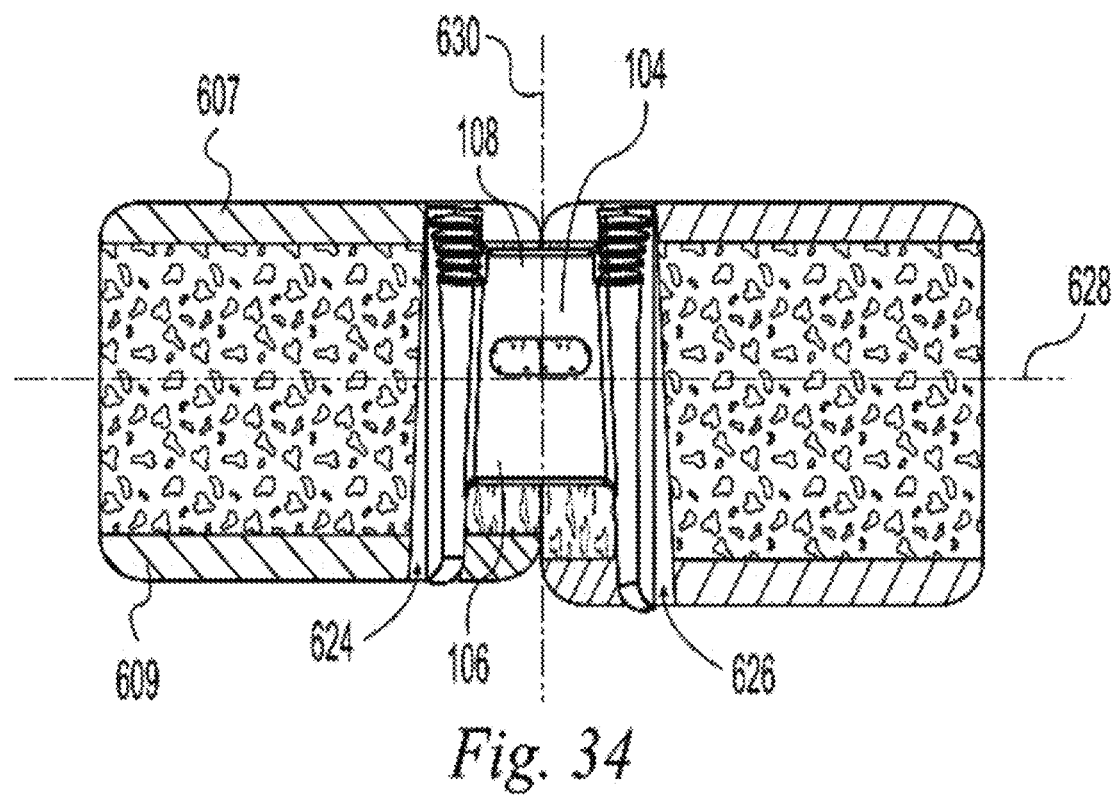

Referring to FIGS. 33 and 34, the inboard gaps 620, 622 diminish as the fastener is advanced until at some point in the fastener's travel, the fastener leg inboard surfaces 128, 130 contact the inboard bone hole walls. Since the inboard surfaces 128, 130 diverge at the same angle as the bone holes 610, 612, the fastener leg inboard surfaces 128, 130 contact the bone all along the length of the portions of the legs that have been inserted. Further advancing the fastener will compress the bone between the fastener legs uniformly along the fastener legs proximally to distally. In other words, as the fastener is further advanced, the bone is compressed between the fastener legs normal to the insertion direction the same amount at every point along the fastener legs proximally to distally. For bones having a longitudinal axis 628 normal to the insertion direction 630, the bone portions will be compressed axially relative to the longitudinal axis 628. The amount of compression can be tailored by setting the spacing of the inboard surfaces of the bone holes 610, 612 relative to the fastener leg inboard surfaces 128, 130. With the inboard bone hole surfaces further apart, the inboard fastener surfaces will contact the bone holes earlier in the fastener's travel and further advancing the fastener to a final resting position will cause relatively more compression. Alternatively, with the inboard bone hole surfaces closer together, the inboard leg surfaces will contact the bone holes later in the fastener's travel and further advancing the fastener to the same final resting position will cause relatively less compression. In one aspect, the fastener 100 is seated with the trailing ends of the fastener legs flush with or below the bone surface to reduce irritation of surrounding tissues. In one embodiment, the fastener 100 is seated with the trailing end 108 of the body below flush and, in one embodiment, below the proximal cortex 607 to allow for cortical healing above the fastener body 104. To remove the fastener, it is pulled proximally. The sharpened trailing edge of the body 104 aids in passing the body through any bone that has grown over the body 104. In one embodiment, the leading end 106 of the body stays inside the bone and, in one embodiment, the leading end 106 is above the distal cortex 609 to preserve bone strength.

Figure 35:
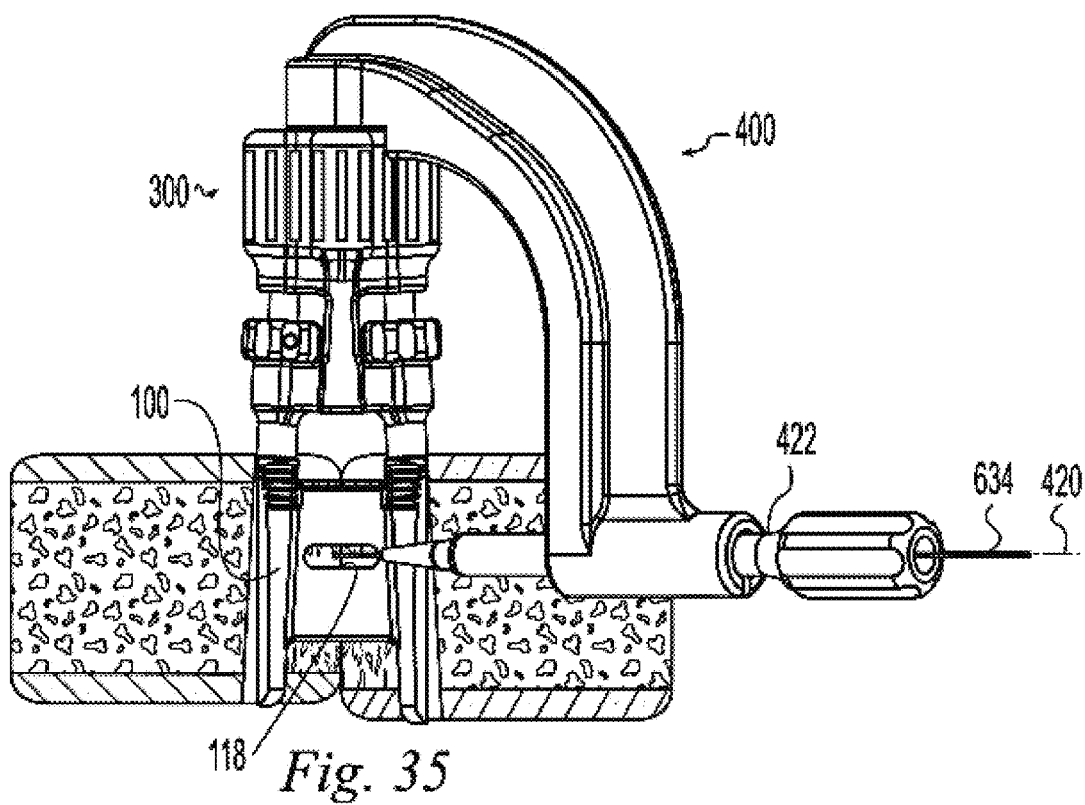
Figure 36:
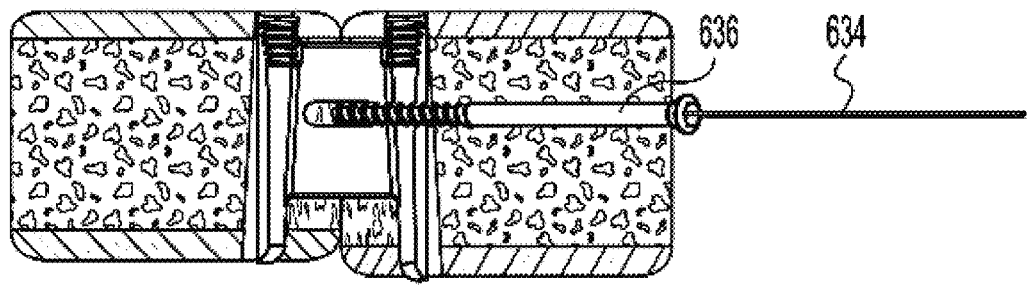
Figure 37:
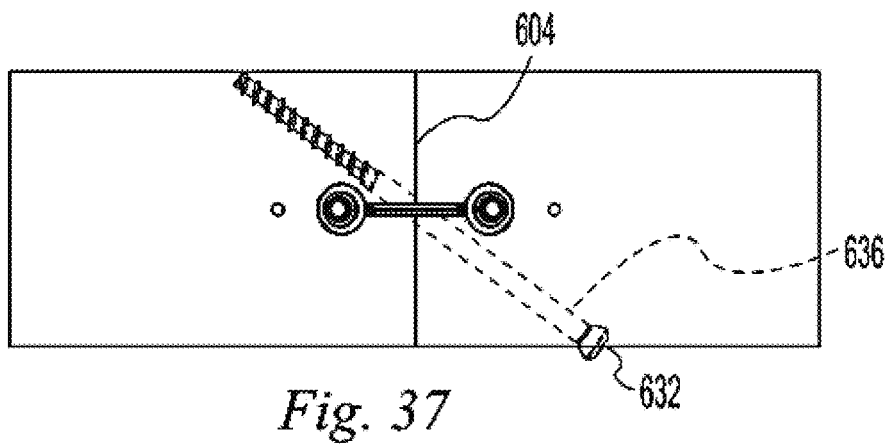

Referring to FIGS. 35-37, the cross guide 400 is mounted to the inserter 300 which is attached to the fastener 100. The cross guide 400 is pivoted relative to the inserter 300 to direct the cross fixation axis 420 in a desired direction. For example, it may be pivoted to align with a desired entry point on the bone 632. The rotation stops guarantee that the axis 420 is not angled so acutely as to prevent passage of a fixation member through the fastener aperture 118. The sleeve 422 is translated axially to position the sleeve close to the bone entry point 632 to stabilize a guide wire 634 as it is inserted through the sleeve, into the bone, and through the aperture 118. A fixation screw 636 is advanced over the guide wire 634 into the bone and through the aperture 118. The guide wire 634 is then removed. In one embodiment, the screw 636 is sized and positioned for bi-cortical fixation. In one embodiment, the screw passes through both bone portions to further stabilize the interface 604.

Figure 38:
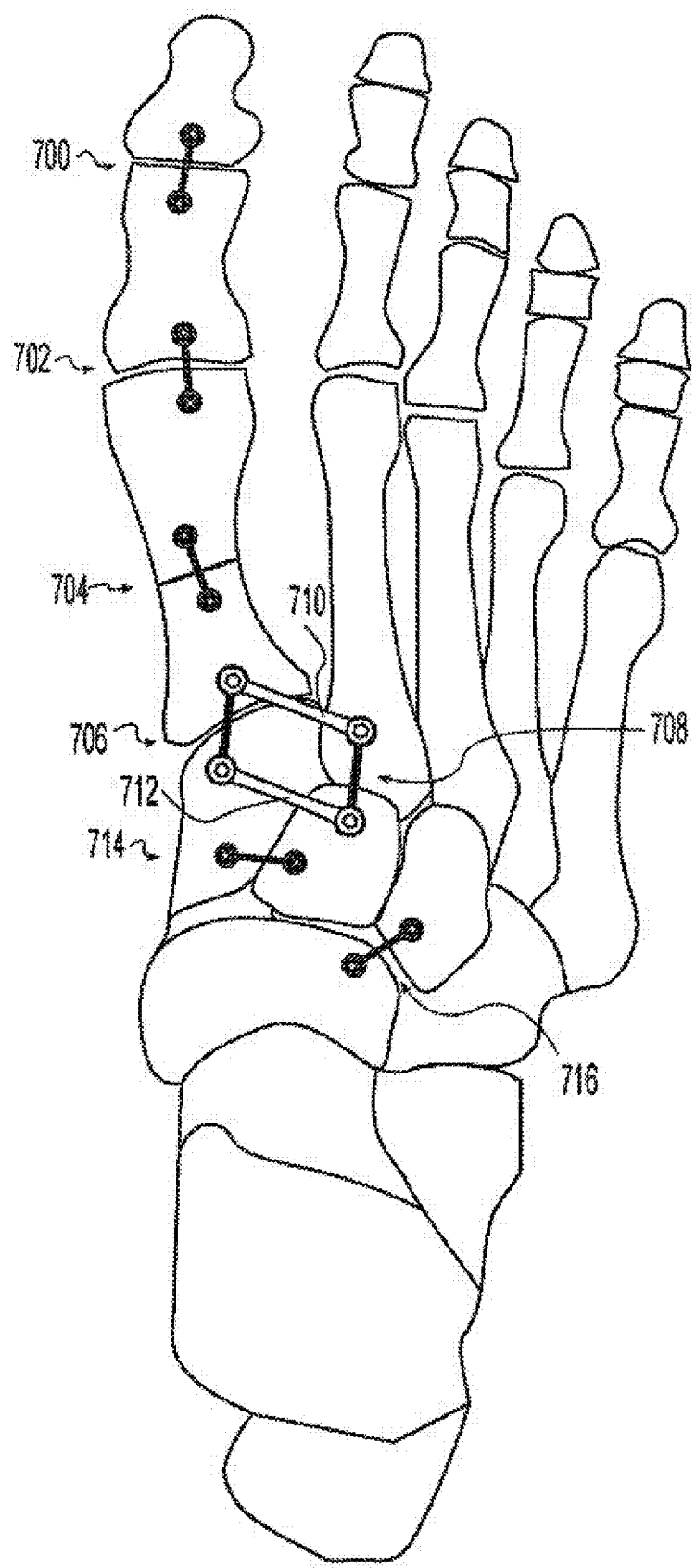
FIG. 38 illustrates an example surgical applications for the implant of FIG. 1.

The implants, instruments and methods of examples of the present disclosure may be used at many different locations within a patient to secure bone portions relative to one another and may further be used to form various constructs as shown in the illustrative example of FIG. 38. While illustrative, this example is not comprehensive and it will be apparent to one skilled in the art that these implants, instruments, and methods may be used anywhere two bone portions, or portions of a single bone, are to be secured. The size and proportion of the fastener may be varied to suit a particular anatomical location.

Referring to FIG. 38, a human foot illustrates various examples of applications for the present disclosure. A phalangeal fusion is indicated at 700. A metatarsophalangeal fusion is indicated at 702. A fusion of a midshaft fracture or osteotomy is indicated at 704. Metatarsocuneiform fusions are indicated at 706 and 708. In this example, joining elements 710, 712 have been attached between separate fasteners to form a construct in a lisfranc procedure. For example, the joining elements 710, 712 may be attached with screws threaded into the sockets in the proximal ends of the fastener legs. The joining elements 710, 712 may be rigid or flexible depending on the amount of constraint desired. Tarsal fusions are indicated at 714 and 716.

Figure 39:
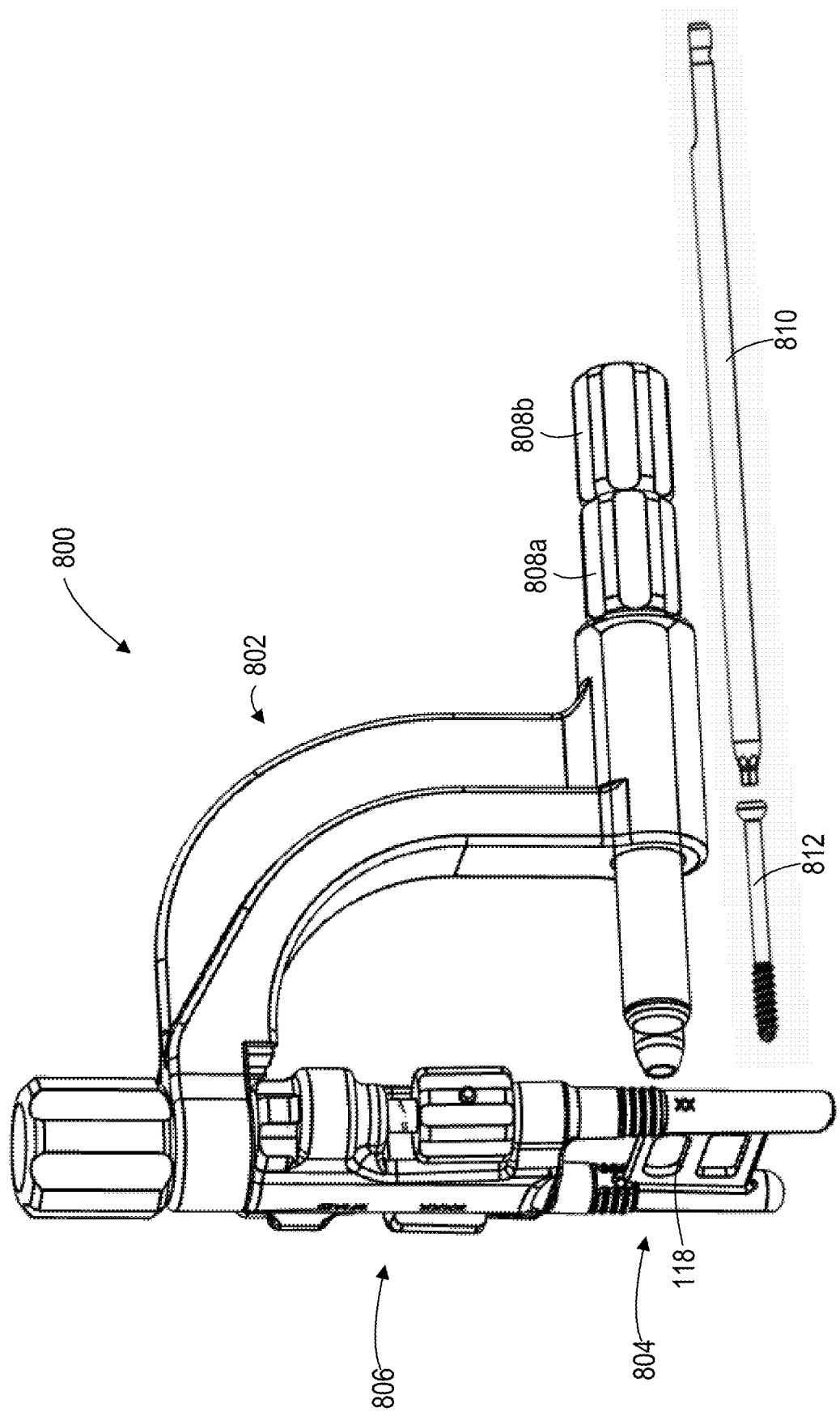
FIG. 39 is a perspective view of one embodiment of a guide.

FIG. 39 is a perspective view illustrating a system 800 for deploying a fixation member into a bone fastener, according to one embodiment of the present disclosure. In one embodiment, the system 800 includes a guide 802 and a fastener, such as a bone fastener 804. In certain embodiments, the system 800 may include a separate inserter 806. Alternatively, or in addition, the features, components, and/or functionality of an inserter may be included in the guide 802.

As used herein, an "inserter" refers to an apparatus, instrument, structure, device, component, system, or assembly that is structured, organized, configured, designed, arranged, or engineered to insert or deploy one or more components, parts, or devices. In certain embodiments, an inserter can be used to insert implants and/or prosthesis into tissue, organs, or parts of a patient. In certain embodiments, an inserter can also be used to extract, retract, reposition, or remove an implant and/or prosthesis.

FIG. 39 illustrates one or more of the tools, instruments, fixation members, and/or implants that may be used with the guide 802. For example, the system 800 may include one or more sleeves 808*a*,*b*, a driver 810, and/or an exemplary fixation member 812. In certain embodiments, the bone fastener 804 used in the system 800 may be substantially similar to the embodiments of the bone fastener 804 described herein. As used herein, a "driver" refers to a mechanical piece, component, or structure for imparting motion to another piece, component, or structure. ("driver." Merriam-Webster.com. Merriam-Webster, 2021. Web. 6 Jan. 2021. Modified.) In certain embodiments, a driver can be a wheel configured or connected to other parts such that rotation or motion of the driver causes motion of other interconnected or intercoupled parts of a component, system, apparatus, or device.

Figure 40:
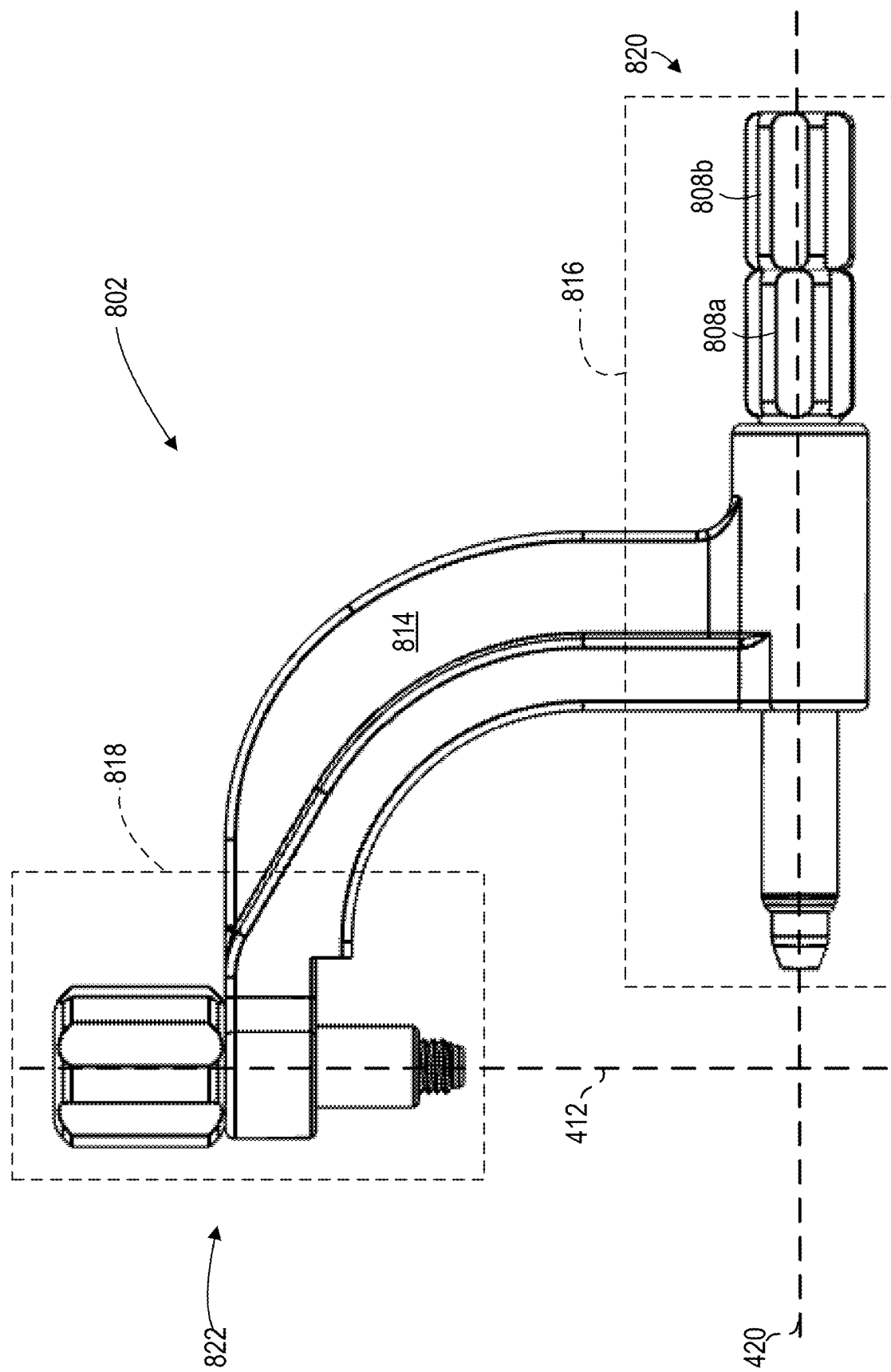
FIG. 40 is a side view of a guide according to one embodiment of the present disclosure.

FIG. 40 is a side view of a guide 802 according to one embodiment of the present disclosure. In one embodiment, the guide 802 includes a body 814, a guide member 816, and an engagement member 818. The body 814 has a proximal end 820 and a distal end 822.

As used herein, a "body" refers to a main or central part of a structure. The body may serve as a structural component to connect, interconnect, surround, enclose, and/or protect one or more other structural components. A body may be made from a variety of materials including, but not limited to, metal, plastic, ceramic, wood, fiberglass, acrylic, carbon, biocompatible materials, biodegradable materials or the like. A body may be formed of any biocompatible materials, including but not limited to biocompatible metals such as Titanium, Titanium alloys, stainless steel alloys, cobalt-chromium steel alloys, nickel-titanium alloys, shape memory alloys such as Nitinol, biocompatible ceramics, and biocompatible polymers such as Polyether ether ketone (PEEK) or a polylactide polymer (e.g. PLLA) and/or others. In one embodiment, a body may include a housing or frame or framework for a larger system, component, structure, or device. A body may include a modifier that identifies a particular function, location, orientation, operation, and/or a particular structure relating to the body. Examples of such modifiers applied to a body, include, but are not limited to, "inferior body," "superior body," "lateral body," "medial body," and the like. In one embodiment, the body 814 has an arc or acuate shape and may resemble an "arm" that extends between the proximal end 820 and the distal end 822.

The guide member 816 may facilitate or enable preparation of a site for deployment of a fixation member 812. Alternatively, or in addition, the guide member 816 may serve to guide deployment of a fixation member 812 to secure a bone fastener 804. In one embodiment, the guide member 816 may be coupled to the body 814 near the proximal end 820. In the illustrated embodiment, the guide member 816 is coupled to the body 814 at the proximal end 820.

In one embodiment, the guide member 816 includes a passage through the guide member 816 defining the cross fixation insertion axis 420 and one or more sleeves 808*a*,*b* received in the passage in axial sliding relationship. As used herein, "passage" refers to a duct, a vessel, an opening, a void, or other channel in a body of an apparatus, instrument, structure, member, device, component, system, or assembly. In certain embodiments, a passage is narrow and longer than the passage is wide. (Search "passage" on wordhippo.com. WordHippo, 2021. Web. Accessed 15 Nov. 2021. Modified.)

In one embodiment, a passage of the guide member 816 is sized to accept one or more sleeves 808. Each sleeve 808 may include an axial through passage having a cross-sectional diameter sized to permit the sleeve 808 to slide axially within the passage. In the illustrated embodiment, the sleeves 808*a*,*b* may each have different cross-sectional diameters that permit certain ones of the one or more sleeves 808*a*,*b* to fit within each other in a nested configuration such that a longitudinal axis of the sleeves 808*a*,*b* aligns with the fixation insertion axis 420.

In one embodiment, the engagement member 818 couples the guide 802 to the bone fastener 804. For example, in one embodiment the engagement member 818 engages the bone fastener 804 such that the guide member 816 is rotatable relative to the bone fastener 804 about an engagement axis 412 to a plurality of relative orientations. In another example, the engagement member 818 engages the bone fastener 804 such that the guide 802 is rotatable relative to the bone fastener 804 about an engagement axis 412 to a plurality of relative orientations.

As used herein, "orientation" refers to a direction, angle, position, condition, state, or configuration of a first object, component, part, apparatus, system, or assembly relative to another object, component, part, apparatus, system, or assembly. In certain embodiments, the relative orientations are orientations of the guide 802 and/or its members in relation to the bone fastener 804. In one embodiment, the engagement member 818 couples the guide 802 to the bone fastener 804 directly. In another embodiment, the engagement member 818 couples the guide 802 to the bone fastener 804 indirectly by way of an inserter 806. In one embodiment, the engagement member 818 may be coupled to the body 814 near the distal end 822. In the illustrated embodiment, the engagement member 818 is coupled to the body 814 at the distal end 822.

In certain embodiments, the engagement member 818 is configured to secure the guide member 816 and/or the guide 802 at any of the plurality of relative orientations. In one embodiment, the engagement member 818 may secure the guide member 816 at a desired relative orientation temporarily. For example, while a fixation member 812 is being deployed. In another embodiment, the engagement member 818 may secure the guide member 816 at a desired relative orientation permanently.

Figure 41:
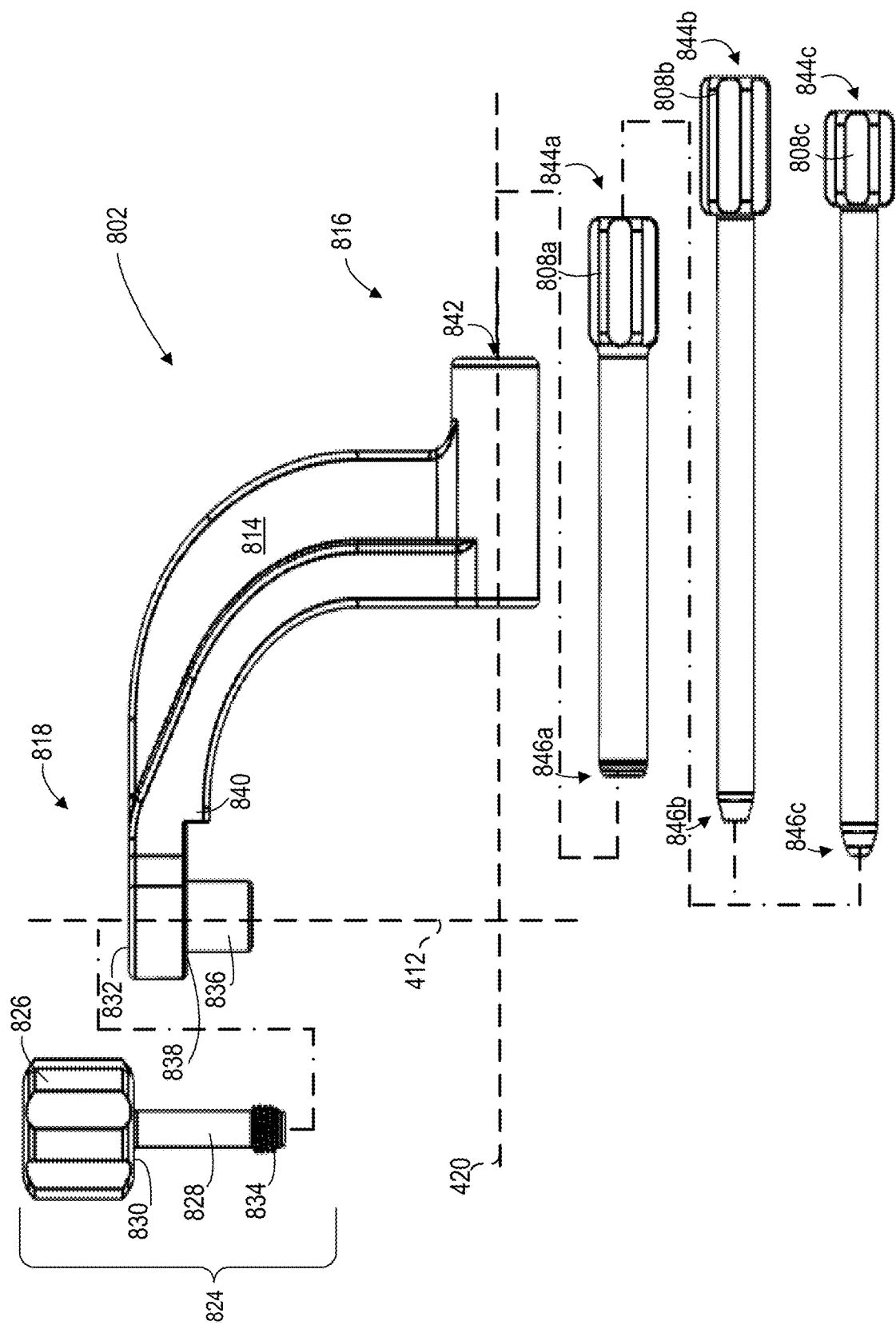
FIG. 41 is an exploded view of a guide according to one embodiment of the present disclosure.

FIG. 41 is an exploded view of a guide 802 according to one embodiment of the present disclosure. Details of one example embodiment of the guide member 816 and engagement member 818 are illustrated. In one embodiment, the engagement member 818 may include a lock mechanism 824. As used herein, a "lock" or "lock mechanism" refers to an object, member, structure, component, part, apparatus, system, or assembly that either alone or in combination with other parts or components prevents, limits, impedes, is in a fixed relationship to, stops, or restricts motion or movement and/or operation of the another object, member, structure, component, part, apparatus, system, or assembly.

The lock mechanism 824 may include a handle 826 and a shaft 828. As used herein, a "handle" refers to a structure used to hold, control, or manipulate a device, apparatus, component, tool, or the like. A "handle" may be designed to be grasped and/or held using one or two hands of a user.

As used herein, a "shaft" refers to a long narrow structure, device, component, member, system, or assembly that is structured, organized, configured, designed, arranged, or engineered to support and/or connect a structure, device, component, member, system, connected to each end of the shaft. Typically, a shaft is configured to provide rigid support and integrity in view of a variety of forces including tensile force, compression force, torsion force, shear force, and the like. In addition, a shaft can be configured to provide rigid structural support and integrity in view of a loads including axial loads, torsional loads, transverse loads, and the like. A shaft may be oriented and function in a variety of orientations including vertical, horizontal, or any orientation between these and in two or three dimensions. A shaft may be made from a variety of materials including, but not limited to, metal, plastic, ceramic, wood, fiberglass, acrylic, carbon, biocompatible materials, biodegradable materials or the like. A shaft may be formed of any biocompatible materials, including but not limited to biocompatible metals such as Titanium, Titanium alloys, stainless steel, carbon fiber, combinations of carbon fiber and a metallic alloy, stainless steel alloys, cobalt-chromium steel alloys, nickel-titanium alloys, shape memory alloys such as Nitinol, biocompatible ceramics, and biocompatible polymers such as Polyether ether ketone (PEEK) or a polylactide polymer (e.g. PLLA) and/or others, or any combination of these materials.

The handle 826 facilitates a user to operating the lock mechanism 824. In one embodiment, the handle 826 is sized and configured to be grasped by a hand and/or fingers of a user. The handle 826 may include a shoulder 830. In one embodiment, the shoulder 830 contacts a superior surface 832 of the body 814 or a part of the body 814 near the distal end 822 when the lock mechanism 824 is engage or in use.

In one embodiment, the shaft 828 may pass through an opening (e.g., a through passage) in the body 814 as indicated by the exploded view lead lines. During use, the shaft 828 may be coaxial with the engagement axis 412. The shaft 828 is configured to engage a socket (see FIG. 44). The socket may be in an inserter 806 and/or in a bone fastener 804. In one embodiment, the shaft 828 may include threads 834. Where the threads 834 are external the socket may include corresponding internal threads.

As used herein, a "thread" or "screw thread" refers to a helical structure used to convert between rotational and linear movement or force and/or to connect or engage two structures. A screw thread can be a ridge that wraps around a cylinder in the form of a helix, referred to as a straight thread. A screw thread can also be a ridge that wraps around a cone shape, referred to as a tapered thread. A screw thread is a feature of a screw as a simple machine and also in use as a threaded fastener. A screw thread can provide one or both of the following functions: conversion of rotary motion or force into linear motion or force, and preventing or mitigating linear motion or force without corresponding rotation motion or force. In certain implementations of screw threads that convert a rotation force or torque into linear motion, or vice versa, the screw threads may be referred to as drive threads because of the drive function rotating the threads serves to extend or retract a structure linearly. External screw threads are those formed on an external surface of a structure, such as a cylinder or cone shaped structure. Internal screw threads are those formed on an internal wall or surface of a nut, substrate, or opening. The cross-sectional shape of a thread is often called its form or threadform (also spelled thread form). The thread form may be square, triangular, trapezoidal, or other shapes. The terms form and threadform can refer to other design aspects taken together (cross-sectional shape, pitch, and diameters) in addition to cross-sectional shape, but commonly refer to the standardized geometry used by the screw. Major categories of threads include machine threads, material threads, and power threads. Generally, triangular threadforms are based on an isosceles triangle. These threadforms are usually called V-threads or vee-threads because of the shape of the letter V. For 60° V-threads, the isosceles triangle is, more specifically, equilateral. For buttress threads, the triangle is scalene. The theoretical triangle shape for the thread form can be truncated to varying degrees (that is, the tip of the triangle is cut short). A V-thread in which there is no truncation (or a minuscule amount considered negligible) is called a sharp V-thread. Truncation occurs (and is codified in standards) for practical reasons. The mechanical advantage of a screw thread depends on its lead, which is the linear distance the screw travels in one revolution. In general, the lead of a screw thread may be selected so that friction is sufficient to prevent linear motion or force from being converted to rotary, that is so the screw does not slip or disengage even when linear force is applied, as long as no external rotational force is present. A "length of thread engagement" refers to a distance that one set of threads (external or internal) engages another set of one or more threads (external or internal). The tightening of a fastener's screw thread is comparable to driving a wedge into a gap until the wedge sticks fast through friction and slight elastic deformation. (Search 'screw thread' on Wikipedia.com Jul. 16, 2021. Modified. Accessed Aug. 17, 2021.)

In embodiments in which the socket is in the inserter 806, the shaft 828 may pass through the opening in the body 814 and engage the socket which positions at least a portion of the body between the threads 834 and the shoulder 830. In one embodiment, to operate the lock mechanism 824 a user rotates the handle 826 such that the threads 834 advance distally into the socket. As the shaft 828 advances distally within the socket, the shoulder 830 of the handle 826 pinches the body 814 towards the bone fastener 804 (and/or inserter 806).

In certain embodiments, the pinching of the body between the shoulder 830 and the bone fastener 804 (and/or inserter 806) abuts one or more surfaces of the body 814 (e.g., superior surface 832) against one or more surfaces of the lock mechanism 824 to create a press fit (also referred to as a friction fit or press fit) between the surfaces. In certain embodiments, this press fit is sufficient to retain the guide member 816 at one of the plurality of relative orientations about the engagement axis 412.

The engagement member 818 may be configured to rotationally couple to an inserter 806. In the illustrative example of FIG. 41, the engagement member 818 includes a pin 836 extending distally from the distal end 822 of the guide body 814 and aligned with the engagement axis 412. In one embodiment, the pin 836 extends distally from an inferior surface 838 of body 814 or the engagement member 818. In one embodiment, the pin 836 is configured to engage a cavity or socket of an inserter 806 connected to the bone fastener 804. In one embodiment, the pin 836 may engage a stepped cavity or a stepped socket of an inserter 806. As described above, the stepped cavity or stepped socket may include a smooth portion and a threaded portion.

The engagement member 818 may include an axial stop and a rotational stop to aid in positioning the guide 814 relative to the bone fastener 804 (and/or inserter 806). In the illustrative example of FIG. 41, the inferior surface 838 of the engagement member 818 serves as the axial stop and, in one embodiment, a side surface 840 transverse to the inferior surface 838 and formed on the guide body 814 may serve as a rotational stop.

The side surface 840 is one example of a stop that is configured to limit the plurality of relative orientations about the engagement axis to a range of angles such that deployment of the fixation member 812 will enter an aperture of the bone fastener 804. Those of skill in the art will recognize that a stop may be implemented in a variety of ways connection with, separate from, or in addition to the side surface 840 illustrated in FIG. 41. For example, the engagement member 818 may include a single stop having two ends or the engagement member 818 may include two or more stops.

In one embodiment, the guide member 816 defines a fixation axis 420 transverse to the engagement axis 412 and along which a fixation member may be guided to pass into or through a fastener aperture. The fixation axis 420 may also be referred to as a cross fixation insertion axis 420. The guide member 816 may be coupled to, connected to, and/or integrated with the guide 802 near the proximal end 820 of the guide 802.

The guide member 816 may include a passage 842 through the guide member 816 that aligns with the cross fixation insertion axis 420. The guide member 816 may also include one or more of a first sleeve 808a, a second sleeve 808b, and a third sleeve 808c. The first sleeve 808a may be coaxial with the cross fixation insertion axis 420 and have a cross sectional diameter less than a cross sectional diameter of the passage 842. The second sleeve 808b may be coaxial with the cross fixation insertion axis 420 and have a cross sectional diameter less than a cross sectional diameter of the first sleeve 808a. The third sleeve 808c may be coaxial with the cross fixation insertion axis 420 and have a cross sectional diameter less than a cross sectional diameter of the second sleeve 808b. In certain embodiments, the sleeves 808a,b,c may include external threads configured to engage with internal threads of a sleeve and/or the passage 842 that has a larger cross sectional diameter. In one embodiment, the first sleeve 808a fits axially within the passage 842 and either the second sleeve 808b or the third sleeve 808c fit axially within the first sleeve 808a. Alternatively, or in addition, the first sleeve 808a fits axially within the passage 842, the second sleeve 808b fits axially within the first sleeve 808a, and the third sleeve 808c fit axially within the second sleeve 808b.

Figure 42:
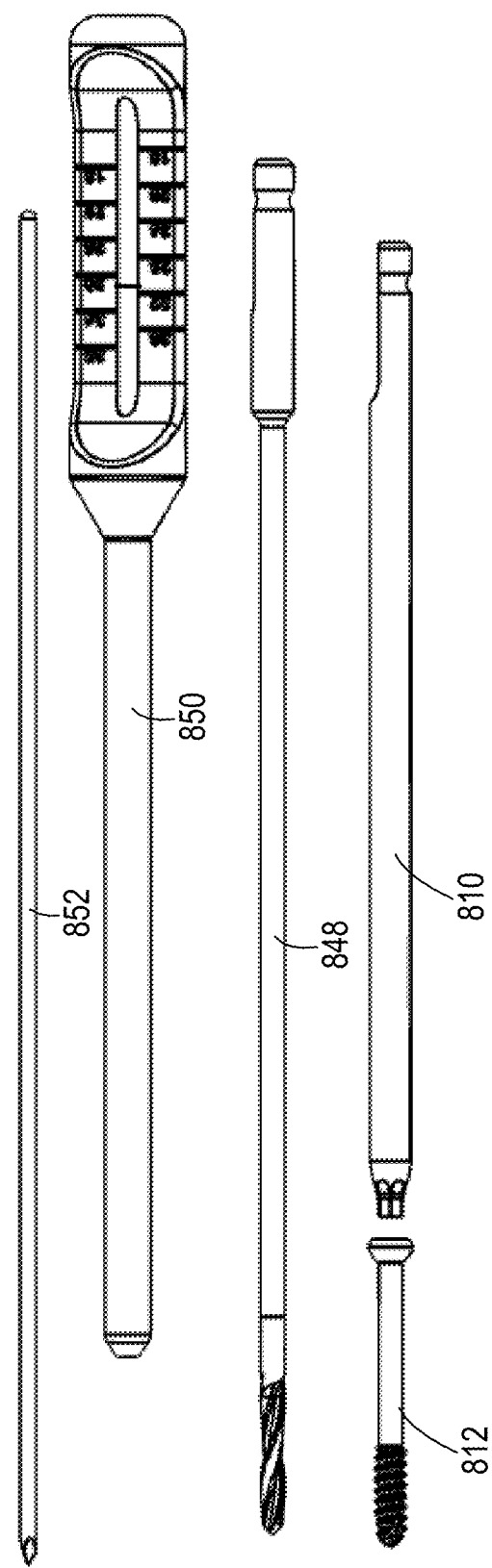
FIG. 42 includes examples of implants, fasteners, tools, and/or instruments that may be used with the guide.

In certain embodiments, each of the sleeves 808a,b,c may include a passage that extends from a proximal end 844a,b,c to a distal end 846a,b,c. The passages within the sleeves 808a,b,c may be sized and configured to accept one or more implants, fasteners, tools, and/or instruments for use in deploying a fixation member. Examples of these implants, fasteners, tools, and/or instruments include but are not limited to a driver 810 coupled to a fixation member 812, a fixation member 812, a drill bit 848, depth gauge 850, a pin 852 which is one example of a temporary fastener 852 (e.g., a K-wire), or the like. FIG. 42 includes examples of implants, fasteners, tools, and/or instruments that may be used with the guide 802. Each of these example implants, fasteners, tools, and/or instruments may be canulated, in certain embodiments.

In one embodiment, one or more of the sleeves 808a,b,c may include a handle or knob on a proximal end 844a,b,c. Alternatively, or in addition, the sleeves 808a,b,c may include a tapered and/or pointed end near, or at, the distal end 846a,b,c. The axial through passage, passage 842, may be sized to guide a guide wire or pin 852 (e.g., a "K-wire")

along the cross fixation insertion axis 420. Each of the one or more sleeve 808a,b,c may be translated along the axis 420 relative to the body 814 to position the distal end 846a,b,c at a desired spacing from a bone.

Referring to FIGS. 43-46, in one embodiment, an inserter 806 is configured for use with the fastener 804 of FIG. 39, or other FIGS. of this disclosure. The inserter 806 includes a body 854 having a distal end 856 and a proximal end 858 including a handle portion 860. The body 854 includes a pair of laterally spaced passages extending from the distal end 856 toward the proximal end 858 and each defining a passage axis 862. The passage axes 862 are angled 864 to align with cavities in the fastener 804.

Side cuts or windows 866 communicate with the passages. Each passage receives a locking bolt 868 in axial sliding and rotating relationship. Each bolt 868 traverses one of the windows 866 exposing the portion of the bolt 868 within the window for manipulation. A knob 870 may be connected to each bolt 868, such as by pinning, to allow a user to rotate the bolt 868 about the passage axis 862 and to serve as a limit to axial travel of the bolt 868 as the knob abuts the proximal or distal margins 872, 874 of the window 866. Each bolt 868 includes a smooth cylindrical portion 876 sized to fit into a trailing portion of a stepped cylindrical cavity in one of the fastener legs. Each bolt 868 may include a threaded portion 878, distal to the smooth portion 876, sized to screw into a threaded leading portion of a stepped cylindrical cavity in one of the fastener legs.

The proximal end 858 of the inserter 806 includes a coupling member configured to rotationally couple to a guide 802 described herein. In the illustrative example of FIGS. 43-46, the coupling member includes a socket 880 extending distally into a superior surface 882 of the coupling member and a peripheral edge 884. In certain embodiments, the socket 880 may include internal threads 886. Alternatively, or in addition, the socket 880 may be a stepped cylindrical socket or cavity with a larger diameter proximal portion 888 and a smaller diameter, distal portion 890 that includes the internal threads 886. In one embodiment, the threads 834 of the lock mechanism 824 are configured to engage the internal threads 886 of the socket 880 and the socket 880 has a depth that permits distal advancement of the shaft 828 until the shoulder 830 presses against the superior surface 832 of the engagement member 818.

The coupling member may also include one or more rotational stop members 892 arranged about a longitudinal axis of the body 854. The one or more stop members 892 may cooperate with a stop of the engagement member 818 (e.g., side surface 840) to define a set of relative orientations for the guide 802 relative to the fastener 804 and/or inserter 806.

In the illustrated embodiment, the inserter 806 includes four stop members 892a,b,c,d positioned about the peripheral edge 884. Alternatively, or in addition, the inserter 806 may include a single stop member 892a, a pair of stop members 892a,b on one long side, a pair of stop members 892a,c on one short side. In the illustrated embodiment, the stop member 892 may include a projection 894 and a recess 896. As used herein, a "recess" refers to hollow, void, opening, or depression formed in a surface. In certain embodiments, the recess does not pass through the structure having the surface. A recess can have a variety of cross-section shapes (e.g., ovoid, oval, round, circular, rectangular, square, or the like) and have a variety of configurations for one or more walls that define the recess. In one example, a recess can have one or more walls that connect in rounded corners. In certain embodiments, a recess is sized and shaped to receive or accept another structure.

The inserter 806 is joined to the fastener 804 by sliding the locking bolts 868 proximally until the knobs 870 abut the proximal margin 872 of the window 866 as shown in FIG. 45. The threaded portion 322 may then be inserted into the cavity 160 of the fastener 804. Each knob 870 is then rotated to thread the locking bolt 868 into the cavity 160 and secure the fastener 804 to the inserter 806 as shown in FIG. 46.

Referring to FIGS. 40-47, a guide 802 is engageable with the inserter 806 to guide placement of an elongate member (e.g., fixation member 812) into, or through, the aperture 118 of the fastener 804. The guide 802 is coupled to the inserter 806 by inserting the pin 836 into the socket 880 until the inferior surface 838 abuts the superior surface 882 of the inserter handle portion 860 as shown in FIG. 47. Thus assembled, the cross fixation insertion axis 420 is aligned with the center of the fastener aperture 118. Insertion of a fixation member allow fixation axis 420 will enter the aperture 118. In addition, in an exemplary embodiment, the inserter 806 is positioned between the engagement member 818 and the fastener 804.

In one embodiment, a user can rotate the guide 802 about the engagement axis 412 until a desired orientation of the guide 802 in relation to the fastener 804 is found. Once the desired orientation is found or obtained, the guide 802 can be secured to maintain the desired orientation. In one embodiment, to secure the guide 802 a user may engage a lock mechanism 824. Referring to FIG. 47, to engage the lock mechanism 824 a user may press the handle 826 toward the inserter 806. In the illustrated embodiment, the inserter 806 includes a threaded socket 880. A user may rotate the shaft 828 by turning the handle 826 about the engagement axis 412 in a direction that causes the shaft 828 to advance distally within the socket 880. For example, threads 834 of the shaft 828 may engage internal threads 886 of the socket 880. As the shaft 828 is rotated the shaft 828 may advance distally into the socket 880. As the shaft 828 advances, the shoulder 830 of the lock mechanism 824 pinches the guide body 814 against the inserter 806. In one embodiment, this contact provides sufficient friction to retain the guide 802 in the desired orientation. In certain embodiments, the user may tighten the lock mechanism 824 to increase the resistance to rotation by guide 802 about the engagement axis 412.

In this manner, a user may engage the lock mechanism 824 to securely position the guide 802 about the engagement axis 412 and thereby position a fixation member 812 to enter the aperture 118 to secure the fastener 804. In other words, the fixation member 812 is aligned with the aperture 118 by the guide member 816. Further, the guide member 816 is securely positioned for deployment of the fixation member 812.

In one embodiment, the engagement member 818 may engage the fastener 804 directly without an intervening inserter 806. For example, the fastener 804 may include a socket similar to socket 880 that a shaft 828 can engage to secure the relative orientation of the guide 802 and the fastener 804. For example, the fastener 804 may include a threaded socket similar to socket 880 that threads 834 of the shaft 828 may engage to secure a relative orientation of the guide 802 with respect to the fastener 804.

Figure 48A:
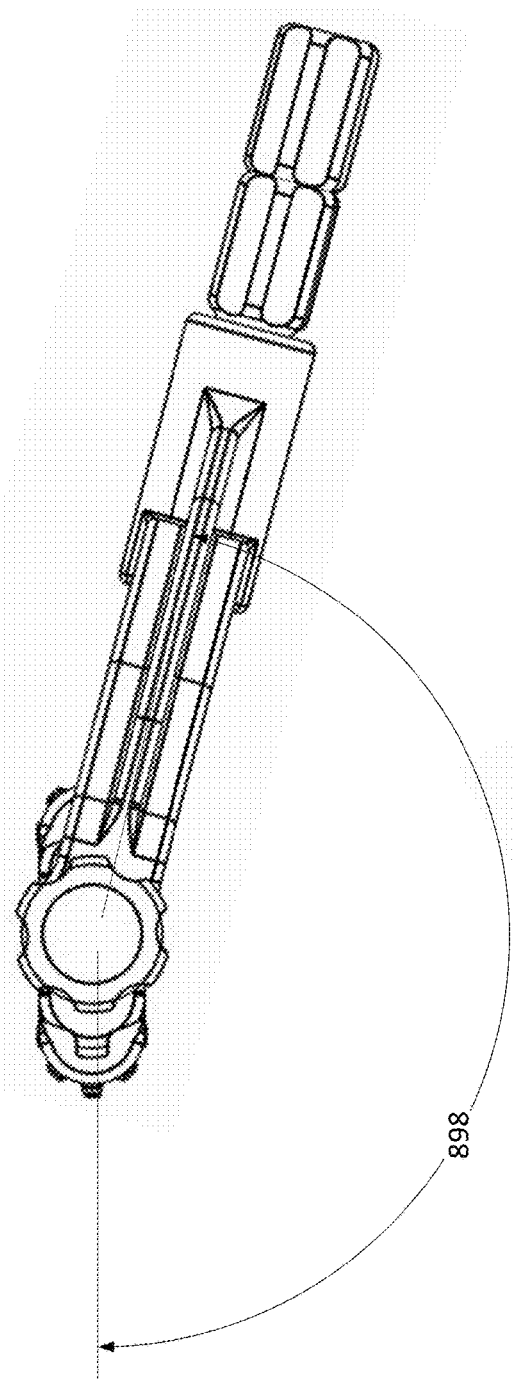
FIG. 48A illustrates one example angle or orientation in a range of motion for the system according to one embodiment of the present disclosure.
Figure 48B:
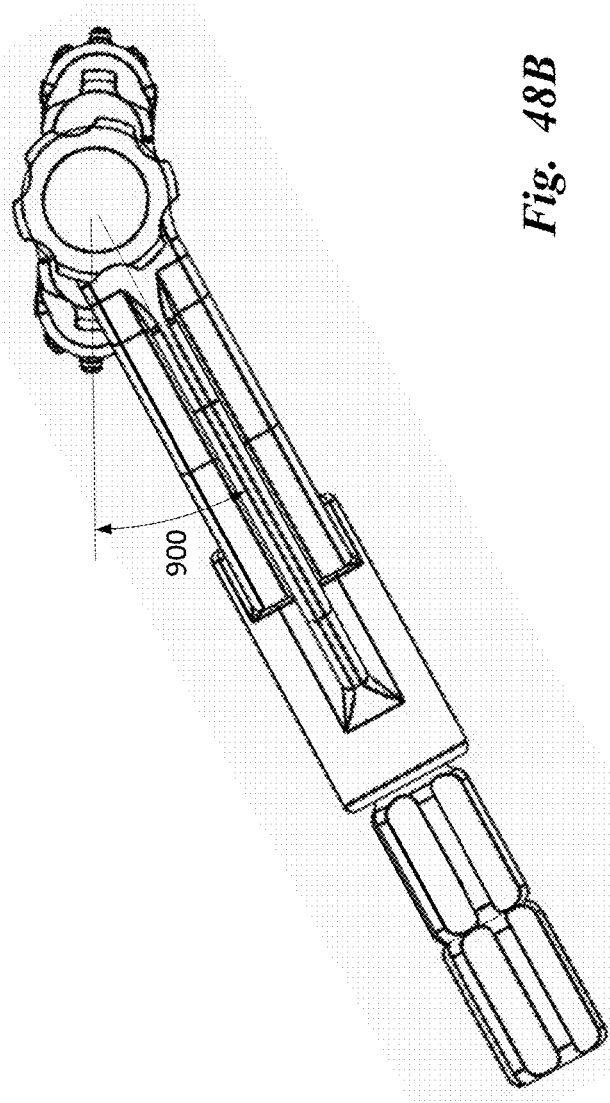
FIG. 48B illustrates one example angle or orientation in a range of motion for the system according to one embodiment of the present disclosure.

The guide 802 may be rotated relative to the inserter 806 about the engagement axis 412 through an infinite number of relative orientations between a first orientation shown in FIG. 48A and a second orientation shown in FIG. 48B. FIG. 48A illustrates one example maximum angle 898 in a range of motion for the system 800 and FIG. 48A illustrates one example minimum angle 900. In one embodiment, angle 898 may range between about 135.7 degrees and 151.3 degrees. In another embodiment, angle 900 may range between about 28.7 degrees and 44.3 degrees. For one embodiment, the range of motion for the guide 802 in relation to the fastener 804 may be about 91.4 degrees. In another embodiment the range of motion for the guide 802 in relation to the fastener 804 may be about 122.6 degrees. FIG. 47 illustrates the guide 802 coupled to the inserter 806 at approximately a 30 degree angle.

In one embodiment, the guide and inserter define stops between them limiting the relative orientations. For example, a fixation member to be inserted through the fastener aperture 118, such as screw 636 in FIG. 36, has a longitudinal axis and a transverse dimension normal to the longitudinal axis.

FIG. 49 is a perspective view of an inserter 806 and a guide 802 according to one embodiment, with certain components and/or details omitted for clarity. In the illustrated embodiment, the pin 836 of the engagement member 818 sits within the socket 880 of the inserter 806 (only the body 854 is illustrated in FIG. 49). FIG. 49 illustrates details of features for limiting a range of angles for the guide 802 in relation to the inserter 806 and/or fastener 804.

The inserter 806 includes a stop member 892 that includes a projection 894 and a recess 896. The stop member 892 may cooperate with one or more features 902 of the engagement member 818 to limit the range of motion of the guide 802 to a predetermined range of angles. As explained above, one example of the features 902 is side surface 840. In this manner, the guide 802 operates within a predefined set of orientations for positioning and guiding a fixation member 812.

FIG. 50 is a bottom view of a guide 802 according to one embodiment and illustrates one example of a feature 902. In certain embodiments, the feature 902 includes one or more recesses 904a,b configured to seat and hold one or more corresponding pins 906 or dowels. In one embodiment, the recesses 904a,b may be cylindrical in shape and may be sized to accept and retain the pins 906 within the recesses 904a,b by way of a press fit. FIG. 51 is a cross section view taken along line 51-51 in FIG. 50 illustrating example recesses 904a,b that may be used for feature 902.

FIG. 52 is a perspective view of a guide member 816 that includes feature 902. FIG. 52 includes pins 906 seated within the recesses 904. FIG. 53 is a top view of an inserter 806 and illustrates one example of how the pins 906 may interact with a stop member 892 of the inserter 806 to limit the range of motion of the guide 802. FIG. 53 illustrates the position of the pins 906a,b in relation to the stop member 892. For example, in a first position (shown with solid lines for the pins), pin 906a may abut the recess 896a of the inserter 806 and the projection 894 may restrict the guide 802 from further rotating about the engagement axis 412 in a counter-clockwise direction. In a second position (shown with dashed lines for the pins), pin 906b may abut the recess 896b of the inserter 806 and the projection 894b may restrict the guide 802 from further rotating about the engagement axis 412 in a clockwise direction.

FIG. 54 is a perspective view of an inserter 806 and one embodiment of an engagement member 1000 according to one embodiment, with certain components and/or details omitted for clarity. FIG. 55 is a cross section view of one embodiment of the engagement member 1000 and inserter 1008 of FIG. 54 with certain additional components and/or details included. The engagement member 1000 includes a shaft 1002, a collar 1004, a protrusion 1006, and an inserter 1008. In one embodiment, the shaft 1002 may be cylindrical and include a proximal end 1010 and a distal end 1012 (See FIG. 55). The distal end 1012, or features near the distal end 1012, engage a bone fastener. In certain embodiments, the shaft 1002 may engage the bone fastener directly. Alternatively, or in addition, the shaft 1002 may engage the bone fastener indirectly, by way of an inserter 1008 or other intermediate structure. The shaft 1002 may include threads 1014.

As used herein, a "collar" refers to an apparatus, instrument, structure, device, component, system, or assembly structured, organized, configured, designed, arranged, shaped, or engineered to resemble a clothing collar in shape or use. In certain embodiments, a collar may be open or closed. Examples of a collar may include a ring or round flange that may be used to restrain motion or to hold something in place. (search "collar" on Merriam-Webster.com. Merriam-Webster, 2021. Web. 15 Nov. 2021. Modified.) As used herein, a "protrusion" refers to a structure or portion of a structure that protrudes or extends from at least one other structure such as a surface of the at least one other structure. Generally, the other structure is connected to the protrusion.

The collar 1004 may be coupled with or integrated with the body of a guide and may include a through passage that axially aligns with the engagement axis. In certain embodiments, the collar 1004 may include a pin that extends distally from the collar 1004. In one embodiment, the through passage may include a proximal section 1016 and a distal section 1018. The proximal section 1016 and the distal section 1018 may be cylindrical and the proximal section 1016 may have a smaller diameter than the distal section 1018. In one embodiment, the proximal section 1016 may include internal threads 1020 configured to engage threads 1014 of the shaft 1002. Alternatively, or in addition, the proximal section 1016 may include internal threads 1020 configured to engage threads (not shown) near a proximal end 1010 of the shaft 1002. The internal threads 1020 may serve to secure the shaft 1002 and/or protrusion 1006 to the collar 1004 when a guide is not coupled to an inserter 1008 and/or bone fastener.

The protrusion 1006 may extend laterally from a cross sectional diameter of the shaft 1002. The protrusion 1006 may be coupled to the shaft 1002 near the proximal end 1010. In certain embodiments, the protrusion 1006 can be a variety of shapes including rectangular, cylindrical, or the like. The protrusion 1006 includes an inferior surface 1024 configured to contact a superior surface 1026 of the collar 1004.

In one embodiment, the shaft 1002 engages the bone fastener by way of threads 1014 that engage internal threads 1022 of a socket 1030 of the inserter 1008 which is secured to the bone fastener. In the illustrated embodiment, rotation of the shaft 1002 in a first direction may cause the threads 1014 to advance within the internal threads 1022 of the socket 1030 and thereby draw the protrusion 1006 closer to the collar 1004. As the threads 1014 advance, the protrusion 1006 presses against at least a portion of the collar 1004 (e.g., the inferior surface 1024 may press against the superior surface 1026). In certain embodiments, this pressure (or bias) is sufficient to retain the collar 1004 and a coupled guide in a first orientation about an engagement axis.

Those of skill in the art will appreciate that the socket 1030 may have a variety of different forms, features, and configurations within the scope of the present disclosure. In one embodiment, the socket 1030 has a depth that accepts distal advancement of the shaft 1002 until the protrusion 1006 presses against the collar 1004. Alternatively, or in addition, the socket 1030 has a depth that accepts distal advancement of the shaft 1002 until the protrusion 1006 presses against the collar 1004 with a sufficient press fit to restrain rotation of the collar 1004 about the inserter 1008 and/or bone fastener.

In the illustrated embodiment, the shaft 1002 engages the bone fastener by way of threads 1014 that engage internal threads 1022 of a socket 1030 of the inserter 1008. Those of skill in the art will appreciate a variety of features, structures, and implementations may be used for the shaft 1002 to engage the bone fastener. For example, a pin extending laterally near the distal end 1012 may slide vertically along a channel along a wall of the socket 1030 and then seat within a horizontal section of the channel to compress the protrusion 1006 against at least a portion of the collar 1004. In certain embodiments, the inserter 1008 may include a coupling member 1032 near its proximal end. The coupling member 1032 may include the socket 1030.

FIG. 55 also illustrates example bolts 1034, knobs 1036, pins 1038 that couple the knobs 1036 to the bolts 1034, and springs 1040 that bias the bolts 1034 distally according to one embodiment.

In certain embodiments, one or more surfaces of the engagement member 1000 that contact one or more surfaces of the inserter 1008 and/or bone fastener may form an engagement interface. As used herein, an "interface" refers to an area, a boundary, or a place at which two separate and/or independent structures, members, apparatus, assemblies, components, and/or systems join, connect, are coupled, or meet and act on, or communicate, mechanically or electronically, with each other. In certain embodiments, "interface" may refer to a surface forming a common boundary of two bodies, spaces, structures, members, apparatus, assemblies, components, or phases. (search "interface" on Merriam-Webster.com. Merriam-Webster, 2021. Web. 15 Nov. 2021. Modified.) In certain embodiments, the term interface may be used with an adjective that identifies a type or function for the interface. For example, an engagement interface may refer to one or more structures that interact or connect to mechanically join or connect two separate structures, each connected to a side of the interface.

In the illustrated embodiment, one or more engagement interfaces may be present. Referring still to FIGS. 54 and 55, one example engagement interface may be formed by an inferior surface 1044 of a collar 1004 and a superior surface 1046 of an inserter 1008 (e.g., a superior surface 1046 of a coupling member 1032 of the inserter 1008) and/or a superior surface of a bone fastener. Another example of an engagement interface may be formed by an inferior surface 1048 of pin extending distally from an inferior surface 1044 a collar 1004 and a superior surface 1050 near a distal end of a socket 1030 of an inserter 1008 and/or of a bone fastener. The one or more engagement interfaces 1042 constrain rotational movement of the inserter 1008 and/or the collar 1004 about an engagement axis.

In one embodiment, the engagement interface may include one or more protrusions on one or the other or both of the superior surface 1046 of the coupling member 1032 and the inferior surface 1044 of the collar 1004. Alternatively, or in addition, in certain embodiments, the engagement interface may be a hirth joint. As used herein, a "hirth coupling" or "hirth joint" refers to a type of mechanical connection named after its developer Albert Hirth. It can be used to connect two pieces of a shaft together and is characterized by tapered teeth that mesh together on the end faces of each half shaft. (Search "hirth coupling" on Wikipedia.com 2 Oct. 2021. CC-BY-SA 3.0 Modified. Accessed Nov. 15, 2021.)

FIG. 56 is a diagram of an example of an engagement interface 1042 that may be used in various embodiments of the present disclosure. In one embodiment, the engagement interface 1042 may include an interlocking coupling of a plurality of teeth 1052 and a plurality of valleys 1054 on each of two surfaces, inferior surface 1056 and superior surface 1058. The plurality of teeth 1052 and the plurality of valleys 1054 intermesh when the inferior surface 1056 and the superior surface 1058 abut or come into contact with each other. The plurality of teeth 1052 and plurality of valleys 1054 are sized and shaped relative to each other to intermesh. The inferior surface 1056 and superior surface 1058 may have any variety or configuration of teeth relative to valleys. Furthermore, in certain embodiments, the inferior surface 1056 and superior surface 1058 may have a single tooth and/or valley, respectively. In the illustrated embodiment, the plurality of teeth 1052 and plurality of valleys 1054 have a squared surface (cross section). Alternatively, or in addition, the plurality of teeth 1052 and plurality of valleys 1054 may have triangular cross section.

In various embodiments of the present disclosure the inferior surface 1056 and/or superior surface 1058 may be any of the surfaces that contact or abut each other. For example, one surface of the engagement interface 1042 may be a superior surface of a coupling member 1032 and an inferior surface may be an inferior surface of a collar 1004. Furthermore, the engagement interface 1042 may be integrated into surfaces of existing components or may be a separate set of components that may be coupled to parts of an apparatus or device.

FIG. 57A is a perspective view of a system 2000 that includes a guide 2002 according to one embodiment of the present disclosure. In one embodiment, the guide 2002 includes a body 2014, a guide member 2016, and an engagement member 2018. The body 2014 has a proximal end 2020 and a distal end 2022. In one embodiment, the body 2014 has an arc or acuate shape and may resemble an "arm" that extends between the proximal end 2020 and the distal end 2022.

The guide member 2016 may facilitate or enable preparation of a site for deployment of a fixation member 812. Alternatively, or in addition, the guide member 2016 may serve to guide deployment of a fixation member 812 to secure a bone fastener 804. In one embodiment, the guide member 2016 may be coupled to the body 2014 near the proximal end 2020. In the illustrated embodiment, the guide member 2016 is coupled to the body 2014 at the proximal end 2020.

In one embodiment, the guide member 2016 includes a passage through the guide member 2016 defining the cross fixation insertion axis 420 and one or more sleeves 2008*a,b* received in the passage in axial sliding relationship. In one embodiment, a passage of the guide member 2016 is sized to accept one or more sleeves 2008. Each sleeve 2008 may include an axial through passage having a cross-sectional diameter sized to permit the sleeve 2008 to slide axially within the passage. In the illustrated embodiment, the sleeves 2008*a,b* may each have different cross-sectional diameters that permit certain ones of the one or more sleeves 2008*a,b* to fit within each other in a nested configuration such that a longitudinal axis of the sleeves 2008*a,b* aligns with the fixation insertion axis 420.

In one embodiment, the engagement member 2018 couples the guide 2002 to the bone fastener 804. For example, in one embodiment the engagement member 2018 engages the bone fastener 804 such that the guide member 2016 is rotatable relative to the bone fastener 804 about an engagement axis 412 to a plurality of relative orientations. In another example, the engagement member 2018 engages the bone fastener 804 such that the guide 2002 is rotatable relative to the bone fastener 804 about an engagement axis 412 to a plurality of relative orientations.

In certain embodiments, the relative orientations are orientations of the guide 2002 and/or its members in relation to the bone fastener 804. In one embodiment, the engagement member 2018 couples the guide 2002 to the bone fastener 804 directly. In another embodiment, the engagement member 2018 couples the guide 2002 to the bone fastener 804 indirectly by way of an inserter 806. In one embodiment, the engagement member 2018 may be coupled to the body 2014 near the distal end 2022. In the illustrated embodiment, the engagement member 2018 is coupled to the body 2014 at the distal end 2022.

In certain embodiments, the engagement member 2018 is configured to secure the guide member 2016 and/or the guide 2002 at any of the plurality of relative orientations. In one embodiment, the engagement member 2018 may secure the guide member 2016 at a desired relative orientation temporarily. For example, while a fixation member 812 is being deployed. In another embodiment, the engagement member 2018 may secure the guide member 2016 at a desired relative orientation permanently.

In the illustrated embodiment of FIG. 57A, the guide 2002 includes a guide member 2016 that may include a pivot member 2024. The pivot member 2024 may be connected, or coupled, to the guide body 2014 near the proximal end 2020. The pivot member 2024 enables a user to adjust an orientation of the fixation axis 420 (also referred to as a cross fixation insertion axis) from a first position that may be substantially perpendicular to the engagement axis 412 to any orientation that is superior to an axis perpendicular to the engagement axis 412, such as superior orientation 2026 or to any orientation that is inferior to an axis perpendicular to the engagement axis 412, such as inferior orientation 2028. In certain embodiments, the pivot member 2024 connects to a passage that accepts sleeves 2008.

In one embodiment, the pivot member 2024 may include a slot 2040 formed within, or coupled to, the body 2014. The slot 2040 may be a through slot, a recessed slot, a jagged slot, a tortured slot, or the like. The slot 2040 may include a proximal end and a distal end. In certain embodiments, the slot 2040 is curved and may generally follow a contour of the body 2014. In the illustrated embodiment, the slot 2040 cooperates with a lock mechanism 2030 (See FIG. 57B) to enable the guide member 2016 to assume a plurality of orientations in the superior direction or the inferior direction relative to the bone fastener 804.

In one embodiment, the guide member 2016 connects to the body 2014 by way of the lock mechanism 2030 and the slot 2040. In certain embodiments, a user may translate the guide member 2016 within the slot 2040 to change the fixation axis 420 to any superior orientation 2026 or any inferior orientation 2028 with the guide member 2016 coupled to the slot 2040. In this manner, a user can use the pivot member 2024 to pivot the cross fixation insertion axis 420 to any of an infinite number of superior and/or inferior orientations.

Figure 57B:
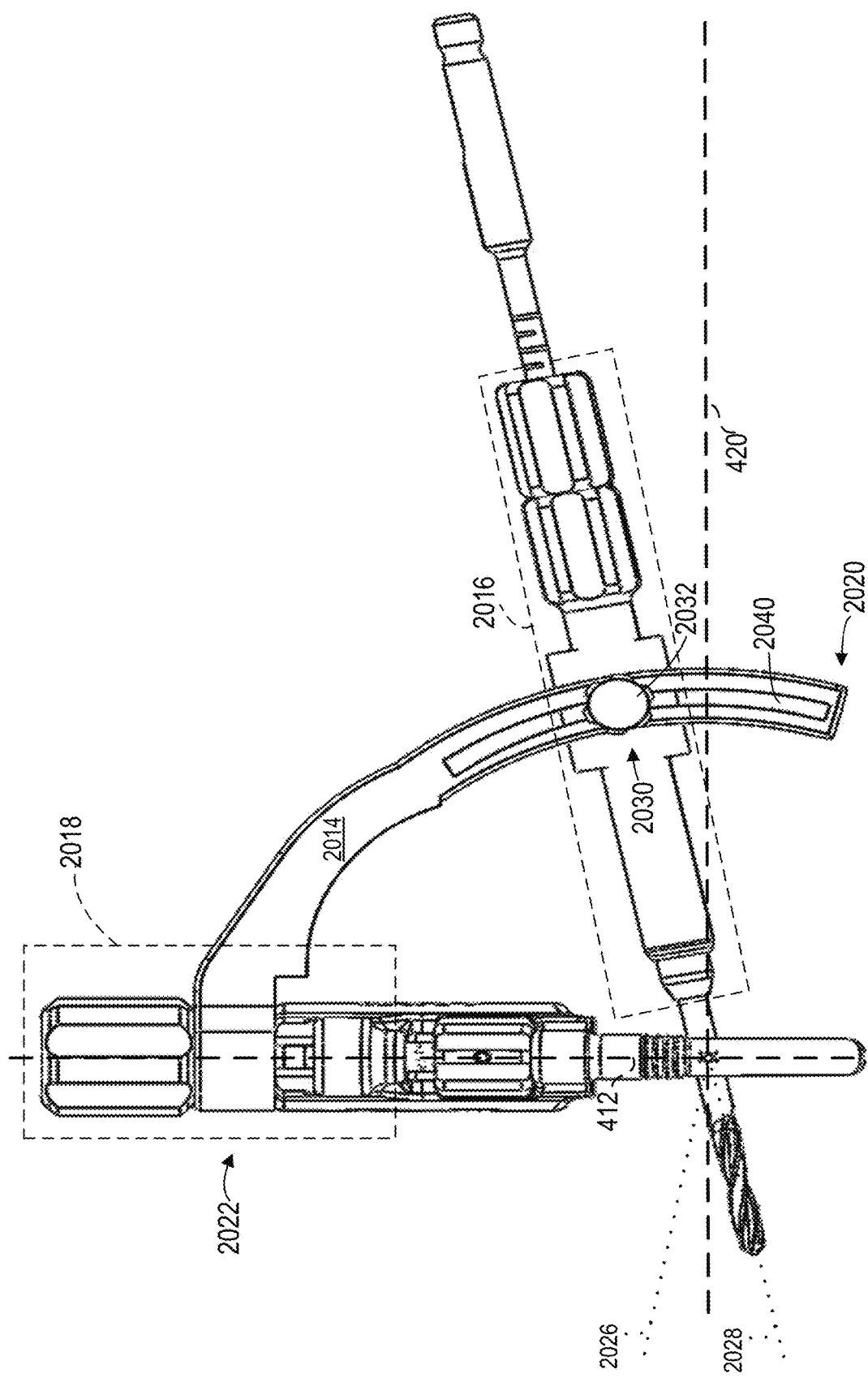
FIG. 57B is a side view of the system of FIG. 57A.

FIG. 57B is a side view of the system of FIG. 57A and illustrates one embodiment of the lock mechanism 2030. The lock mechanism 2030 enables a user to change the superior and/or inferior orientation to a desired superior and/or desired inferior orientation and then secure the pivot member 2024 to retain the desired orientation of the cross fixation insertion axis relative to the engagement axis 412. Of course, various forms of a lock mechanism 2030 may be used.

In one example embodiment, the lock mechanism 2030 may include a knob 2032 with a threaded shaft 2034 (See FIG. 57C) that tightens the guide member 2016 against the body 2014 to create a press-fit interface and thereby maintain a desired orientation. Advantageously, a user may release, loosen, or deactivate the lock mechanism 2030 and move the guide member 2016 along the slot 2040 to a new position, which may provide an orientation perpendicular to the engagement axis 412, a superior orientation, and/or an inferior orientation. Once the guide member 2016 is in the desired position/orientation a user may activate or engage the lock mechanism 2030 to secure the guide member 2016 in the desired position/orientation.

Figure 57C:
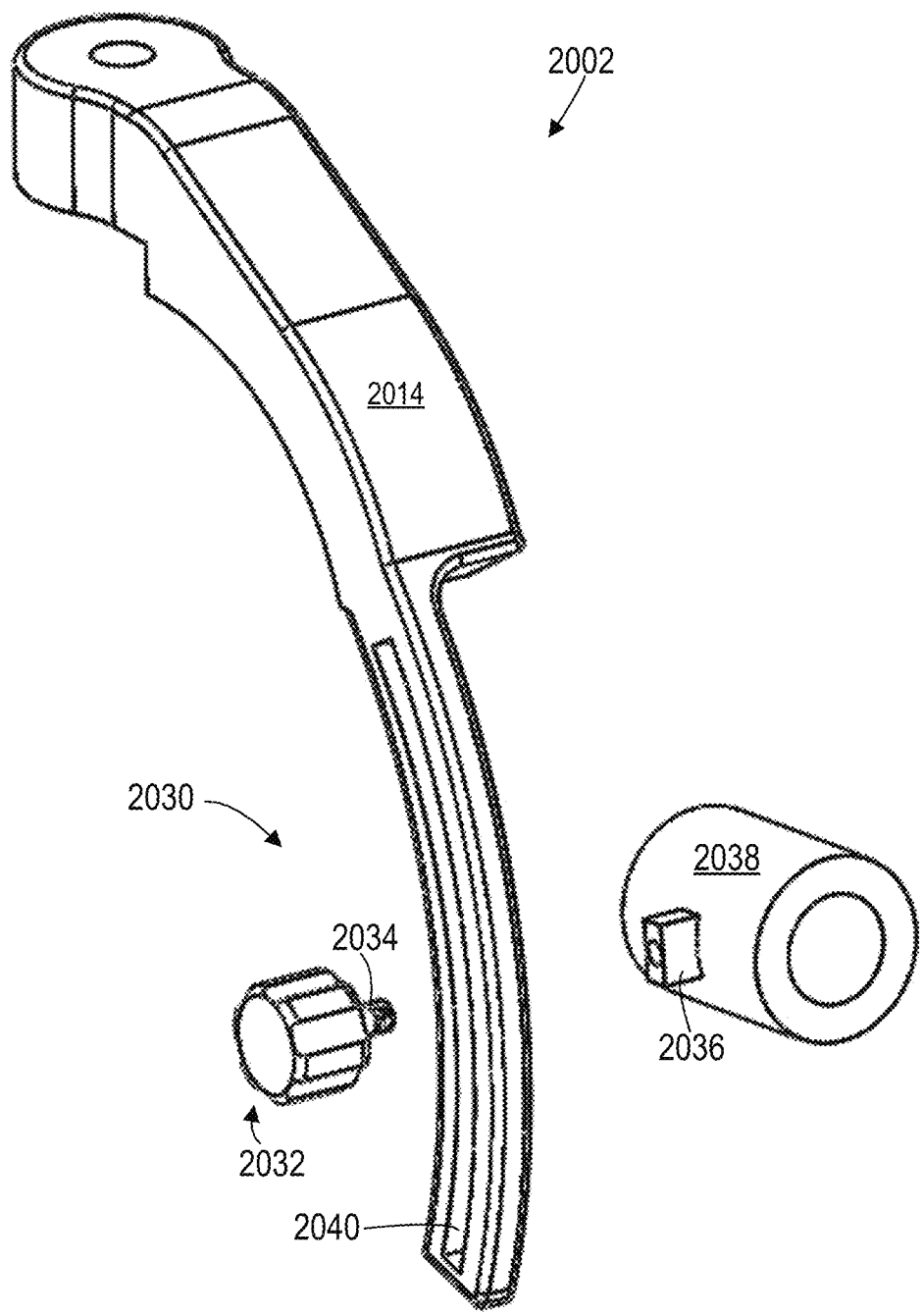
FIG. 57C is a perspective exploded view of a lock mechanism of FIG. 57B according to one embodiment of the present disclosure.

FIG. 57C is a perspective exploded view of a lock mechanism 2030 of FIG. 57B according to one embodiment of the present disclosure. In one embodiment, the lock mechanism 2030 may include a knob 2032, a shaft 2034, and a receiver 2036 coupled to a body 2038 of the guide member 2016. In the illustrated embodiment, the shaft 2034 is threaded. The receiver 2036 may include an opening that is threaded with internal threads configured to engage threads of the shaft 2034. The receiver 2036 may be formed as part of the body 2038, welded to, or otherwise connected to the body 2038. The receiver 2036 may serve to position the body 2038 relative to the body 2014 of the guide 2002. In one embodiment, the receiver 2036 may be configured to fit within and move within the slot 2040. Alternatively, or in addition, the shaft 2034 may fit within and/or move within the slot 2040.

In the illustrated embodiment, the body 2038 is cylindrical in shape and include a longitudinal passage that extends from a proximal end to a distal end of the body 2038. Of course, those of skill in the art recognize that the shape and configuration of the body 2038 and the passage can be different from the embodiment illustrated and still perform substantially functions and thus comprise an embodiment within the scope of the present disclosure. For example, the body 2038 may have a polygonal cross section, similarly the passage may a have polygonal cross section.

Figure 57D:
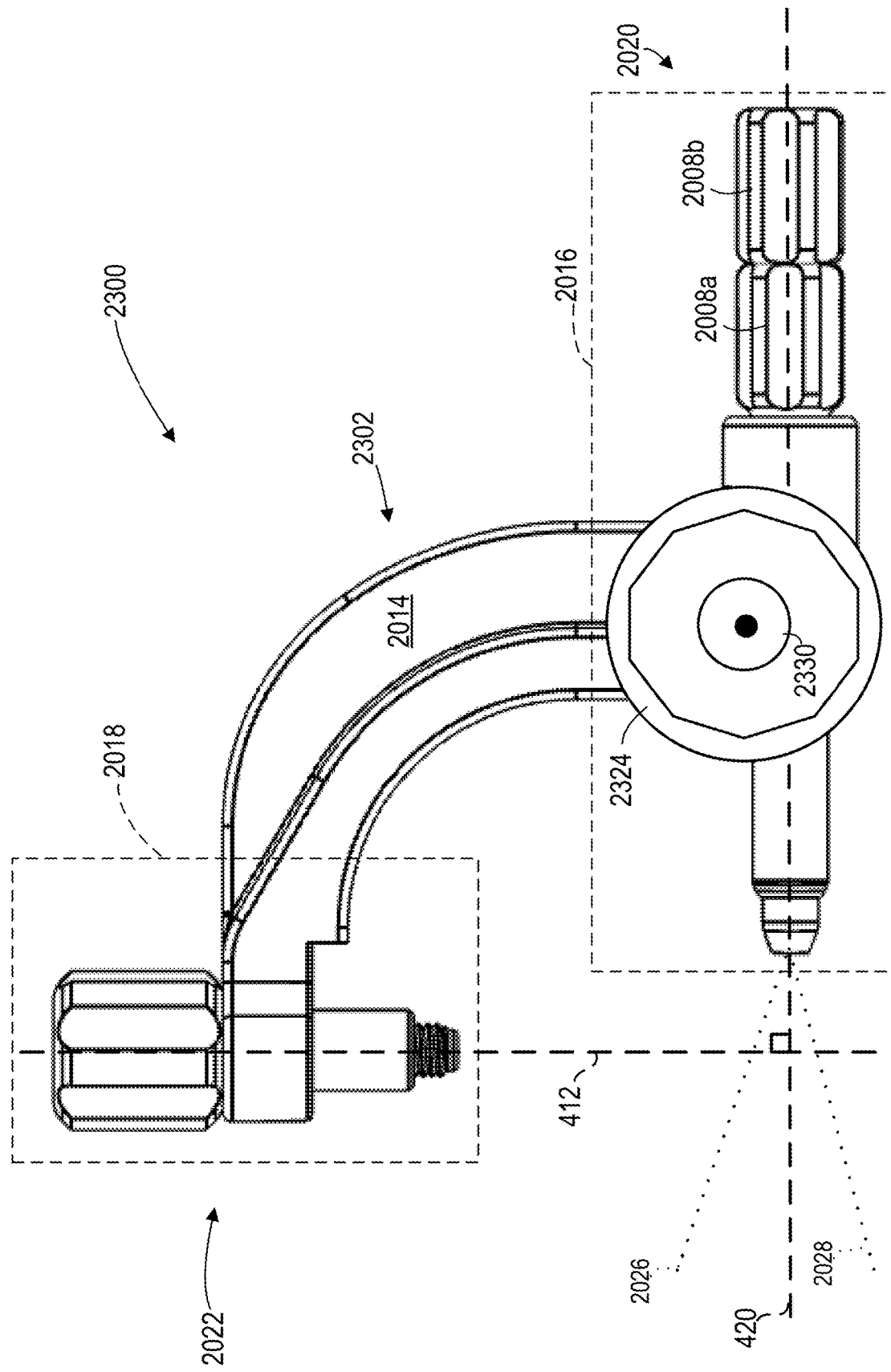
FIG. 57D is a side view of a system that includes a guide according to one embodiment of the present disclosure.

FIG. 57D illustrates an alternative embodiment of a guide 2302 of a system 2300. In the illustrated embodiment, the guide 2302 includes a guide member 2016 that may include a pivot member 2324. The pivot member 2324 may be connected, or coupled, to the guide body 2014 near the proximal end 2020. The pivot member 2324 enables a user to adjust an orientation of the fixation axis 420 (also referred to as a cross fixation insertion axis). In certain embodiments, the pivot member 2324 connects to a passage that accepts sleeves 2008. The pivot member 2324 may pivot or rotate about an axis transvers to a cross fixation insertion axis and an engagement axis.

Rotation of the pivot member 2324 may change the orientation of the fixation axis 420. In one embodiment, a user may use the pivot member 2324 to orient the cross fixation insertion axis 420 from a perpendicular orientation in relation to the engagement axis 412 to a superior orientation 2026. Alternatively, or in addition, in one embodiment, a user may use the pivot member 2324 to orient the cross fixation insertion axis 420 from a perpendicular orientation (or any superior or inferior orientation) in relation to the engagement axis 412 to an inferior orientation 2028. In this manner, a user can use the pivot member 2324 to pivot the cross fixation insertion axis 420 to any of an infinite number of superior and/or inferior orientations.

In certain embodiments, the pivot member 2324 includes a lock mechanism 2330. The lock mechanism 2330 enables a user to change the superior and/or inferior orientation to a desired superior and/or desired inferior orientation and then secure the pivot member 2324 to retain the desired orientation of the cross fixation insertion axis relative to the engagement axis 412. Of course, various forms of a lock mechanism 2330 may be used. In one example embodiment, the lock mechanism 2330 may be a knob with a threaded shaft that tightens against the pivot member 2324 to create a press-fit interface within the pivot member 2324 (and/or surfaces the pivot member 2324 and surfaces of the guide body 2014) and thereby maintain a current orientation.

Figure 58:
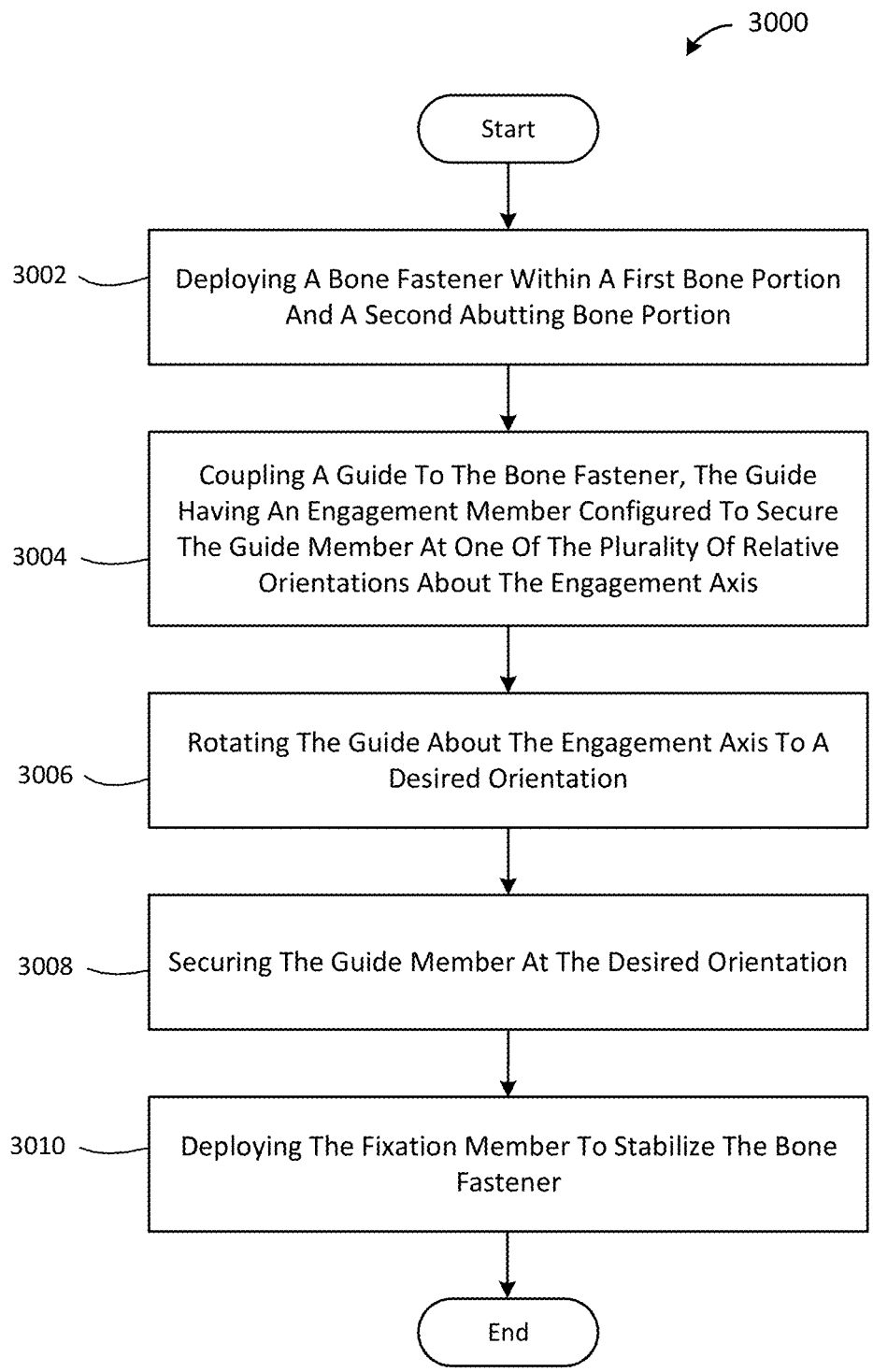
FIG. 58 illustrates one example of a method for stabilizing a bone fastener that traverses a first bone portion and a second abutting bone portion.

FIG. 58 illustrates one example of a method 3000 for stabilizing a bone fastener that traverses a first bone portion and a second abutting bone portion. Referring to FIGS. 26 through 34, the method 3000 starts with a user, such as a surgeon, deploying 3002 a bone fastener within a first bone portion and a second bone portion. In one embodiment, the second bone portion abuts the first bone portion. The two bone portions may be parts of the same bone or may be parts of two different bones. In one embodiment, an implant may be used instead of one of the two bone portions. As illustrated in the figures and described above, deployment of the bone fastener may include a number of steps.

In one embodiment, the bone fastener may include an insertion axis, a body having an aperture that has an aperture length and an aperture width, the aperture length being greater than the aperture width; a first leg connected to the body; and a second leg connected to the body. Examples of suitable bone fasteners for use in the deployment step are disclosed and described herein.

Next, a surgeon, or other user, may couple 3004 a guide (e.g., guide 802 or guide 2002) to the bone fastener. The guide may include a body having a proximal end and a distal end; a guide member coupled to the body near the proximal end, the guide member configured to guide placement of a fixation member to secure the bone fastener; and an engagement member coupled to the body near the distal end. The engagement member may be configured to engage with the bone fastener about an engagement axis at a plurality of relative orientations. In addition, the engagement member is configured to secure the guide member at one of the plurality of relative orientations about the engagement axis.

Next, a surgeon, or other user, may rotate 3006 the guide about the engagement axis to a desired orientation. Next, a surgeon, or other user, may secure 3008 the guide member at the desired orientation. Next, a surgeon, or other user, may deploy 3010 the fixation member to stabilize the bone fastener and the method 3000 ends.

In certain embodiments, deploying the fixation member may also include a surgeon, or other user, confirming an orientation of a cross fixation insertion axis coaxial with the guide member by way of a temporary fastener passed through a pin sleeve positioned within a drill sleeve which is positioned within a fixation member sleeve which is positioned within a passage of the guide member of the guide. Next, a surgeon, or other user, may drill a hole into one of the first bone portion and the second abutting bone portion by way of a bit within the drill sleeve. Next, a surgeon, or other user, may deploy the fixation member into the hole by way of a driver connected to the fixation member within the fixation member sleeve.

In certain embodiments, securing the guide member may also include a surgeon, or other user, engaging a locking mechanism of the engagement member to secure the guide member at the desired orientation. Next, a surgeon, or other user, may disengage the locking mechanism of the engagement member of the guide. Next, a surgeon, or other user, may rotate the guide to a new orientation about the engagement axis. Next, a surgeon, or other user, may reengage the locking mechanism of the engagement member of the guide.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 Para. 6. It will be apparent to those having skill in the art that changes may be made to the details of the above-described embodiments without departing from the underlying principles set forth herein.

Those of skill in the art will appreciate that the solutions provided in present disclosure may be accomplished with all or less than all of the components, structures, features, or aspects disclosed in the specification or illustrated in the figures in relation or a particular embodiment or claim.

While specific embodiments and applications of the present disclosure have been illustrated and described, it is to be understood that the scope of this disclosure is not limited to the precise configuration and components disclosed herein. Various modifications, changes, and variations which will be apparent to those skilled in the art may be made in the arrangement, operation, and details of the methods and systems of the present disclosure set forth herein without departing from it spirit and scope. Such changes may include omitting one or more features, structures, members, or components set forth herein in a particular embodiment, aspect, or example.

What is claimed is:

1. A system for deploying a fixation member into a bone fastener having an aperture, the system comprising:
   a guide comprising:
      a body having a proximal end and a distal end;
      a guide member coupled to the body near the proximal end, wherein the guide member is configured to guide placement of the fixation member to secure the bone fastener; and
      an engagement member coupled to the body near the distal end, wherein the engagement member is configured to engage the bone fastener such that the guide member is rotatable, relative to the bone fastener, about an engagement axis to a plurality of relative orientations; and
      wherein the engagement member is configured to secure the guide member at any of the plurality of relative orientations about the engagement axis,
   the engagement member comprising:
      a shaft having a proximal end and a distal end that engages the by ne fastener;
      a collar connected to the body, the collar having aperture through the collar, the aperture sized to receive the shaft,
      a protrusion coupled to the shaft towards the proximal end, and
      wherein the protrusion presses against at least a portion of the collar when the shaft engages the bone fastener
      an inserter configured to couple to the bone fastener, the inserter having a proximal end having a coupling member comprising a socket that extends distally into a superior surface of the coupling member; and
   wherein the shaft comprises external threads near the distal end of the shaft configured to engage internal threads of the socket, the socket having a depth that accepts distal advancement of the shaft until the protrusion presses against the collar,
   wherein a superior surface of the coupling member and an inferior surface of the collar form an engagement interface configured to constrain rotational movement of the inserter and the collar about the engagement axis; and
   wherein the engagement interface comprises an interlocking coupling comprising a plurality of both teeth and valleys on each of the superior surface of the coupling member and the inferior surface of the collar, the teeth and valleys of each of the superior surface of the coupling member and the inferior surface of the collar intermesh when the coupling member and the collar abut.

2. The system of claim 1, further comprising the bone fastener, wherein the bone fastener comprises:
   a first leg having a leading end and a trailing end;
   a second leg having a leading end and a trailing end; and
   a body connected to the first leg and to the second leg, the body defining the aperture.

3. The system of claim 1, wherein the engagement member comprises a lock mechanism comprising:
   a handle having a shoulder;
   a shaft connected to the handle, the shaft configured to engage a socket; and
   wherein the shoulder pinches the body as the shaft advances distally within the socket to secure the guide member at one of the plurality of relative orientations about the engagement axis.

4. The system of claim 3, wherein the shaft comprises threads near a distal end of the shaft and the socket comprises a threaded socket configured to engage threads of the shaft, the guide comprising:
- an inserter positioned between the engagement member and the bone fastener, the inserter comprising the threaded socket; and
- wherein the shoulder pinches the body against the inserter.

5. The system of claim 1, wherein the engagement member comprises a pin extending from an inferior surface of the collar, the pin configured to engage a cavity of an inserter connected to the bone fastener.

6. The system of claim 1, wherein the engagement member comprises a stop configured to limit the plurality of relative orientations about the engagement axis to a range of angles such that deployment of the fixation member will enter the aperture.

7. The system of claim 1, wherein the engagement member comprises a feature configured to limit a range of motion of the guide to a range of relative orientations about the engagement axis, the feature comprising one or more pins configured to contact a surface of an inserter or bone fastener.

8. A system for deploying a fixation member for a bone fastener, the system comprising:
- a bone fastener comprising:
- a first leg having a leading end and a trailing end;
- a second leg having a leading end and a trailing end;
- a body connected to the first leg and to the second leg; and
- an aperture through the body, the aperture having an aperture length and an aperture width, the aperture length greater than the aperture width; and
- a guide mountable to the bone fastener in a rotating relationship, the guide configured to securely position a fixation member at any of a plurality of relative orientations, in alignment with the aperture about an engagement axis,
- wherein the guide comprises:
  - a cross fixation insertion axis transverse to the engagement axis;
  - a guide member coupled near a proximal end of the guide the guide member comprising:
    - a passage through the guide member that aligns with the cross fixation insertion axis;
    - a first sleeve coaxial with the cross fixation insertion axis and having a cross sectional diameter less than a cross sectional diameter of the passage;
    - a second sleeve coaxial with the cross fixation insertion axis and having a cross sectional diameter less than a cross sectional diameter of the first sleeve; and
    - a third sleeve coaxial with the cross fixation insertion axis and having a cross sectional diameter less than a cross sectional diameter of the second sleeve.

9. The system of claim 8, further comprising an inserter configured to connect to both the bone fastener and the guide and wherein: the first sleeve is sized to accept the fixation member and a driver coupled to the fixation member; the second sleeve is sized to accept a drill bit; and the third sleeve is sized to accept a temporary fastener.

10. The system of claim 8, wherein the guide member comprises a pivot member configured to orient the cross fixation insertion axis from a perpendicular orientation in relation to the engagement axis to one of a superior orientation and an inferior orientation.

11. The system of claim 10, wherein the pivot member comprises a lock mechanism configured to secure the pivot member to retain an orientation of the cross fixation insertion axis in relation to the engagement axis.

12. A method of stabilizing a bone fastener that traverses a first bone portion and a second abutting bone portion, the method comprising:
- deploying a bone fastener within a first bone portion and a second abutting bone portion, the bone fastener having:
  - an insertion axis;
  - a body having an aperture having an aperture length and an aperture width, the aperture length being greater than the aperture width;
  - a first leg connected to the body; and
  - a second leg connected to the body;
- coupling a guide to the bone fastener, the guide having:
  - a body having a proximal end and a distal end;
  - a guide member coupled to the body near the proximal end, the guide member configured to guide placement of a fixation member to secure the bone fastener; and
  - an engagement member coupled to the body near the distal end, the engagement member engageable with the bone fastener about an engagement axis at a plurality of relative orientations, the engagement member configured to secure the guide member at one of the plurality of relative orientations about the engagement axis;
- rotating the guide about the engagement axis to a desired orientation;
- securing the guide member at the desired orientation; and
- deploying the fixation member to stabilize the bone fastener;
- wherein deploying the fixation member further comprises:
  - confirming an orientation of a cross fixation insertion axis coaxial with the guide member by way of a temporary fastener passed through a pin sleeve positioned within a drill sleeve which is positioned within a fixation member sleeve which is positioned within a passage of the guide member of the guide;
  - drilling a hole into one of the first bone portion and the second abutting bone portion by way of a bit within the drill sleeve; and
  - deploying the fixation member into the hole by way of a driver connected to the fixation member within the fixation member sleeve.

13. The method of claim 12 wherein securing the guide member further comprises:
- engaging a locking mechanism of the engagement member to secure the guide member at the desired orientation;
- disengaging the locking mechanism of the engagement member of the guide;
- rotating the guide to a new orientation about the engagement axis; and
- reengaging the locking mechanism of the engagement member of the guide.

* * * * *